(12) United States Patent
Takada et al.

(10) Patent No.: US 6,445,483 B2
(45) Date of Patent: *Sep. 3, 2002

(54) OPTICAL SCANNING APPARATUS

(75) Inventors: Kyu Takada; Nozomu Inoue; Takashi Hama; Yujiro Nomura, all of Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,469

(22) Filed: Jul. 1, 1997

(30) Foreign Application Priority Data

| Jul. 1, 1996 | (JP) | 8-190098 |
| Jul. 1, 1996 | (JP) | 8-190099 |
| Jul. 1, 1996 | (JP) | 8-190100 |
| Jul. 1, 1996 | (JP) | 8-190101 |
| Jan. 23, 1997 | (JP) | 9-010724 |
| Jun. 3, 1997 | (JP) | 9-145345 |

(51) Int. Cl.$^7$ ............................................. G02B 26/08
(52) U.S. Cl. ........................................ 359/207; 359/205
(58) Field of Search .............................. 359/207, 216, 359/217, 196, 197, 218, 204, 205; 250/234, 235, 236; 347/256, 258–261

(56) References Cited

U.S. PATENT DOCUMENTS 3,465,352 A * 9/1969 Carlson et al. .............. 359/204

(List continued on next page.)

FOREIGN PATENT DOCUMENTS

| DE | 39 22 982 | 1/1990 |
| DE | 44 25 917 | 1/1995 |
| GB | 2119539 | 11/1983 |
| GB | 2157845 | 10/1985 |

(List continued on next page.)

OTHER PUBLICATIONS

Applied Optics, vol. 30, No. 6, Feb. 20, 1991, pp. 699–704.
Patent Abstracts of Japan, vol. 095, No. 004, May 31, 1995, JP 07 013 096.
Patent Abstracts of Japan, vol., 017, No. 428 (P–1588), Aug. 9, 1993, JP 05 088096.
Akira Arimoto et al. Laser Scanning System Using a Rotationally Asymmetric Aspheric Surface.

*Primary Examiner*—Thong Nguyen
*Assistant Examiner*—Euncha Cherry
(74) *Attorney, Agent, or Firm*—Sughrue Mion, PLLC

(57) ABSTRACT

An improved optical scanning apparatus is adapted to be such that at either end of the scan range, an optical beam deflected by a reflecting surface of a scanner will pass through an anamorphic lens in scanning optics at a position spaced from its optical axis in the sub-scanning direction. The anamorphic lens has such a sectional profile in the sub-scanning direction that the lens thickness at one end of the sub-scanning direction differs from the thickness at the other end. Also, a high speed optical scanning apparatus based on the dual incidence and the oblique incidence, can prevent a positional variation of a scanning line that is due to a shift of each facet of the rotating polygonal mirror, which is caused by an offset of the rotating axis of the rotating polygonal mirror. The scanning apparatus includes a light source, a rotating polygonal mirror with a plural number of reflecting surfaces for reflecting and deflecting an optical beam emitted from the light source, transfer optics for receiving the optical beam that is reflected and deflected by a first reflecting surface of the rotating polygonal mirror and transferring the optical beam to a second reflecting surface of the mirror, and scanning optics for scanning a scanned surface with the optical beam that is reflected and deflected by the second reflecting surface.

20 Claims, 32 Drawing Sheets

U.S. PATENT DOCUMENTS

| | | | | |
|---|---|---|---|---|
| 4,215,912 A | * | 8/1980 | Minoura | 359/196 |
| 4,299,438 A | | 11/1981 | Minoura | 350/6.6 |
| 4,756,585 A | | 7/1988 | Kaneko et al. | |
| 4,846,539 A | * | 7/1989 | Takahashi et al. | 359/207 |
| 5,233,457 A | | 8/1993 | Hamada et al. | 359/216 |
| 5,392,149 A | * | 2/1995 | Boardman et al. | 359/216 |
| 5,488,502 A | | 1/1996 | Saito | 359/205 |
| 5,506,719 A | * | 4/1996 | Murakami et al. | 359/216 |
| 5,572,353 A | * | 11/1996 | Iizuka et al. | 359/207 |
| 5,768,028 A | * | 6/1998 | Okamura | 359/206 |
| 5,828,401 A | * | 10/1998 | Shiraishi | 347/259 |
| 5,861,952 A | * | 1/1999 | Tsuji et al. | 356/349 |
| 5,861,978 A | * | 1/1999 | Kamikubo | 359/208 |

FOREIGN PATENT DOCUMENTS

| | | | | |
|---|---|---|---|---|
| JP | 51-32340 | | 3/1976 | G02B/27/181 |
| JP | 53-97448 | | 8/1978 | G02B/21/17 |
| JP | 56-161566 | | 12/1981 | G03G/15/04 |
| JP | 58-8627 | | 2/1983 | H04N/1/26 |
| JP | 63-205634 | | 8/1988 | |
| JP | 1-234815 | | 9/1989 | |
| JP | 2-120819 | | 5/1990 | |
| JP | 3-81719 | | 4/1991 | |
| JP | 6-18800 | | 1/1994 | G02B/26/10 |
| JP | 6-265810 | * | 9/1994 | |
| JP | 7-27991 | * | 1/1995 | 26/10 |
| JP | 7-86595 | | 9/1995 | G02B/26/10 |

* cited by examiner

OPTICAL SCANNING APPARATUS

BACKGROUND OF THE INVENTION

1. Field of the Invention

This invention relates to an optical scanning apparatus for use with laser printers and the like. More particularly, the invention relates to an optical scanning apparatus of such a type that an optical beam is allowed to be incident on a scanner at an angle with a scanning plane perpendicular to its rotating axis and which is adapted to compensate for the curvature or rotation of the deflected beam such as to prevent the formation of a disfigured beam spot. The invention also relates to an optical scanning apparatus in which an optical beam is allowed to be incident on a scanner twice so that it is deflected and thereafter focused on a surface to be scanned by means of scanning optics in such a way that the optical path of one beam will not interfere with the optical path of the other beam.

Finally, the invention relates to an optical scanning apparatus of the type in which an optical beam is incident twice in succession on the facets of a rotating polygonal mirror while being slanted at angles to a scanning plane perpendicular to the rotating axis of the rotating polygonal mirror. The apparatus prevents a positional variation of a scanning line that is due to a shift of each facet of the rotating polygonal mirror with respect to the rotating axis of the polygonal mirror.

2. Background

Optical scanning apparatus for use with laser beam printers and the like are conventionally adapted to be such that an optical beam emitted from a light source such as a semiconductor laser is passed through shaping optics, deflected by a scanner such as a rotating polygonal mirror and focused by an imaging lens system, typically an f·θ lens system, to form a beam spot on the surface to be scanned. With such optical scanning apparatus, there occurs no particular problem since the optical beam is allowed to be incident within a scanning plane for deflection. However, in the case of an optical scanning apparatus for use with a multi-color laser printer of such a type that optical beams for more than one color are allowed to be incident simultaneously for deflection on the same scanning plane perpendicular to the rotating axis of a rotating polygonal mirror (see Unexamined Published Japanese Patent Application No. 161566/1981), it is necessary to separate the optical beams of the respective colors and, to this end, the beams must be allowed to be incident for deflection by the polygonal mirror at different angles with a scanning plane which is perpendicular to its rotating axis.

Also known in the art is an optical scanning apparatus of such a type that an optical beam is allowed to be incident twice for deflection by the rotating polygonal mirror. This apparatus has also had a problem in that in order to realize a compact system, the optical path for the incident beam must be separated from the optical path for the deflected beam in the first deflection and the second deflection by causing the respective optical beams to be incident on the polygonal mirror at an angle with a scanning plane perpendicular to its rotating axis.

If an optical beam is allowed to be incident on the rotating polygonal mirror at an angle with the scanning plane, the deflected beam becomes curved and the scanning line will draw a conical locus such that the optical beam scanning each end of the scan range is rotated, whereupon a disfigured beam spot is formed on the surface to be scanned, thus making it difficult to form a sharp image.

With the multi-color laser printer proposed in Unexamined Published Japanese Patent Application No. 161566/1981, the optical beams deflected by the reflecting surface are curved and the scanning line formed on the surface to be scanned is not straight. To deal with this problem, an optical scanning apparatus has been disclosed that performs the scanning operation with the aid of a cylindrical lens. However, even in that modified version, the deflected end scanning optical beam is rotated and although the scanning line formed on the surface to be scanned is straight, the resulting beam spot is disfigured so that it is no longer possible to form a satisfactory image.

In order to insure that the position of the scan start point is kept constant, an optical beam carrying a horizontal sync signal is detected. However, if optical beams are allowed to be incident for deflection on the rotating polygonal mirror at an angle with the scanning plane, the beam spot formed by the optical beam carrying a horizontal sync signal becomes disfigured to deteriorate the precision in detection.

The optical scanning apparatus for use with conventional laser beam printers and the like are typically adapted to be such that an optical beam issuing from a light source such as a semiconductor laser is passed through shaping optics and allowed to be incident on a scanner such as a rotating polygonal mirror for single deflection and the thus deflected beam is passed through an imaging lens system, typically an f·θ lens system, to thereby form a beam spot on the surface to be scanned. However, this practice of performing only one deflection has the following problem: the optical beam incident on a reflecting surface of the scanner is so large in the main scanning direction that in order to insure that the entire part of the incident beam will lie in the reflecting surface, the size of individual reflecting surfaces has to be increased. As a result, the scanner becomes bulky and, in addition, the number of reflecting surfaces of the scanner cannot be sufficiently increased to realize a fast operating optical scanning apparatus.

Under the circumstances, various proposals have recently been made to develop a new optical scanning apparatus which is adapted to be such that an optical beam deflected by a first reflecting surface of a scanner such as a rotating polygonal mirror is passed through transfer optics and directed to a second reflecting surface of the same scanner, thereby increasing the angle of the second deflection to produce an optical beam for scanning over the surface to be scanned by means of scanning optics. This type of optical scanning apparatus are claimed to have two major advantages, i.e., compactness and fast operation.

An example of the proposals that have resulted from this approach is the scanning optics capable of self-amplified deflection which is described in Japanese Unexamined Published Patent Application No. 97448/1978. In this system, an optical beam deflected by a first reflecting surface of a scanner is passed through a focal transfer optics so that it is incident on a second reflecting surface, which is different from the first reflecting surface, in a direction parallel to the optical beam from the first reflecting surface. Thus, optical scanning is performed with the optical beam that has been deflected twice by two different reflecting surfaces of the same scanner. The transfer optics is provided in such a way that the optical beam will move in a direction opposite to that in which the scanner is rotated.

The above-described optical scanning apparatus of a dual deflection type has two salient features: the scanning angle can be increased and, in addition, the angle by which the optical beam deflected by the first reflecting surface of the scanner is inclined due to its tilting can be reduced or canceled at the second reflecting surface. However, the scanning optics described in Unexamined Published Japanese Patent Application No. 97448/1978 has the disadvantage that the overall optical scanning apparatus becomes bulky since the optical path of the first deflected optical beam and that of the second deflected optical beam lie in the same plane. In addition, the first and second reflecting surfaces of the scanner must be in diametrically opposite positions and this increases the optical path length of the transfer optics, thereby reducing the latitude in the layout of the optical path of the transfer optics. Further in addition, the transfer optics has to be a focal and to meet this requirement, at least two lens elements are necessary but, then, the structure of the transfer optics becomes so complicated that the overall apparatus is not only bulky but also economically disadvantageous.

Another problem with the practice of deflecting an optical beam by allowing it to be incident twice on the same scanner is that in order to realize a compact optical scanning apparatus, it is generally required that the incident beam is not to interfere with the deflected beam in the first deflection and the second deflection. To meet this requirement, the optical beams for the respective deflections are allowed to be incident on the scanner at an angle with a plane normal to its rotating axis. As a result of this design, the optical path of the first deflected beam and the optical path for the second deflection are separated in a vertical direction along the rotating axis of the scanner (one being upward and the other downward), thereby making it possible to realize a compact optical scanning apparatus. On the other hand, this design causes the optical beam to rotate in the optical path of the transfer optics which is provided between the first reflecting surface for performing the first deflection and the second reflecting surface for performing the second deflection and if the rotated beam is passed through the scanning optics to form a beam spot which scans over the surface to be scanned, the resulting beam spot is disfigured making it difficult to produce a sharp image.

The reflecting surfaces of the rotating polygonal mirror working as the scanner are tilted for two specific reasons, one being the tilting of the rotating axis of the polygonal mirror and the other being the tilting of individual reflecting surfaces per se that occurs as a machining error. With the already described scanning optics of a self-amplified deflection type, compensation can be made for the tilting of the rotating axis of the polygonal mirror but not for the tilting of individual reflecting surfaces of the mirror.

A further problem with this dual deflection type is that the scanning line formed on the surface to be scanned is not straight but curved since each of the optical beams to be deflected is incident on the scanner at an angle with the scanning plane.

A rotating polygonal mirror is frequently used as a deflector for deflecting an optical beam to scan a scanned surface with the optical beam in optical scanning apparatuses, such as image recording apparatuses, e.g., laser printers, image readers, and image measuring instruments.

In those apparatuses, a scanned surface or a surface to be scanned is two-dimensionally scanned with an optical beam in such a manner that the optical beam is horizontally moved on the scanned surface along a rectilinear line or a curved line while moving a scanned medium, located at the scanned surface, vertically or in the direction perpendicular to the direction of the horizontal movement. The horizontal movement of the optical beam is referred to as a main scanning direction, and the vertical movement thereof is referred to as a sub-scanning direction.

Under a constant pressure of attempting to increase the resolution and processing speed in recent markets, there is a strong demand for an optical scanning apparatus operable at higher speed.

Of the possible ways to increase a scanning speed (scanning frequency) in the polygonal-mirror basis optical scanning apparatus, the following two techniques are enumerated:

1) to increase the number of revolutions of the polygonal mirror, and 2) to increase the number of facets of the polygonal mirror.

To effect the first technique (1) above, a bearing that can be rotated at high speed is required. The maximum speed of the ball bearing, most widely used, is 20,000 rpm. An air bearing can rotate at 30,000 rpm or higher. However, air bearings are expensive and limited in application. Particularly, its application to the inexpensive laser beam printers designed for general users is not practical.

As to the second technique, (2) above, an increase in the number of facets of the polygonal mirror entails a decrease of the rotation angle of each facet or reflecting surface of the polygonal mirror. Attempt to secure a predetermined area or larger of each facet of the polygonal mirror creates another problem associated with the increase in the diameter of the polygonal mirror.

In many optical scanning apparatus, an optical beam is focused on the scanned surface. To form a small beam spot on the scanned surface during scanning by the optical beam, it is necessary for the reflecting surface of the polygonal mirror to have a predetermined size in the main scanning direction, which depends on a spread angle of the optical beam. When the number of facets of the polygonal mirror is increased, a rotation angle of one facet is small, and a scan angle of the optical beam is also small. Where the scan angle is small, a long focal distance is required for the optical system in order to secure a predetermined scan width. The result is a relatively long distance from the polygonal mirror to the scanned surface. In addition, the diameter of the optical beam on the reflecting surface of the polygonal mirror in the main scanning direction is large. The area of the reflecting surface is larger than in the case where the number of facets is small, leading to an increase of the size of the polygonal mirror.

There is such a contradiction that with an increase in the number of facets of the polygonal mirror, the resulting area of each facet becomes larger as compared to a polygonal mirror having a fewer number of facets. Because of the contradictive nature, if the size (inscribed cylinder) of the polygonal mirror is determined, the upper limit of the number of facets is inevitably determined by the determined size. For an optical scanning apparatus used for a laser beam printer specified: the scan width is 350 mm, the wavelength is 780 nm, the radius of the inscribed cylinder of the polygonal mirror is 25 mm, and the spot diameter on the scanned surface in the main scanning direction is 50 µm or less, a tolerable number of facets is 7.

If the diameter of the polygonal mirror is increased to increase the number of its facets, the weight and moment of inertia of the polygonal mirror are increased, and additionally air resistance (windage loss) is increased with the rotation of the mirror. Therefore, the number of revolutions of the polygonal mirror is limited to be low.

Thus, the polygonal mirror is limited in regard to increasing the number of facets and the number of revolutions. To cope with this, various optical scanning apparatuses have been developed.

An example of the developed optical scanning apparatus is disclosed in Japanese Patent Laid-Open Publication No. Sho. 51-100742. In the disclosed apparatus, a semiconductor laser array is used for a light source. The scanned surface is simultaneously scanned with a plural number of laser beams. The apparatus succeeds in increasing the scanning speed by a quantity corresponding to the number of laser devices, without increasing the number of revolutions of the polygonal mirror.

Another example of the optical scanning apparatus is disclosed in Japanese Patent Laid-Open Publication No. Sho. 51-32340. In this apparatus, an optical beam emitted from a light source is incident on the polygonal mirror in a state that the diameter of the optical beam is extremely reduced in the main scanning direction. The optical beam, reflected and deflected by the polygonal mirror, is incident again on the polygonal mirror by way of a transfer optics.

In the optical scanning apparatus of this publication, an optical system is designed such that the diameter of the optical beam in the main scanning direction in the first incidence is much smaller than that of the optical beam in the second incidence, and the optical beam in the second incidence traces the central point of the rotating reflecting surface when viewed in the main scanning direction.

Since the beam diameter may be reduced to be extremely small in the first incidence, it is possible to scan the full segmented angle of the polygonal mirror. After being reflected by the first reflecting surface, the optical beam is passed through the transfer optics and is incident again on the polygonal mirror. At this time, the beam diameter is expanded to be large enough to form a given spot on the scanned surface. The beam size may be selected independently of the rotation angle of the polygonal mirror since the beam follows the rotating reflecting surface. An additional example of the optical scanning apparatus is disclosed in Japanese Patent Laid-Open Publication No. Hei. 1-169422. In the apparatus, the optical beam is incident on and deflected by the reflecting surface while being slanted at an angle to the scanning plane, perpendicular to the rotating axis of the polygonal mirror.

The method in which the optical beam is incident twice in succession on the different reflecting surfaces as described above will be referred to as "dual incidence" in the specification. Further, the method in which the optical beam is incident on the reflecting surface while being slanted at an angle to the scanning plane, perpendicular to the rotating axis of the rotating polygonal mirror, will be referred to as "oblique incidence".

When the optical beam is deflected by the "oblique incidence" in which the optical beam is obliquely incident on the mirror facet, a shift of the mirror facet or reflecting surface with respect to the rotating axis of the polygonal mirror shifts a position of the optical beam on the scanned surface from its correct position. As a result, an irregular image appears on a reproduced picture, and it is difficult to faithfully reproduce a picture and to obtain a good reproduced picture.

SUMMARY OF THE INVENTION

The present invention has been accomplished under these circumstances and has as an object providing an optical scanning apparatus in which an optical beam is incident on a reflecting surface of a scanner at an angle with a plane perpendicular to the rotating axis of the scanner but which is capable of preventing the deflected beam from being curved to form a disfigured beam spot. In this apparatus, a line normal to the entrance surface of an anamorphic lens in the scanning optics, at the point where an optical beam for scanning either end of the scan range passes through said entrance surface, has an angle in the sub-scanning direction with respect to a line normal to the exit surface of the anamorphic lens, at the point where said optical beam for scanning either end of the scan range passes through said exit surface. This design enables the production of a satisfactory image which is corrected for the disfiguring of a beam spot.

Another object of the invention is to provide an anamorphic lens having high precession in surfaces and which is compact in size.

Yet another object of the invention is to ensure that the position of the scan start point is kept constant with high precision.

A further object of the invention is to provide an optical scanning apparatus in which an optical beam is incident on a scanner at an angle with a scanning plane perpendicular to its rotating axis but which is capable of preventing the deflected beam from being curved form a disfigured beam spot. In this apparatus, an anamorphic lens is positioned eccentrically in the scanning optics, thereby producing a satisfactory image which is corrected for the disfiguring of a beam spot.

A still further object of the invention is to provide an optical scanning apparatus of a dual deflection type that is compact and which is capable of satisfactory image formation by simple means. In the apparatus, the optical beam incident on a first reflecting surface of a scanner to undergo the first deflection and the optical beam incident on a second reflecting surface of the scanner for the second deflection are incident on the respective reflecting surface at an angle in the sub-scanning direction such that the incident beam will not overlap the deflected beam in the first deflection and the second deflection; in addition, the angle of incidence of the optical beam on the first reflecting surface of the scanner is equal to the angle of incidence of the optical beam on the second reflecting surface. In a preferred embodiment, the first reflecting surface of the scanner is adapted to be parallel to the second reflecting surface such that the optical path from the first reflecting surface to the second reflecting surface will cross the rotating axis of the scanner.

The present inventors also found that not only the tilting of the rotating axis of a polygonal mirror used as a scanner in an optical scanning apparatus of a dual deflection type but also the tilting of individual reflecting surfaces of the mirror could be effectively corrected by ensuring that the first and second reflecting surfaces of the rotating polygonal mirror are adapted to be conjugated to each other in terms of geometrical optics by means of transfer optics. Accordingly, another object of the invention is to provide a compact optical scanning apparatus that is capable of satisfactory image formation by allowing not only the tilting of the rotating axis of the polygonal mirror but also the tilting of its reflecting surfaces to be corrected effectively by simple means.

The present inventors further found that the scanning line formed on the surface to be scanned did not become curved but remained straight during the scanning operation by ensuring that the second reflecting surface of the rotating polygonal mirror and the surface to be scanned are adapted to be conjugated to each other in terms of geometrical optics by means of scanning optics. Accordingly, yet another object of the invention is to provide a compact optical scanning apparatus of a dual deflection type that forms a straight scanning line on the surface to be scanned so as to achieve satisfactory image formation by simple means.

Thus, the present invention provides an optical scanning apparatus comprising a light source for issuing an optical beam, a scanner for deflecting an optical beam from the light source that is incident at an angle in the sub-scanning direction and scanning optics by which the optical beam deflected from a reflecting surface of the scanner is focused to form a beam spot on the surface to be scanned. The apparatus is adapted such that at either end of the scan range, the optical beam deflected by a reflecting surface of the scanner will pass through an anamorphic lens in the scanning optics at a position spaced from its optical axis in the sub-scanning direction, and said anamorphic lens has such a sectional profile in the sub-scanning direction that the lens thickness at one end of the sub-scanning direction differs from the thickness at the other end. The apparatus may also be characterized by mounting a horizontal synchronous lens or sensor in such a manner that they are rotated about its optical axis.

The invention also provides an optical scanning apparatus of a type in which an optical beam from an optical source is allowed to be incident on a first reflecting surface of a scanner having at least two reflecting surfaces and in which the optical beam deflected by said first reflecting surface is allowed to be incident by transfer optics on a second reflecting surface which is different from said first reflecting surface, with the thus deflected optical beam being focused to form a beam spot on the surface to be scanned. In the apparatus, the incident optical beams fall on the first and second reflecting surfaces of the scanner at the same angle in the sub-scanning direction. In a preferred embodiment, the apparatus is adapted to be such that the first and second reflecting surfaces of the scanner are parallel to each other and that the optical path from the first to the second reflecting surface crosses the rotating axis of the scanner.

With the optical scanning apparatus of this structural design, a beam spot which would otherwise be disfigured due to the rotation of an optical beam that occurs between the first and the second deflection of the optical beam with the scanner can be corrected for the problem very efficiently and, in addition, the size of the apparatus can be reduced.

The invention provides an optical scanning apparatus comprising: a light source for issuing an optical beam; a scanner for deflecting said optical beam issued from said light source that is incident on a reflecting surface of said scanner at an angle in the sub-scanning direction; and scanning optics, including an anamorphic lens, by which the optical beam deflected from said reflecting surface of said scanner is focused to form a beam spot on a surface to be scanned, wherein said anamorphic lens has a positive refractive power in the sub-scanning direction and, at either end of the scan range, the optical beam deflected by said reflecting surface of said scanner passes through said anamorphic lens at a position spaced form its optical axis in the sub-scanning direction and on the side where said optical beam which has been deflected with respect to a line normal to said reflecting surface is present.

The invention also provides an optical scanning apparatus comprising a light source for issuing an optical beam, a scanner for deflecting the optical beam from said light source and transfer optics by which the optical beam deflected by a first reflecting surface of the scanner is allowed to be incident on a second reflecting surface of the scanner which is different from the first reflecting surface, with the thus deflected optical beam being focused to form a beam spot on the surface to be scanned. In the apparatus, the transfer optics is adapted to be such that the first and second reflecting surfaces of the scanner are substantially conjugated to each other in the sub-scanning direction in terms of geometrical optics. In preferred embodiment, the imaging point in the sub-scanning direction that is located on or near the second reflecting surface lies between said second reflecting surface and imaging point Q which is rendered to be conjugated to imaging point P by means of the virtual transfer optics which allows the first and second reflecting surfaces to be optically conjugated to each other in the sub-scanning direction.

The invention also provides an optical scanning apparatus comprising a light source for issuing an optical beam, a scanner having at least two reflecting surfaces for deflecting the optical beam from said light source and transfer optics by which the optical beam deflected by a first reflecting surface of the scanner is allowed to be incident on a second reflecting surface of the scanner which is different from the first reflecting surface, with the thus deflected optical beam being focused to form a beam spot on the surface to be scanned. In the apparatus, the optical beam which has been deflected by reflection from the first reflecting surface of the scanner is passed through the transfer optics to be incident on the second reflecting surface at an angle in the sub-scanning direction and the optical beam deflected by reflection from the second reflecting surface is passed through scanning optics to form a beam spot on the surface to be scanned, said scanning optics being adapted to be such that the second reflecting surface of the scanner and the surface to be scanned have a substantially conjugated relationship in the sub-scanning direction in terms of geometrical optics.

Yet another object of the present invention is to provide a high speed optical scanning apparatus based on the dual incidence and the oblique incidence, which can prevent a positional variation of a scanning line that is due to a shift of each facet of the rotating polygonal mirror, which is caused by an offset of the rotating axis of the rotating polygonal mirror.

To achieve this object, the present invention provides an optical scanning apparatus having a light source for emitting an optical beam, a rotating polygonal mirror with a plural number of reflecting surfaces for reflecting and deflecting an optical beam emitted from the light source, transfer optics for receiving the optical beam that is reflected and deflected by a first reflecting surface of the rotating polygonal mirror and transferring the optical beam to a second reflecting surface of the rotating polygonal mirror, and scanning optics for scanning a scanned surface with a beam spot formed on the scanned surface by the optical beam that is reflected and deflected by the second reflecting surface of the rotating polygonal mirror. In the optical scanning apparatus, the rotating polygonal mirror has plural sets of reflecting surfaces, each set consisting a couple of reflecting surfaces oppositely disposed with respect to the rotating axis of the rotating polygonal mirror. The first and second reflecting surfaces are oppositely disposed with respect to the rotating axis of the rotating polygonal mirror. The optical beam emitted from the light source is incident on the first reflecting surface while being slanted at an angle to the sub-scanning direction. The optical beam transmitted by the transfer optics is incident on the second reflecting surface while being slanted at an angle to the sub-scanning direction. The transfer optics is substantially conjugated to the first reflecting surface and the second reflecting surface in the sub-scanning direction. The scanning optics is substantially conjugated to the second reflecting surface and the scanned surface in the sub-scanning direction.

In the optical scanning apparatus thus constructed, the following expression is preferably satisfied $$\delta\beta s |\alpha 1 \beta t - \alpha 2|/p \leq 1/8 \quad (2)$$

where:
- $\alpha 1$ and $\alpha 2$: angles of the optical beam to the first and second reflecting surfaces, respectively, when viewed in the sub-scanning direction;
- $\beta t$: magnification of the transfer optics in the sub-scanning direction;
- $\beta s$: magnification of the scanning optics in the sub-scanning direction;
- $\delta$: maximum shift of each the first and second reflecting surfaces with respect to the rotating axis of the rotating polygonal mirror; and
- p: distance between the adjacent scanning lines on the scanned surface in the sub-scanning direction.

Also in the optical scanning apparatus, the following expression is preferably satisfied $$\beta t = \alpha 2/\alpha 1. \quad (1)$$

where:
- $\alpha 1$ and $\alpha 2$: angles of the optical beam to the first and second reflecting surfaces, respectively, when viewed in the sub-scanning direction; and
- $\beta t$: magnification of the transfer optics in the sub-scanning direction.

Further, optical axes of the optics for guiding an optical beam emitted from the light source to the first reflecting surface, the transfer optics, and the scanning optics may be located in the sub-scanning plane including the rotating axis of the rotating polygonal mirror.

An optical scanning apparatus of the invention is of the type in which an optical beam is incident twice on a rotating polygonal mirror. The optical scanning apparatus is constructed such that first and second reflecting surfaces of the rotating polygonal mirror are oppositely disposed with respect to the rotating axis of the polygonal mirror while being parallel to each other, an optical beam is obliquely incident on the first and second reflecting surfaces of the polygonal mirror, and the first reflecting surface, the second reflecting surface and a surface to be scanned are substantially conjugated to one another. With such a construction, correction is made of a shift of a scanning line in the sub-scanning direction, which arises from the shifts of the first and second reflecting surfaces that are caused by an offset of the rotating axis of the polygonal mirror from the rotating axis of a motor, and a picture is faithfully reproduced without any irregularity.

DETAILED DESCRIPTION OF THE INVENTION

Figure 1:
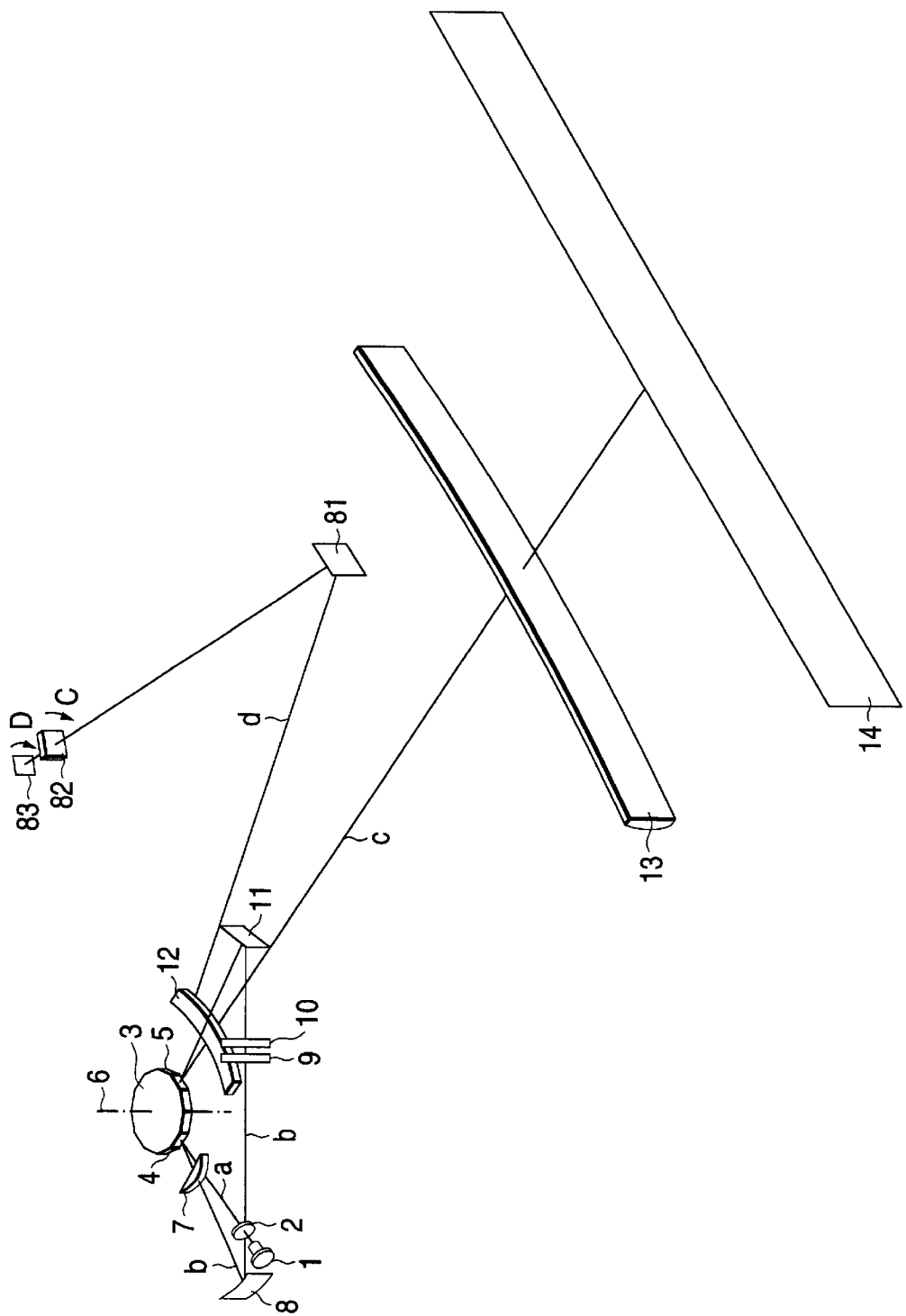
FIG. 1 is a perspective view showing the layout of an optical scanning apparatus according to a first embodiment of the invention.

Embodiments of the invention will now be described with reference to the accompanying drawings. FIG. 1 is a perspective view showing the layout of an optical scanning apparatus according to a first embodiment of the invention. The following description assumes the use of a rotating polygonal mirror as a scanner and a direction perpendicular to the rotating axis of the polygonal mirror is hereunder referred to as the "main scanning direction" and a direction parallel to that rotating axis is referred to as the "sub-scanning direction". The optics provided between a light source 1 and a first reflecting surface of the rotating polygonal mirror for effecting the first deflection of an optical beam is hereunder referred to as "shaping optics"; the optics provided between said first reflecting surface and a second reflecting surface of the polygonal mirror for effecting the second deflection of the optical beam is referred to as "transfer optics"; the optics provided between said second reflecting surface and the surface to be scanned is referred to as "scanning optics"; and the deflection which involves allowing an optical beam to be incident twice on the same scanner is referred to as "dual deflection".

Referring to FIG. 1, a semiconductor laser 1 as a light source emits an optical beam a, which is shaped by passage through a first shaping lens 2 and incident on a first reflecting surface 4 of a rotating polygonal mirror 3 (scanner) from below at an angle in the sub-scanning direction, whereby it is subjected to the first deflection. An optical beam b is reflected from the first reflecting surface 4 upwards at an angle in the sub-scanning direction, passed through a first transfer lens 7, reflected by a first transfer mirror 8, passed through a second transfer lens 9 and a third transfer lens 10, reflected by a second transfer mirror 11, and incident on a second reflecting surface 5 of the rotating polygonal mirror 3 from above at an angle in the sub-scanning direction, whereby it is subjected to the second deflection. An optical beam c is deflected from the second reflecting surface 5 downwards at an angle in the sub-scanning direction and passed through a first scanning lens 12 and a plastic second scanning lens 13, whereby it is focused to form a beam spot on a surface 14 to scan it. Indicated by d is an optical beam carrying a horizontal sync signal. Optical beam d is separated at an end of the range of scanning with the optical beam c such that it is passed through a horizontal synchronous mirror 81 and a horizontal synchronous lens 82 to be supplied into a horizontal synchronous sensor 83.

The shaping lens 2 and the first transfer lens 7 are each an aspheric lens which is symmetric with respect to the optical axis; the second transfer lens 9 is a cylindrical lens having power only in the sub-scanning direction; the third transfer lens 10 is a cylindrical lens having power only in the main scanning direction; the first scanning lens 12 is a spherical lens; the second scanning lens 13 is a plastic lens of which the entrance surface is concave with a large radius of curvature in the main scanning direction but convex with a small radius of curvature in the sub-scanning direction. The entrance surface of the second scanning lens 13 is formed by rotating the sectional profile curve in the main scanning direction about an axis parallel to the main scanning direction which is closer to the surface 14 than said entrance surface. A surface of this type may be designated a "saddle-shaped toric" surface. The exit surface of the second scanning lens 13 is convex with a large radius of curvature in the main scanning direction and at the same time it is nonarcuate (so designated since it is aspheric only in the main scanning direction). This exit surface has a linear sectional profile in the sub-scanning direction. A surface of this nature may be designated a "nonarcuate cylindrical" surface. The second scanning lens 13 is an anamorphic lens having a greater refractive power in the sub-scanning direction that in the main scanning direction, with the refractive power in the sub-scanning direction being positive.

The optical beams a and b are incident on the first and second reflecting surfaces 4 and 5, respectively, of the rotating polygonal mirror 3 and their incidence is adapted to be normal to the respective reflecting surfaces in the main scanning direction. With a conventional optical scanning apparatus which deflects an optical beam only once by a reflecting surface of the rotating polygonal mirror, the size of an incident beam on a reflecting surface of the polygonal mirror in the main scanning direction is greater than in the case of an optical scanning apparatus of a dual deflection type which is contemplated by the present invention. In order to ensure that the entire part of the beam will always lie within the same reflecting surface if the polygonal mirror rotates through the angle required to attain the necessary scanning angle, the size of the individual reflecting surfaces must be greater than a certain value but then the rotating polygonal mirror cannot be adapted to have a satisfactorily large number of reflecting surfaces. In contrast, the optical scanning apparatus of a dual deflection type according to the invention is adapted to be such that an optical beam is focused, in both the main and sub-scanning directions, on or near the first reflecting surface 4 which performs the first deflection of the optical beam and the size of the optical beam a on the first reflecting surface 4 is so much smaller than in the case of the conventional optical scanning apparatus of a single deflection type such that even if the first reflecting surface 4 of the polygonal mirror 3 is small in the main scanning direction, the entire part of the optical beam will always lie within the first reflecting surface when the polygonal mirror 3 rotates through the angle required to attain the necessary scanning angle. Therefore, the reflecting surfaces of the rotating polygonal mirror 3 may be small enough to satisfy the requirement for compactness. In the second optical beam deflection, the optical beam b incident on the second reflecting surface 5 of the rotating polygonal mirror 3 is large in the main scanning direction but, at the same time, the beam b and the second reflecting surface will move by the same amount when the polygonal mirror 3 rotates. Hence, the size of the second reflecting surface 5 in the main scanning direction suffices to be the same as that of the incident beam b and, again the second reflecting surface 5 may be small enough to satisfy the requirement for compactness. Since the individual reflecting surfaces of the rotating polygonal mirror 3 can thus be made smaller than in the conventional optical scanning apparatus of a single deflection type, more reflecting surface can be provided and the scan speed can accordingly be increased.

In addition, in order to ensure that the optical beams a and b incident on the first and second reflecting surfaces 4 and 5 of the rotating polygonal mirror 3 are spatially separated from the deflected optical beams b and c, respectively, the optical beams a and b are allowed to be incident on the first and second reflecting surfaces 4 and 5, respectively, at an angle in the sub-scanning direction. This allows the shaping optics (first shaping lens 2) and the transfer optics (consisting of the first, second and third transfer lenses 7, 9 and 10) to be spaced apart in a vertical direction along the rotating axis 6 of the polygonal mirror 3 and so are the transfer optics and the scanning optics (consisting of the first and second scanning lenses 12 and 13). As a result, the respective optical beams a, b and c can be separated to avoid mutual interference, thereby increasing the latitude of choice in selecting the layout of the individual optics.

Specific numerical data for the thus designed optical scanning apparatus are given in Table 1, in which the radii of curvature of an anamorphic surface in the sub-scanning and main scanning directions are designated by rix and riy, respectively. For an aspheric surface, the radius of curvature is indicated by an on-axis value.

TABLE 1

| Si | ri | di | ni | Element |
|---|---|---|---|---|
| S1 | | 7.282450 | | Emission point of semi-conductor laser |
| S2 | ∞ | 2.5 | 1.681456 | Entrance surface of shaping lens |
| S3 | −5.21530 | 49.132686 | | Exit surface of shaping lens |
| S4 | ∞ | 18 | | First reflecting surface |
| S5 | ∞ | 5 | 1.794651 | Entrance surface of first transfer lens |
| S6 | −15.21883 | 58.010156 | | Exit surface of first transfer lens |
| S7 | ∞ | 88.630503 | | First transfer mirror |
| S8 | r8x 37.25700 r8y ∞ | 3 | 1.513901 | Entrance surface of second transfer lens |
| S9 | ∞ | 3 | | Exit surface of second transfer lens |
| S10 | ∞ | 3 | 1.513901 | Entrance surface of third transfer lens |
| S11 | r11x ∞ r11y −89.17001 | 40.349185 | | Exit surface of third transfer lens |
| S12 | ∞ | 81.010156 | | Second transfer mirror |
| S13 | ∞ | 23.174939 | | Second reflecting surface |
| 514 | −72.17772 | 9 | 1.513901 | Entrance surface of first scanning lens |
| S15 | −53.03585 | 248.825061 | | Exit surface of first scanning lens |
| S16 | r16x 37.04770 r16y −1148.78167 | 4 | 1.488993 | Entrance surface of second transfer lens |
| S17 | r17x ∞ r17y −4146.00073 | 100 | | Exit surface of second transfer lens |

The aspheric surfaces of the first shaping lens 2 and the first transfer lens 7 can be expressed by:

$$z_i = \frac{y^2/r_{iy}}{1+\sqrt{1-(K_i+1)(y/r_{iy})^2}} + A_i y^4 + B_i y^6 + C_i y^8 + D_i y^{10} \quad (1)$$

The aspheric coefficients take the values listed in Table 2 below.

TABLE 2

| | S3 | S6 | S17y |
|---|---|---|---|
| R | −5.21530 | −15.21883 | −4146.00073 |
| K | −0.964391 | −1.000017 | −146.925818 |
| A | −2.53025e−4 | −1.52209e−5 | −1.78144e−8 |
| B | −7.68010e−7 | 0 | 0 |
| C | 7.02682e−9 | 0 | 0 |
| D | 1.45140e−10 | 0 | 0 |

In the example shown in Table 1, the angle through which the polygonal mirror 3 rotates from the start of one scan cycle to the end of it is 2ω=24°. The angle α at which the optical beam a is incident on the first reflecting surface 4 of the rotating polygonal mirror 3 and the angle β at which the optical beam b is incident on the second reflecting surface 5 are each 6° as measured in the sub-scanning direction. The polygonal mirror 3 has twelve reflecting surfaces; the inscribed circle of the polygonal mirror 3 has a radius of 17 mm; the first reflecting surface 4 forms an angle of 90° with the second reflecting surface 5; the laser light which is an optical beam issued from the light source 1 has a wavelength of 670 nm.

The embodiment of the invention under consideration is adapted to be such that in the sub-scanning direction, the optical beam a is focused on or near the first reflecting surface 4 of the polygonal mirror 3 and also on or near the second reflecting surface 5. In other words, the first and second reflecting surfaces 4 and 5 are substantially conjugated to each other in terms of geometrical optics by means of the transfer optics (consisting of the first, second and third transfer lenses 7, 9 and 10). In addition, the second reflecting surface 5 and the surface 14 to be scanned are substantially conjugated to each other by means of the scanning optics (consisting of the first and second scanning lenses 12 and 13). As a result, the tilt of the first and second reflecting surfaces 4 and 5 of the polygonal mirror 3 can be effectively corrected and, in addition, a constant scanning position is assured in the sub-scanning direction. This point is discussed below in greater detail with reference to drawings.

Figure 2:
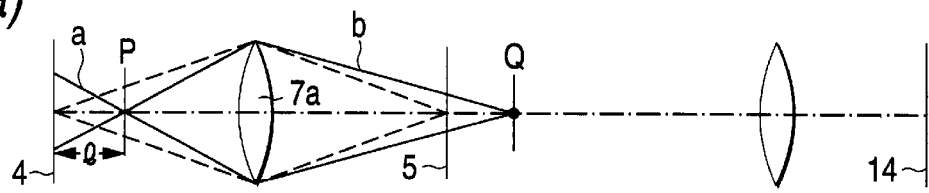
FIGS. 2(a) to 2(e) are exploded views showing how the scanning position can be adjusted to be constant in spite of tilting in the sub-scanning direction.
Figure 2:
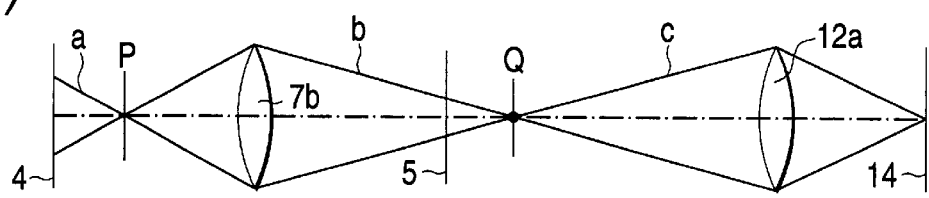
Figure 2:
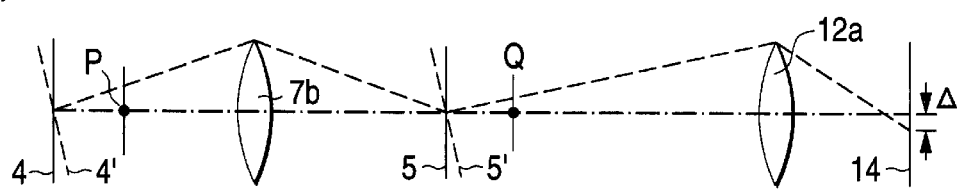
Figure 2:
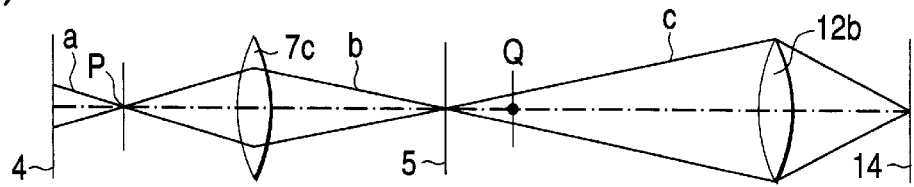
Figure 2:
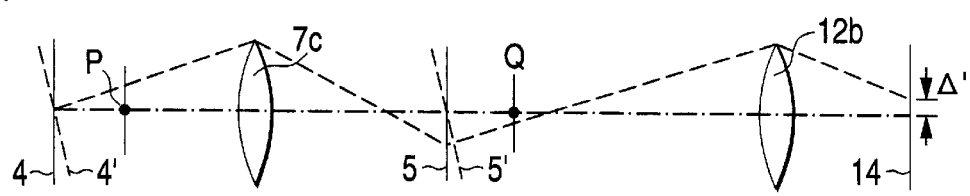

FIGS. 2($a$) to 2($e$) are exploded views of a section in the sub-scanning direction between the first and second reflecting surfaces 4 and 5 of the rotating polygonal mirror 3. In the embodiment of the invention under consideration, imaging point P on or near the first reflecting surface 4 is, strictly speaking, slightly offset from the first reflecting surface to lie between the first reflecting surface 4 and the first transfer lens 7$a$ (see FIG. 2($a$)). The following description assumes that the optical beam a from the light source 1 is adapted to be focused at this imaging point P in both the main and sub-scanning directions.

If the departure l of the imaging point P from the first reflecting surface 4 of the polygonal mirror 3 is unduly great, the offset of the scanning line on the surface to be scanned 14 due to the tilting of the first reflecting surface 4 will increase to an unacceptable level. Conversely, if the departure l is small, the optical beam a on the first reflecting surface 4 is so small that it will be scattered by any scratches or dust particles on the first reflecting surface 4 and will be unable to form a small enough beam spot on the surface 14. As a further problem, the optical beam a is blocked by the scratches or dust particles and the optical output power will decrease. Therefore, an appropriate value exists for the departure l of the imaging point P. In the case under consideration, the departure l is assumed to be 11 mm. Since the optical pathlength of the transfer optics from the first reflecting surface 4 of the polygonal mirror 3 to the second reflecting surface 5 is 300 mm, the departure l is sufficiently small to correct the tilting of the first and second reflecting surfaces 4 and 5 effectively.

This point is elaborated below on the basis of specific calculations. As already mentioned, the imaging point P created by the shaping optics is offset from the first reflecting surface 4 of the polygonal mirror 3 by l=11 mm. The transfer optics has an optical magnification of $\beta d=1.57$ in the sub-scanning direction and the scanning optics has an optical magnification of $\beta s=0.418$ in the sub-scanning direction. If the first reflecting surface 4 of the polygonal mirror 3 tilts by $\theta=3e-4$ (rad)=0.0172°, the deviation of the scanning line on the surface 14 as calculated on the above conditions is $\delta=2 \cdot l \cdot \theta \cdot \beta d \cdot \beta s=0.00433$ (mm), which is not a problem in practice. In the embodiment of the invention under consideration, the diameter of the optical beam a incident on the first reflecting surface 4 is 0.84 mm in the main scanning direction and 0.13 mm in the sub-scanning direction. Hence, the optical beam a on the first reflecting surface 4 is sufficiently large to be immune to any scratches or dust particles that may develop on that surface. Generally speaking, the optical beam is not susceptible to the scratches or dust particles on the reflecting surfaces of the rotating polygonal mirror 3 if its diameter is about 0.5 mm in either the main or sub-scanning direction or in both directions.

In the embodiment of the invention under discussion, the imaging point Q on or near the second reflecting surface 5 is located just on the second reflecting surface 5. It should, however, be noted that the effectiveness of the invention is not lost even if the imaging point Q is slightly offset from the second reflecting surface 5, as is further elaborated below. The transfer optics 7$a$ shown in FIG. 2($a$) is a virtual entity having a refractive power that renders the first reflecting surface 4 to be conjugated to the second reflecting surface 5. Let's assume that the optical beam a which is focused at point P offset by l from the first reflecting surface 4 passes through the virtual transfer optics 7$a$ to be focused again as an optical beam b at point Q on or near the second reflecting surface 5. In practice, the imaging point on or near the second reflecting surface 5 desirably lies between the second reflecting surface 5 (inclusive) and the imaging point Q (inclusive).

An explanation is first made of the case where the optical beam b is focused at either end of the range between the second reflecting surface 5 and the imaging point Q. FIG. 2($b$) shows the case where the transfer optics 7$b$ renders the first reflecting surface 4 to be completely conjugated to the second reflecting surface 5 such that the point of imaging by the transfer optics 7$b$ coincides with Q but where the subsequent scanning optics 12$a$ renders the second reflecting surface 5 to be slightly unconjugated to the surface to be scanned 14 such that the optical beam c is focused on the surface 14. In this case, the tilt 4' of the first reflecting surface 4 is completely corrected but an offset $\Delta$ occurs on the surface 14 due to the tilt 5' of the second reflecting surface 5 (see FIG. 2($c$)). FIG. 2($d$) shows the case where the transfer optics 7$c$ renders the first reflecting surface 4 to be slightly unconjugated to the second reflecting surface 5 such that the point of imaging by the transfer optics 7$c$ coincides with the second reflecting surface 5 but where the subsequent scanning optics 12$b$ renders the second reflecting surface 5 to be completely conjugated to the surface to be scanned 14 such that the optical beam b and, hence, optical beam c is focused on the surface 14. In this case, the tilt 5' of the second reflecting surface 5 is completely corrected whereas an offset $\Delta'$ occurs on the surface 14 due to the tilt 4' of the first reflecting surface. In FIGS. 2($a$), 2($c$) and 2($e$), the principal ray is indicated by a dashed line. As will be understood from the above explanation, if the imaging point on or near the second reflecting surface 5 lies between the second reflecting surface 5 (inclusive) and the imaging point Q (inclusive), the offset due to the tilt 4' of the first reflecting surface 4 is canceled by the offset due to the tilt 5' of the second reflecting surface 5 provided that these tilts are in opposite directions, and the resulting positional offset in the scanning line on the surface 14 becomes small. Even if the tilts are in the same direction, the offset is either comparable to or smaller than in the case shown in FIGS. 2($c$) and 2($e$) and it will by no means become greater.

We will now explain the composition of the transfer optics. The transfer optics should perform two functions in the main scanning direction of an optical beam; one is to collimate the optical beam a focused at point P on or near the first reflecting surface 4 and then direct the collimated beam toward the second reflecting surface 5; the other function is to ensure that as the polygonal mirror 3 rotates, the optical beam b will move on the second reflecting surface 5 in pace with the movement of the latter.

Figure 3:
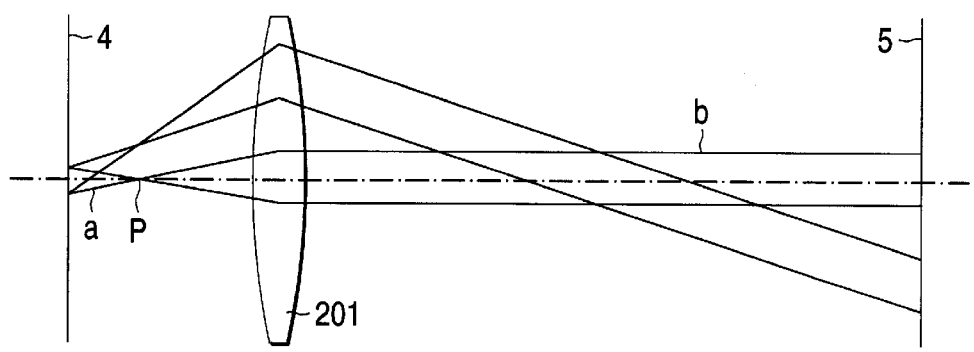
FIG. 3 is an exploded view of single-lens-element transfer optics in the main scanning direction.
Figure 4:
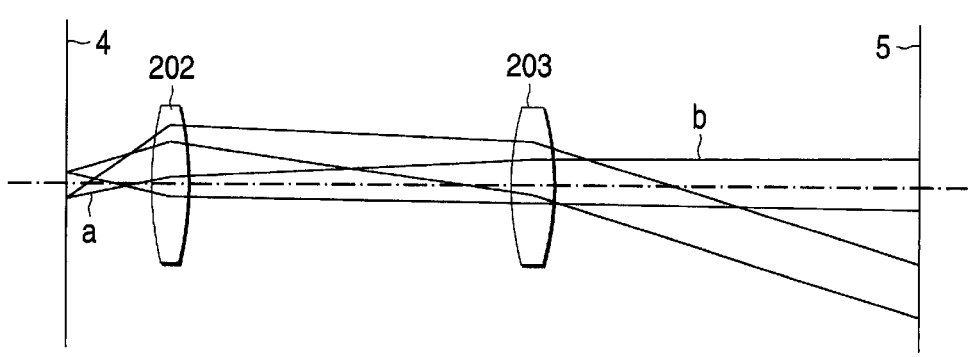
FIG. 4 is an exploded view of two-lens-element transfer optics in the main scanning direction.

FIG. 3 is a sectional view showing an example of the transfer optics as it is exploded in the main scanning direction. This is not a drawing showing an embodiment of the invention; however, in order for the transfer optics to perform its functions in the main scanning direction of an optical beam, a single lens element 201 will suffice paraxially as shown in FIG. 3. However, composing the transfer optics of the single lens element 201 is not very practical since the aperture of the lens 201 is unduly large. On the other hand, if the transfer optics is composed of two lens elements 202 and 203 as shown in FIG. 4, the aperture of the lens can be reduced to a practical level. Therefore, in order for the transfer optics to perform its functions in the main scanning direction, it is desirably composed of at least two lens elements each having a refractive power in the main scanning direction.

Figure 5:
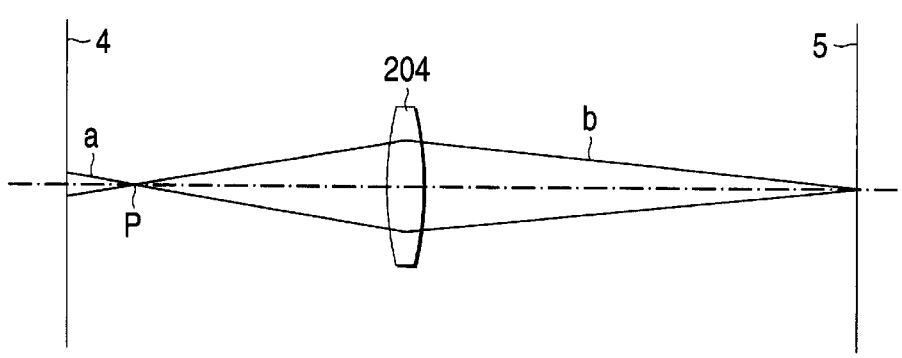
FIG. 5 is an exploded view of the single-lens-element transfer optics in the sub-scanning direction.

In the sub-scanning direction, the transfer optics need perform only one function, i.e., ensuring that the optical beam a focused at imaging point P on or near the first reflecting surface 4 is refocused as optical beam b on or near the second reflecting surface 5. FIG. 5 is a sectional view showing an example of the transfer optics as it is exploded in the sub-scanting direction. In order for the transfer optics to perform its function in the sub-scanning direction, a single lens element 204 will suffice.

From the above discussion, one may safely conclude that in order for the transfer optics to perform the intended functions in both the main and sub-scanning directions, it is preferably composed of three lens elements. If a lens element having a refractive power in the sub-scanning direction is cemented to a lens element having a refractive power in the main scanning direction, the number of lens elements required to compose the transfer optics can be reduced to two. In the embodiment of the invention under consideration, the transfer optics is composed of three lens elements, first transfer lens 7, second transfer lens 9 and third transfer lens 10.

Figure 6:
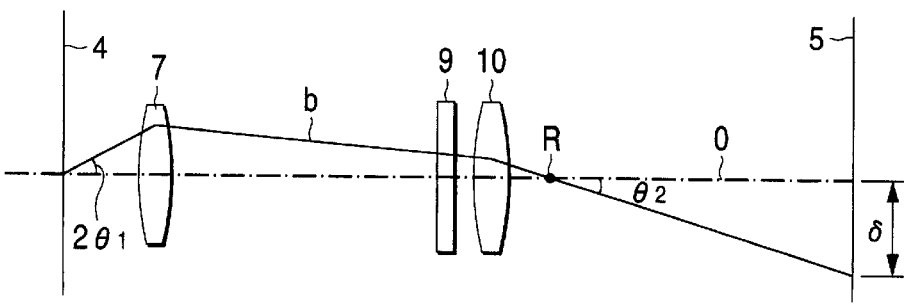
FIG. 6 is an exploded view of three-lens-element transfer optics in the main scanning direction which illustrates how an optical beam crosses the optical axis.

We next describe the crossing of an optical beam with the optical axis with reference to FIG. 6, which is a sectional beam of the transfer optics in the first embodiment of the invention as it is exploded in the main scanning direction along the optical path including the first transfer mirror 8 and the second transfer mirror 11 (see FIG. 1). The polygonal mirror 3 rotates about the illustrated point by an angle of $\theta 1$ during the scan period. Hence, the optical beam a is deflected by twice the value of angle $\theta$ on the first reflecting surface 4 of the rotating polygonal mirror 3. The deflected optical beam a passes through the transfer optics consisting of the first transfer lens 7, the second transfer lens 9 and the third transfer lens 10 to be deflected by an angle of $\theta 2$. The deflected optical beam b emerging from the third transfer lens 10 crosses the optical axis O at point R. Thereafter, the optical beam b is incident on the second reflecting surface 5 of the rotating polygonal mirror 3 at such a point that the distance from the optical axis O is equal to $\delta$ by which the reflecting surface moves in response to the rotation of the polygonal mirror 3 by angle $\theta 1$.

Since the optical beam b has been deflected in such a direction that the angle of its incidence on the second reflecting surface 5 of the polygonal mirror 3 is increased by angle $\theta 2$, the optical beam c reflected from the second reflecting surface 5 will be deflected by $2 \cdot \theta 1 + \theta 2$. In other wards, the angle of beam deflection can be increased by $\theta 2$ compared to the case of using the conventional optical scanning apparatus which allowing an optical beam to be incident only once for deflection by the rotating polygonal mirror. Hence, the angle of deflection of optical beam c at the second reflecting surface 5 can be increased by $2 \cdot \theta 1 + \theta 2$ by ensuring that the optical beam b scanning either end of the scan range is allowed to cross the optical axis O by means of the transfer optics.

Figure 7:
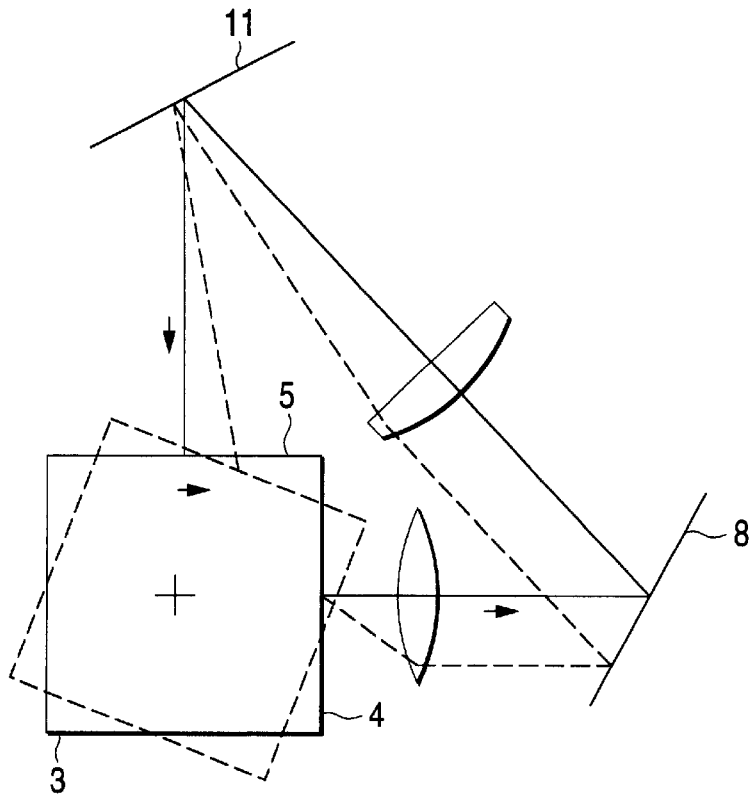
FIGS. 7(a) and 7(b) are plan views illustrating the relationship between the number of mirrors in the transfer optics and the number of optical beam crossings with the optical axis.
Figure 7:
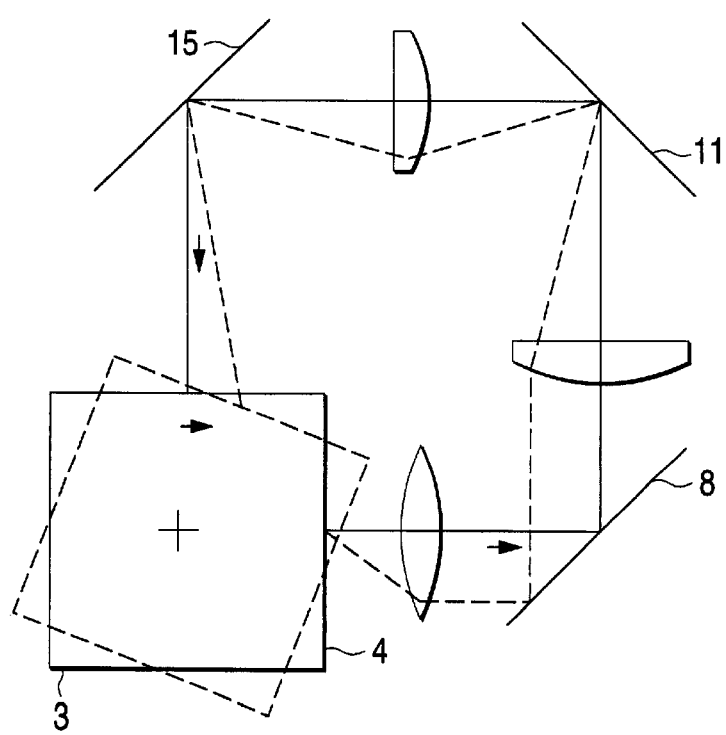
Figure 8:
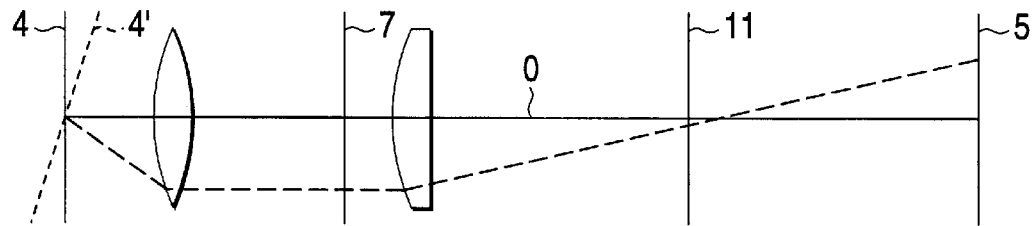
FIGS. 8(a) and 8(b) are exploded views in the main scanning direction of the transfer optics shown in FIGS. 7(a) and 7(b), respectively.
Figure 8:
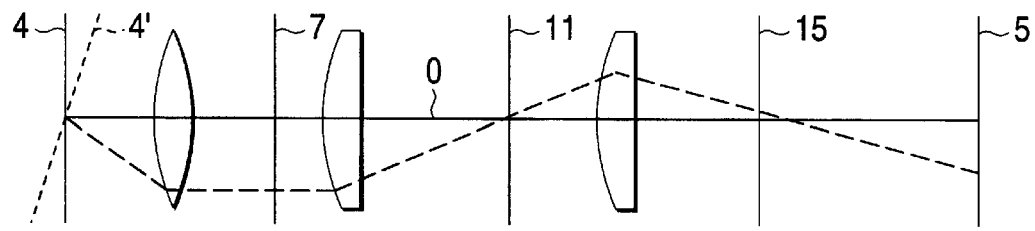

In the next place, we will discuss the relationship between the number of mirrors in the transfer optics and the number of optical beam crossings with the optical axis with reference to FIGS. 7 and 8. The number of mirrors in the transfer optics minus the number by which an end scanning optical beam crosses the optical axis always takes an odd value. The composition shown in FIG. 7(a) is within the scope of the invention in terms of the number of mirrors and that of beam crossings with the optical axis. The transfer optics consists of two mirrors, the first transfer mirror 8 and the second transfer mirror 11. As shown exploded in FIG. 8(a), the optical beam crosses the optical axis O once (see the principal way indicated by a dashed line). The transfer optics shown in FIG. 7(b) consists of three mirrors, the first transfer mirror 8, the second transfer mirror 11 and the third transfer mirror 15. As shown exploded in FIG. 8(b), the optical beam crosses the optical axis O twice. Thus, in the embodiment of the invention shown in FIG. 7(a), the optical beam b moves on the second reflecting surface 5 in response to the rotation of the polygonal mirror 3 for the second deflection in the same direction by the same amount as the second reflecting surface 5, with the result that the optical beam b incident on the second reflecting surface 5 can move in pace with said surface without going beyond its limits.

Figure 9:
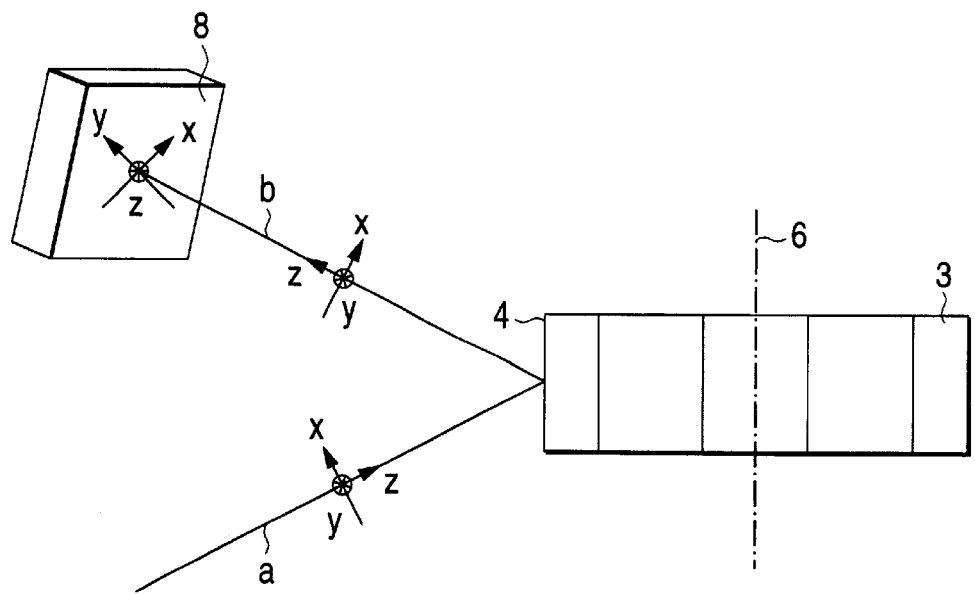
FIG. 9 is a side view showing how an optical beam rotates during passage through the transfer optics.
Figure 10:
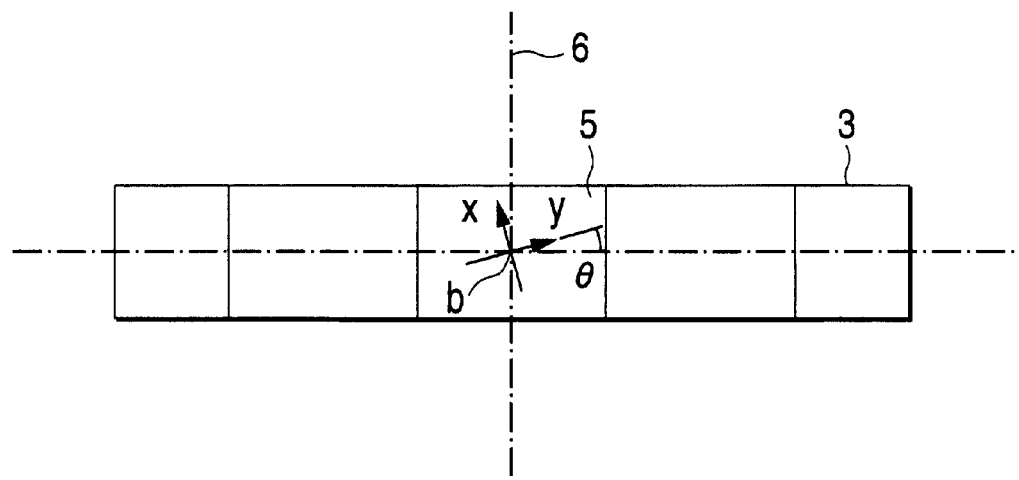
FIG. 10 is a side view of a rotating polygonal mirror for illustrating the rotation of an optical beam.

Another characterizing feature of the invention is that the rotation of an optical beam that occurs in the transfer optics can be effectively corrected and this will be described below specifically with reference to FIGS. 9 to 15. The optical beam a from the light source 1 is passed through the shaping optics to be incident on the first reflecting surface 4 of the rotating polygonal mirror 3 from below at an angle in the sub-scanning direction and the first beam deflection is performed. The optical path between the first beam deflection and the second beam (b) deflection has an angle in the sub-scanning direction and, hence, the coordinate system of the optical beam b on the second reflecting surface 5 will rotate. Stated more specifically, the optical beam a having a coordinate system, with the main scanning direction as the y coordinate axis, the sub-scanning direction as the x coordinate axis and the optical axis as the z coordinate axis, is reflected by the first reflecting surface 4 at an angle in the sub-scanning direction and further reflected by the first transfer mirror 8, whereupon the coordinate system of the reflected beam b will rotate as shown in FIG. 9. The optical beam b is further reflected by the second transfer mirror 11 and when it is incident on the second reflecting surface 5 of the polygonal rotating mirror 3, its coordinate system will rotate as shown in FIG. 10. In other words, the y- and x-directions of the optical beam b will offset by a specified angle $\theta$ from the main and sub-scanning directions, respectively.

Figure 11:
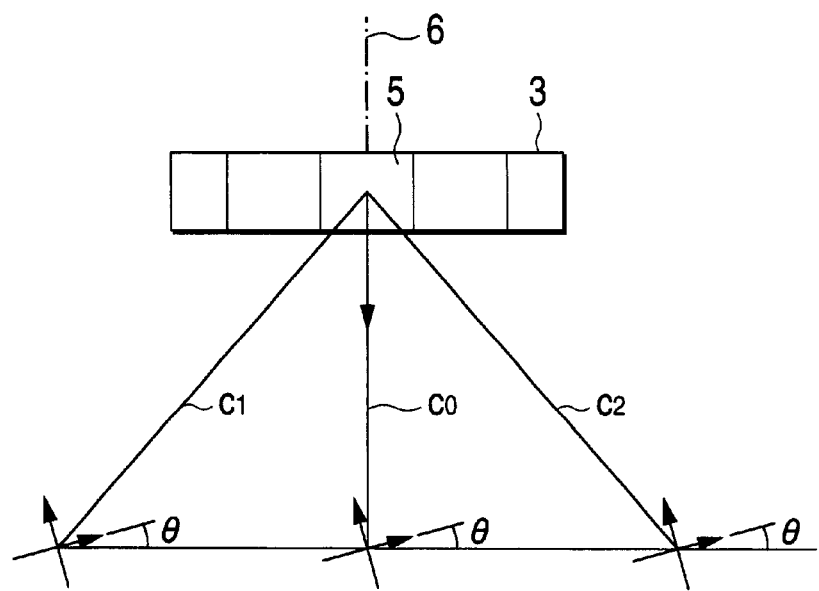
FIG. 11 is another side view of the rotating polygonal mirror for illustrating the rotation of an optical beam.
Figure 12:
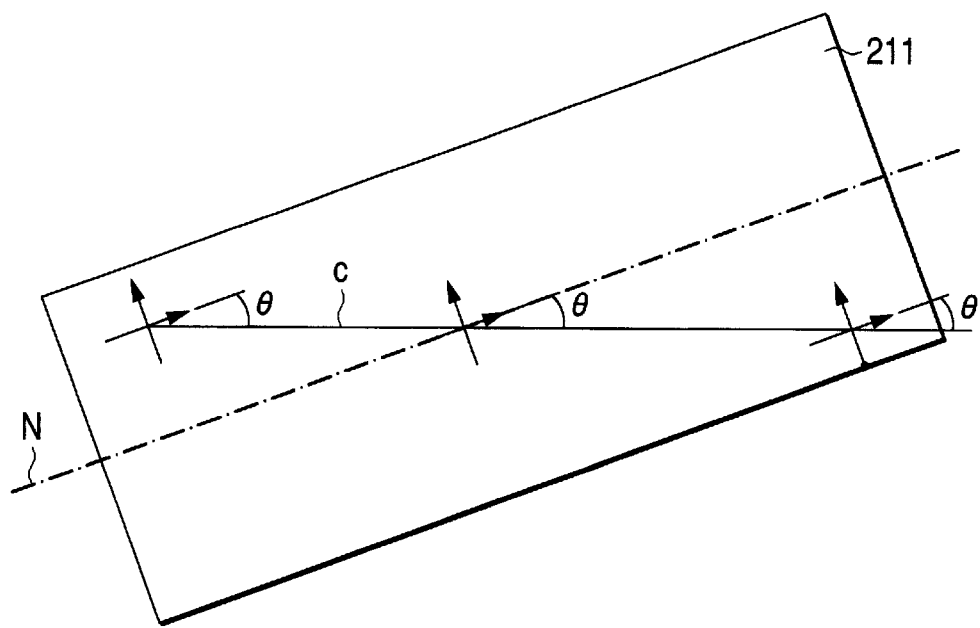
FIG. 12 is a front view of an inclined cylindrical lens.

When the optical beam b incident on the second reflecting surface 5 of the rotating polygonal mirror 3 undergoes the second reflection to produce an optical beam c, the coordinate system of the deflected optical beam c is always inclined by angle $\theta$ as shown in FIG. 11. The optical beam c inclined by angle $\theta$ will not be correctly focused at a single point on the surface to be scanned 14 even if it is passed through anamorphic scanning optics and only a disfigured beam spot will form. If a cylindrical lens 211 (see FIG. 12) having a refractive power in the sub-scanning direction is provided in such a way that its central axis forms an angle θ with the optical beam c, the imaging performance of the optical beam c on the surface 14 is improved but, on the other hand, it is necessary to increase the effective aperture of the cylindrical lens 211 in the sub-scanning direction. As a further problem, the scanning line on the surface 14 will be inclined in proportion to the inclination of the cylindrical lens 211.

Figure 13:
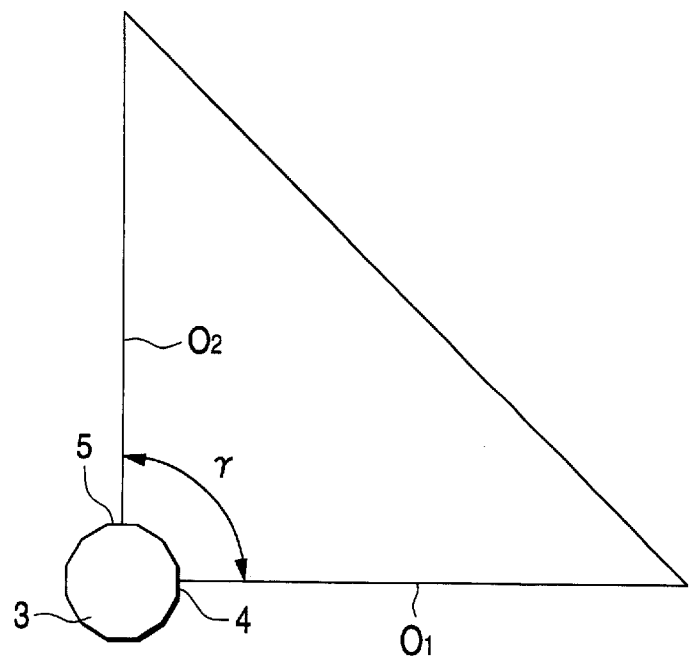
FIG. 13 shows the optical path of the transfer optics as it is projected in the main scanning direction.
Figure 14:
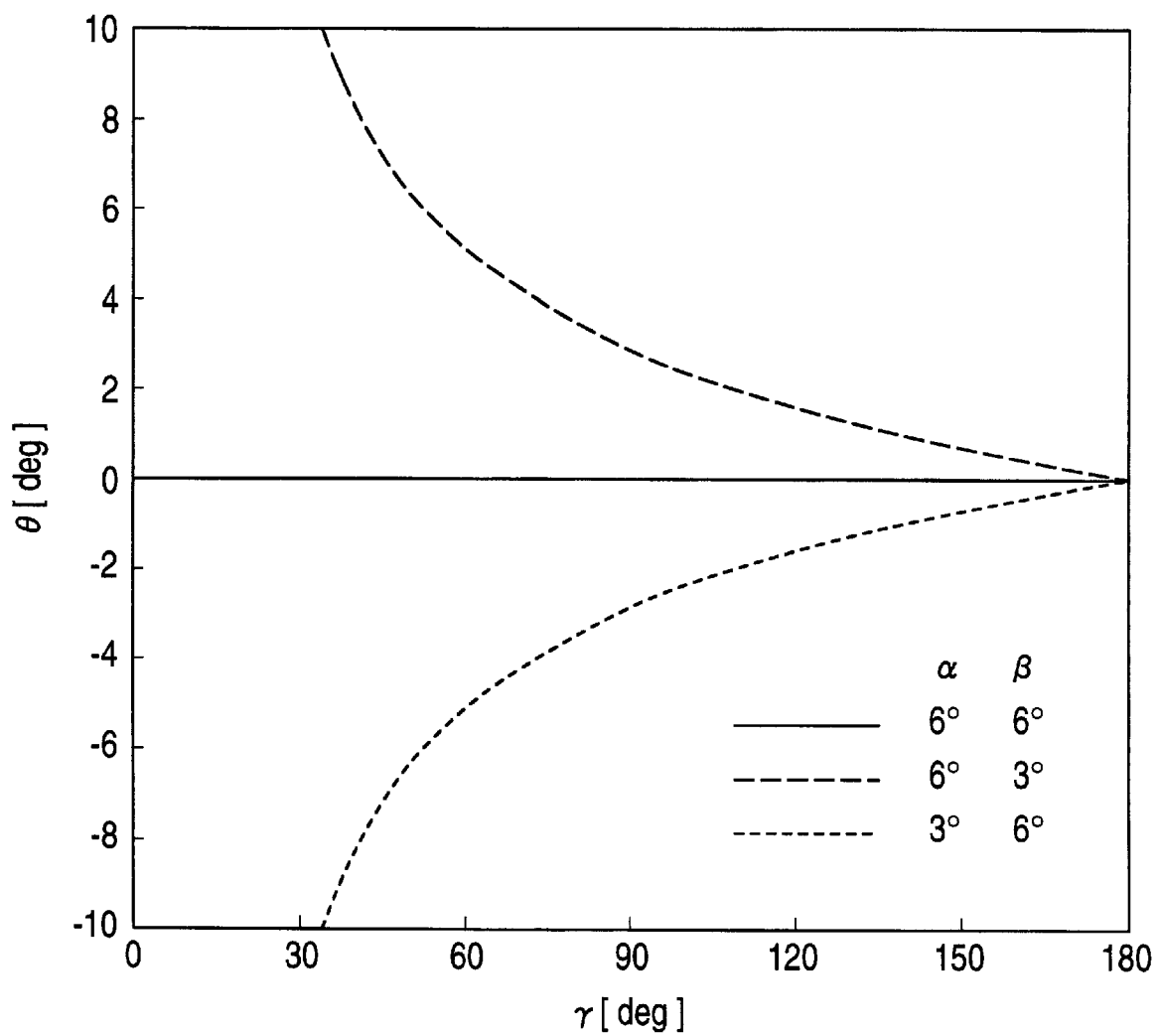
FIG. 14 is a graph showing how the angle the first or second reflecting surface of a scanner forms with the optical axis is related to the angle of rotation of the scanner.

FIG. 13 shows the optical path of the transfer optics as it is projected in the main scanning direction. Let assume that the optical axis $O_1$ of the optical beam that has been subjected to the first deflection by the first reflecting surface 4 of the rotating polygonal mirror 3 forms an angle γ with the optical axis $O_2$ of the beam that is yet to undergo the second reflection by the second reflecting surface 5. Also assume that the optical beams a and b are incident on the first and second reflecting surfaces 4 and 5 at respective angles α and β. FIG. 14 shows the results of calculation of angle θ at which the optical beam b is rotated. The angle θ is positive when the rotation is counterclockwise. The data shown in FIG. 14 assumes the following conditions:

(1) The optical path from the first reflecting surface 4 to the second reflecting surface 5 is sufficiently greater than the size of the rotating polygonal mirror 3;

(2) The optical path from the first reflecting surface 4 to the second reflecting surface 5 is symmetrical with respect to the line that bisects the angle between the optical axis $O_1$ of the beam that has been subjected to the first deflection and the optical axis $O_2$ of the beam that is yet to undergo the second deflection.

As shown in FIG. 14, the angle of rotation θ is zero in two cases, one where the angle of incidence α on the first reflecting surface 4 in the sub-scanning direction is equal to the angle of incidence β on the second reflecting surface 5, and the other case where γ=180°. If condition (1) is not satisfied (i.e., the size of the rotating polygonal mirror 3 is not negligibly smaller than the optical path from the first reflecting surface 4 to the second reflecting surface 5), the value of θ is more or less dependent on the size of the rotating polygonal mirror 3 if α is different from β. If condition (2) is not satisfied (i.e., the optical path from the first reflecting surface 4 to the second reflecting surface 5 is not symmetrical with respect to the bisector of the angle between $O_1$ and $O_2$), the value of θ will also vary to some extent if α is different from β. It should, however, be noted that θ is always zero if α is equal to β.

Figure 15:
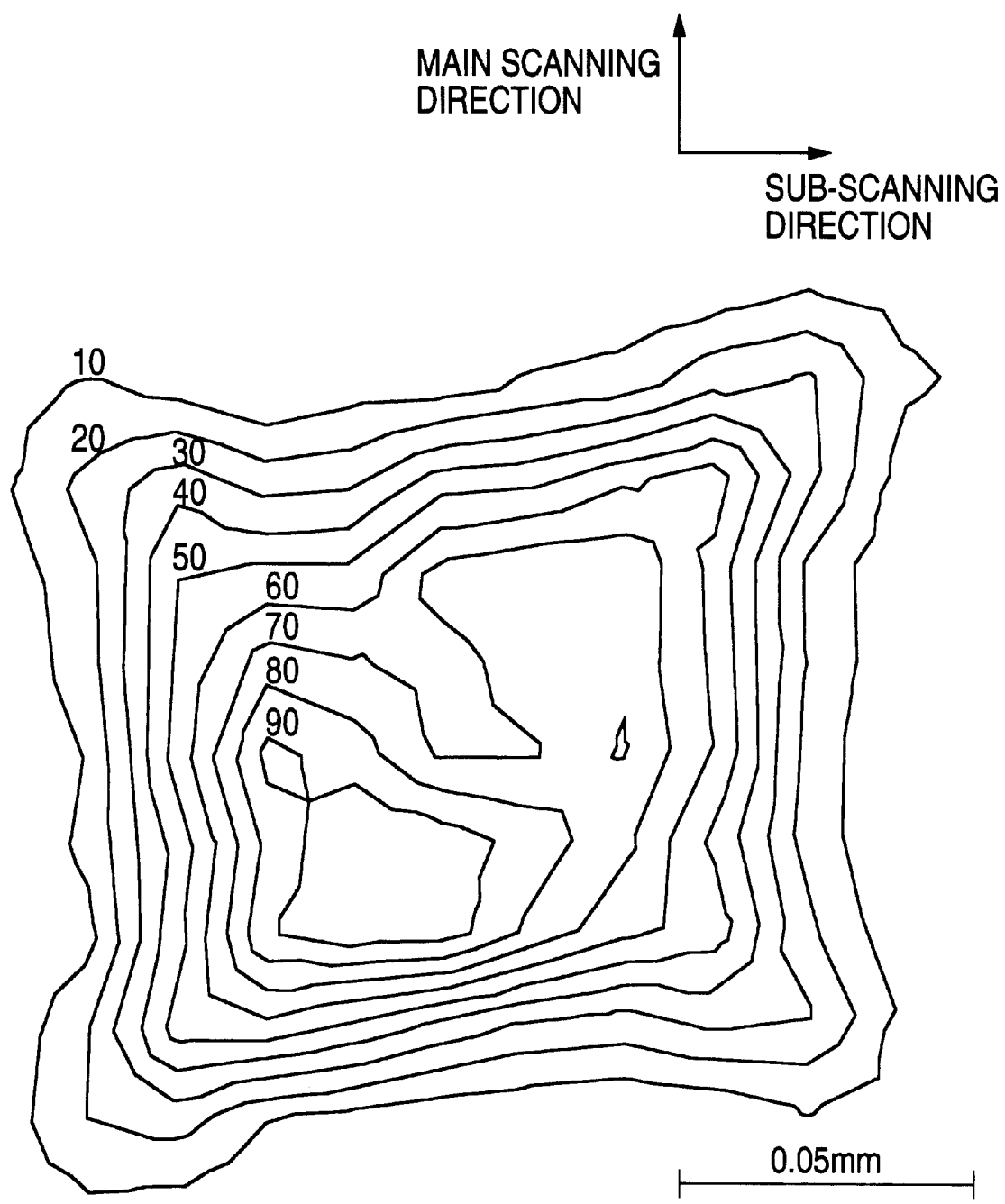
FIG. 15 is a chart of a disfigured beam spot representing lines each connecting points having the same intensity of light.

If, in the embodiment of the invention under consideration, the angles of incidence α and β of the optical beams a and b on the first and second reflecting surfaces 4 and 5 are changed to be such that α=3° and β=6°, the optical beam c scanning either end of the scan range will become disfigured as shown in FIG. 15, which is a chart of the beam spot representing lines each connecting points having the same intensity of light. It should be noted that the disfiguring of a beam spot depends on the beam spot size and the smaller the beam spot, the more disfigured it will be.

Figure 16:
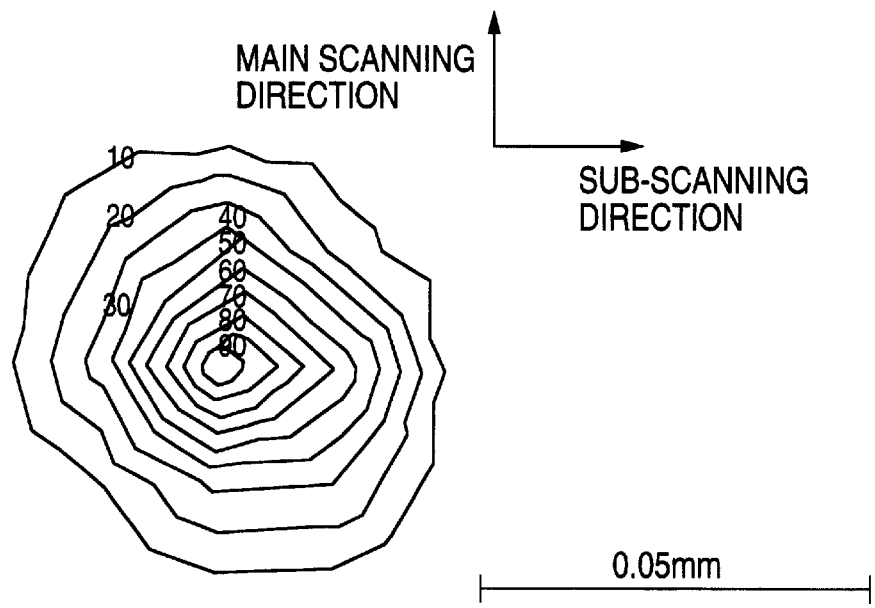
FIG. 16 is a chart of satisfactory beam spot representing lines each connecting points having the same intensity of light.

On the other hand, if α=β, θ=0° as shown in FIG. 14, producing a beam spot of a satisfactory shape. In the embodiment of the invention under consideration, α=β=6° and the beam spots formed by the optical beams c1 and c2 which scan the ends of the scan range have a satisfactory shape as shown in FIG. 16. If γ=180°, θ=0°, so in this case, too, a beam spot of a satisfactory shape will be formed.

Figure 25:
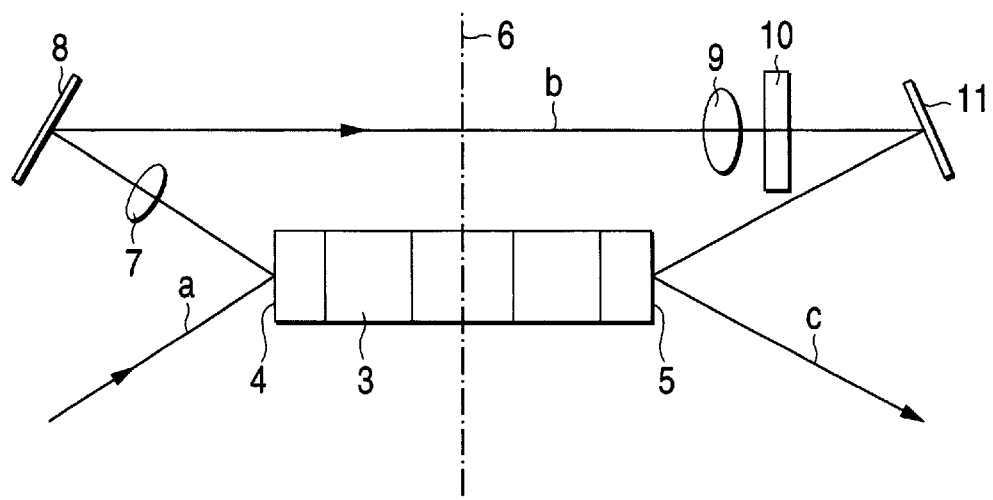
FIG. 25 is a side view showing the optical path in the modified optical scanning apparatus.
Figure 26:
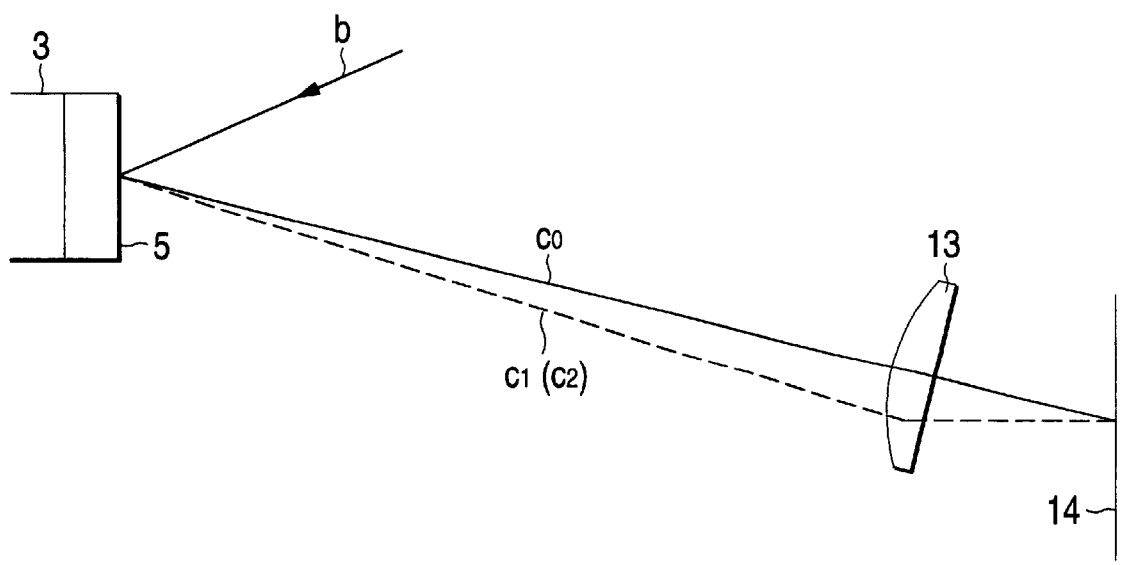
FIG. 26 illustrates how the scanning line is corrected for curvature.

We then discuss the case of γ=180°, where the first reflecting surface 4 is parallel to the second reflecting surface 5. Referring to FIG. 13, γ is the angle the optical axis $O_1$ forms with the optical axis $O_2$ and this is equal to the angle the first reflecting surface 4 forms with the second reflecting surface 5. In the embodiment of the invention under discussion, γ=90° and, in a different case of the invention where the first reflecting surface 4 is parallel to the second reflecting surface 5, γ=180° and according to the graph shown in FIG. 14, θ=0°. The optical path for this case is shown in FIG. 25; an optical beam b deflected upward by the first reflecting surface 4 of the rotating polygonal mirror 3 is reflected by the first transfer mirror 8 to pass over the rotating polygonal mirror 3 to cross its rotating axis 6; the beam is thereafter reflected by the second transfer mirror 11 to be incident on the second reflecting surface 5 of the polygonal mirror 3 from above, whereupon it is deflected downward to produce an optical beam c.

Figure 17:
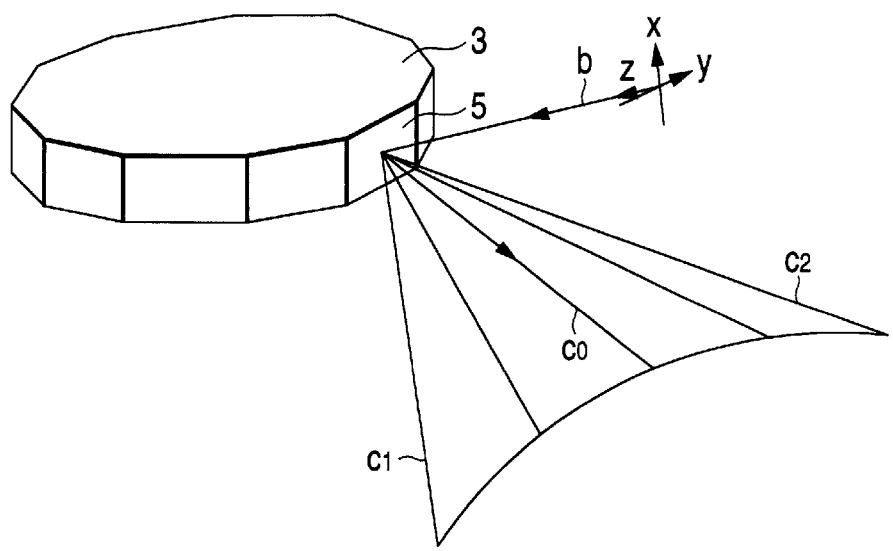
FIG. 17(a) is a perspective view illustrating how an optical beam is rotated as a result of deflection.
FIG. 17(b) illustrates the changes in the coordinate system of the optical beam.
Figure 17:
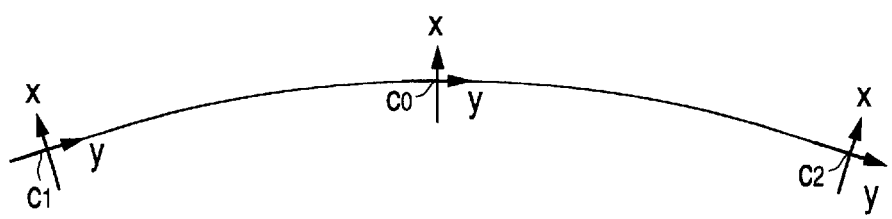

The method of correcting the rotation of an optical beam due to deflection will now be described with reference to FIGS. 17 to 22. Consider again an optical scanning apparatus of a type that allows an optical beam to be incident on a reflecting surface of a scanner at an angle in the sub-scanning direction. As shown in FIG. 17, if an optical beam b having a coordinate system, with the main scanning direction as the y coordinate axis, the sub-scanning direction as the x coordinate axis and the optical axis as the z coordinate axis, is incident on the second reflecting surface 5 of the rotating polygonal mirror 3 at an angle in the sub-scanning direction, the resulting deflected optical beam c becomes curved, whereupon its coordinate system rotates. In this instance, the optical beam $c_0$ at the scan center does not rotate but the optical beams $c_1$ and $c_2$ which scan the ends of the scan range are rotated in different directions at the two ends of the scan range as shown in FIG. 17(b). The thus inclined end scanning optical beams $c_1$ and $c_2$ will not be correctly focused at a single point on the surface to be scanned 14 even if they are passed through anamorphic scanning optics and the resulting beam spot is disfigured and incapable of forming a satisfactory image on the surface 14.

Figure 18:
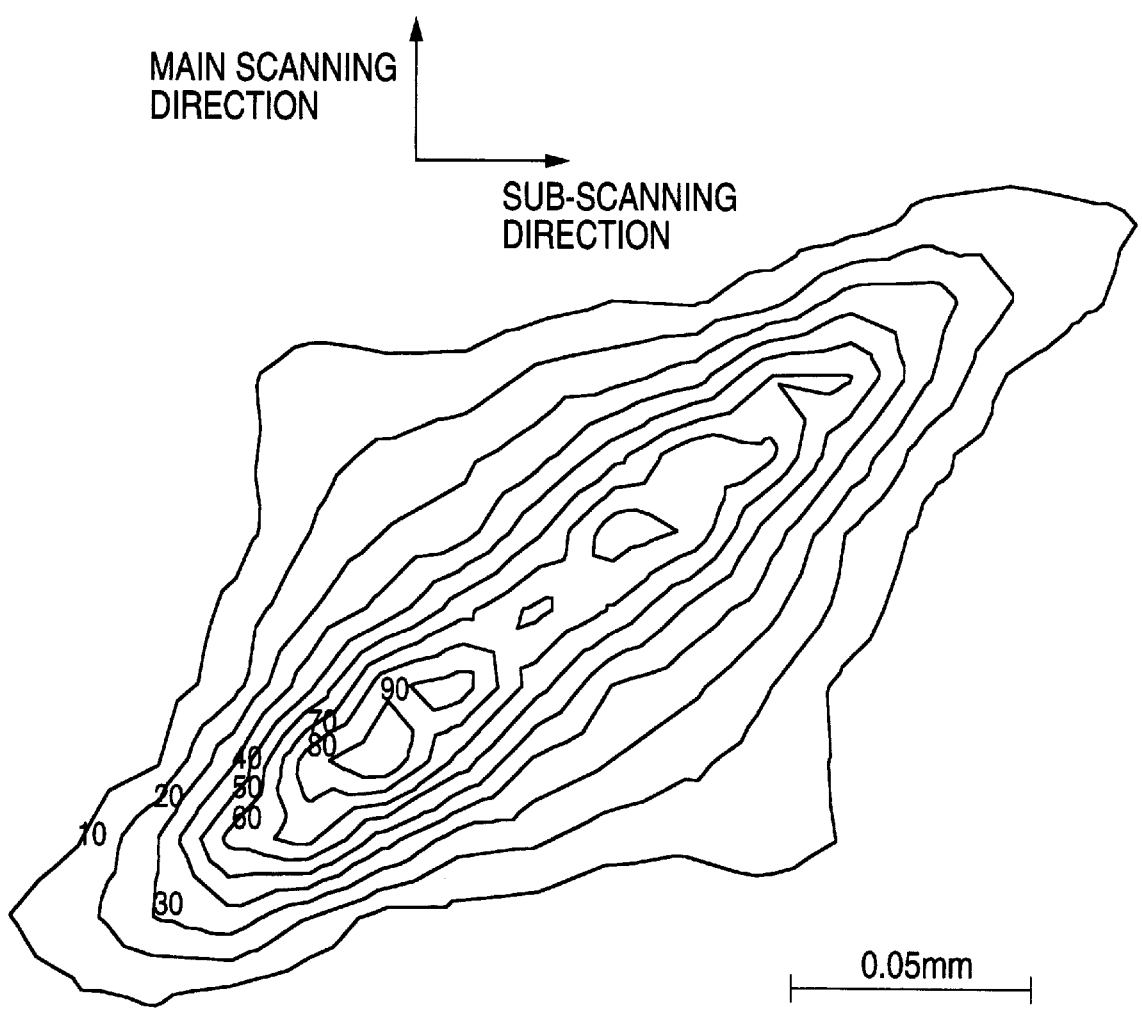
FIG. 18 is a chart of a disfigured beam spot representing lines each connecting points having the same intensity of light.
Figure 19:
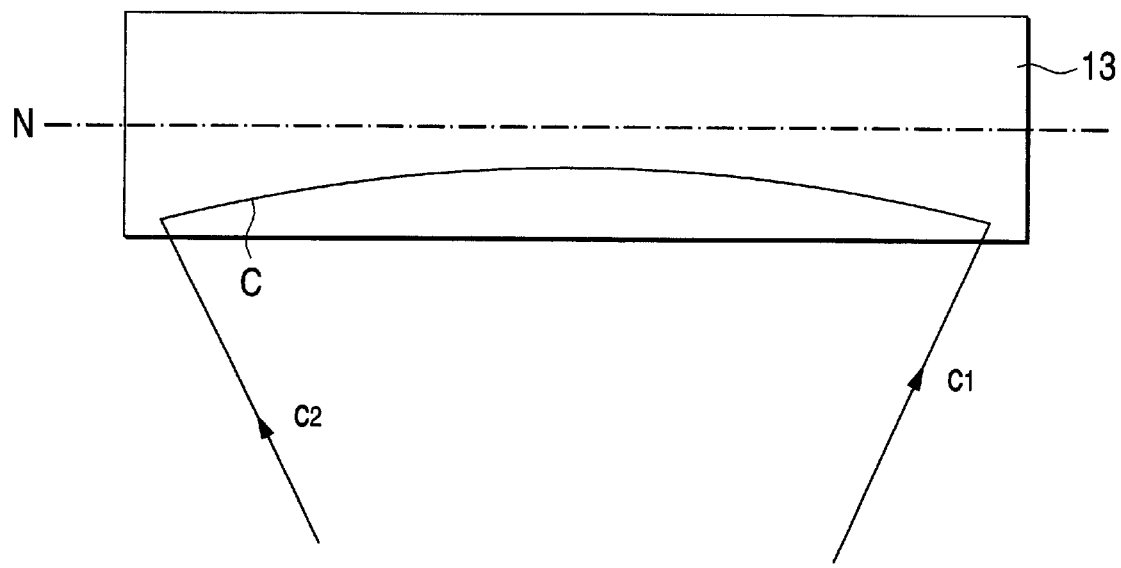
FIG. 19 is a front view of the second scanning lens.

In the embodiment of the invention under consideration, the second scanning lens 13 is disposed eccentric and, in addition, the locus C of the optical beam incident on the second scanning lens 13 is curved as shown in FIG. 19; hence, the optical beams $c_1$ and $c_2$ which scan the ends of the scan range are incident on the second scanning lens 13 at a point distant from the central axis N. The central axis N of the second scanning lens 13 is an axis that coincides with its optical axis and which is parallel to the main scanning direction. If the end scanning optical beams $c_1$ and $c_2$ were allowed to pass through the central axis N of the second reflecting lens 13, the beam spots formed by these optical beams will be disfigured as shown in FIG. 18. The disfiguring of a beam spot depends on the size of a beam spot which is yet to be converged by a lens and the smaller the beam spot to be formed, the more disfigured it will be. In the embodiment of the invention under consideration, the first shaping lens 2 in the shaping optics is symmetrical with respect to the optical axis and, therefore, the image formed by focusing of the optical beam a incident on the first reflecting surface 4 of the rotating polygonal mirror 3 is indistinguishable in the main and sub-scanning directions. Therefore, the rotation of the optical beam b deflected by the first reflecting surface 4 is not a problem.

Figure 20:
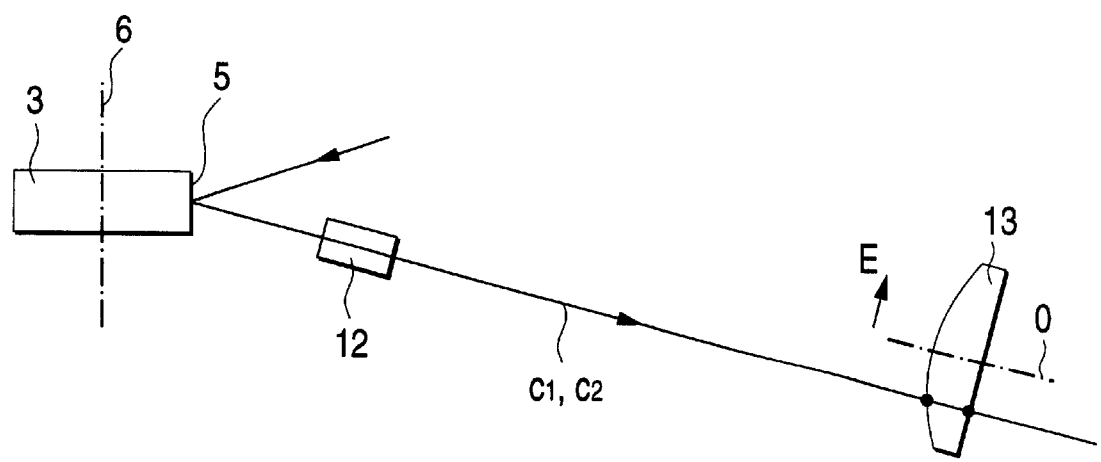
FIG. 20 is a section of the scanning optics in the sub-scanning direction.

In the embodiment of the invention under consideration, the disfiguring of a beam spot is corrected by allowing the end scanning optical beams $c_1$ and $c_2$ to be incident on the second scanning lens 13 at a point distant from its central axis N. FIG. 20 is a section of the scanning optics in the sub-scanning direction, showing the optical path from the rotating polygonal mirror 3 to the second scanning lens 13. The optical beams $c_1$ and $c_2$ shown in FIG. 20 are those which scan the ends of the scan range. Referring to FIG. 20, the optical beams $c_1$ and $c_2$ emerging from the second reflecting surface 5 of the rotating polygonal mirror 3 are located downward of the incident optical beams. The downward emerging optical beams $c_1$ and $c_2$ pass through the first scanning lens 12 and then through the second scanning lens 13 at a point distant downward from its optical axis O. It should be noted that the optical axis O of the second scanning lens 13 is substantially parallel to the incident optical beams.

In the embodiment of the invention under discussion, the second scanning lens 13 is disposed eccentric such that its optical axis is offset from the center scanning optical beam $c_0$ by a distance of 2.67 mm in the sub-scanning direction and in the direction indicated by arrow E in FIG. 20. In other words, the optical beam $c_0$ which scans the center of the scan range is incident on the second scanning lens 13 at a point 2.67 mm distant from its optical axis. Each of the optical beams $c_1$ and $c_2$ which scan the ends of the scan range is incident on the second scanning lens 13 at a point 7.02 mm distant from its optical axis. As a result, the beam spots formed by the end scanning optical beams $c_1$ and $c_2$ will have a satisfactory shape as shown in FIG. 16.

According to the simulation conducted by the present inventors, the rotation of the end scanning optical beams $c_1$ and $c_2$ could be effectively corrected to produce beam spots of a satisfactory shape by adapting them to pass through an anamorphic lens such as the second scanning lens 13 at a position spaced from its optical axis in the sub-scanning direction. The effectiveness in correcting a disfigured beam spot was particularly great when the side on which the optical beam emerging from the rotating polygonal mirror 3 was present relative to the optical beam incident on a reflecting surface of the rotating polygonal mirror 3 (the side was downward in FIG. 20) was the same as the side on which the optical beam incident on the second scanning lens 13 was present relative to the optical axis of the second scanning lens 13 (the side was also downward in FIG. 20).

The second scanning lens 13 used in the embodiment of the invention under consideration has a positive refractive power in the entrance surface but the same effect is attained with a lens having a positive refractive power in the exit surface. If the second scanning lens 13 has a negative refractive power in the sub-scanning direction, the same effect is attained by ensuring that the side on which the optical beam emerging from the rotating polygonal mirror 3 is present relative to the optical beam incident on a reflecting surface of the polygonal mirror 3 is opposite to the side on which the optical beam incident on the anamorphic lens is present relative to its optical axis.

The center scanning optical beam $c_0$ has not experienced the rotation of its coordinate system due to deflection, so it is inherently free from the problem of a disfigured beam spot and the shape of the beam spot formed of the optical beam $c_0$ will in no way be affected if the second scanning lens 13 is positioned in an eccentric manner. Therefore, the beam spot formed of the optical beam $c_0$ also has a satisfactory shape. Strictly speaking, the eccentricity of the second scanning lens 13 causes a slight spherical aberration but this is not a substantial problem.

Figure 21:
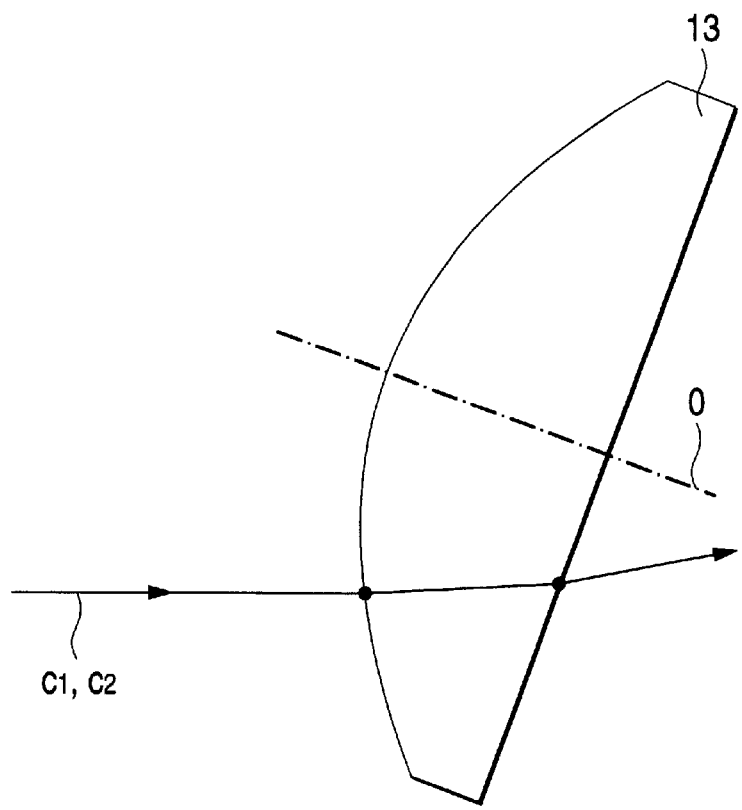
FIG. 21 is a section of the second scanning lens in the sub-scanning direction as it is positioned in a different way.

FIG. 21 shows the second scanning lens 13 as it is positioned in a different way. The optical axis O of the second scanning lens 13 is inclined with respect to the end scanning optical beams $c_1$ and $c_2$ and, in addition, such optical beams are incident on the second scanning lens 13 at a point distant from its optical axis O. This design is also effective in correcting the disfiguring of the beam spots formed of the optical beams $c_1$ and $c_2$.

Figure 22:
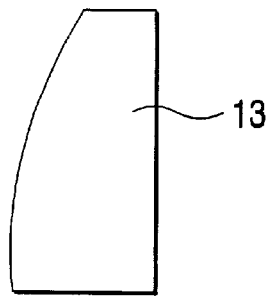
FIGS. 22(a) and 22(b) show other sectional profiles of the second scanning lens in the sub-scanning direction.
Figure 22:
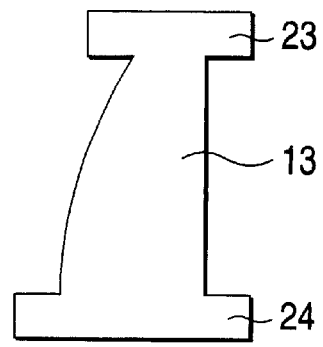

The second scanning lens 13 shown in FIGS. 20 and 21 has a sectional profile in the sub-scanning direction that is symmetric with its own optical axis O. On the other hand, an optical beam passes through the second scanning lens 13 at a point off-centered from the optical axis O. Therefore, the second scanning lens may be composed solely of a region through which an optical beam passes and two examples of a section in the sub-scanning direction that satisfies this condition are shown in FIGS. 22(*a*) and 22(*b*). In FIG. 22(*a*), the lens thickness at one edge differs from the thickness at the other edge. A lens of this shape may be fabricated by the following procedure: first, a lens is prepared that is symmetric with respect to a plane that contains the optical axis and which is parallel to the main scanning direction and the thus prepared lens is then cut through the same plane that contains the optical axis and which is parallel to the main scanning direction. In this way, two lens elements can be fabricated by one process of lens machining and, hence, at a lower cost.

Lenses of a complex surface shape such as the second scanning lens 13 is often manufactured by resin molding. The second scanning lens 13, if it is manufactured by resin molding, has ribs formed in a sectional profile in the sub-scanning direction as indicated by 23 and 24 in FIG. 22(*b*). As in the case shown in FIG. 22(*a*), the effective area of the lens shown in FIG. 22(*b*) excluding the ribs 23 and 24 has a different thickness at one edge from the thickness at the other edge. In less profiles such as those shown in FIGS. 22(*a*) and 22(*b*), the optical axis of the lens may occasionally be positioned outside of the lens; however, the optical axis is defined as an axis perpendicular to both the entrance and exit surfaces of the lens. If the second scanning lens 13 is adapted to have a sectional profile in the sub-scanning direction as illustrated in FIGS. 22(*a*) and 22(*b*), the surface area of the lens, particularly the width of the lens surface in the sub-scanning direction, can be sufficiently reduced to increase the precision of the lens surface. This feature is particularly effective in a case like the embodiment of the invention under consideration where the second scanning lens 13 has a toric surface.

In producing a toric surface, machining in the main scanning direction and that in the sub-scanning direction are generally accomplished by independent feed mechanisms, so it is difficult to achieve high surface precision in both the main and sub-scanning directions. If it is attempted to increase the surface precision in one direction, the surface precision in the other direction will deteriorate. In particular, the wear or machining tools will cause unevenness in allowances to thereby deteriorate the surface precision; the larger the lens surface area, the more it wears to cause further deterioration of the surface precision. Conversely, high surface precision is attained by reducing the lens surface area as in the cases shown in FIGS. 22(*a*) and 22(*b*).

Another advantage of the cases shown in FIGS. 22(*a*) and 22(*b*) is that the second scanning lens 13 can be made smaller to reduce the overall size and cost of the optical scanning apparatus.

We next discuss the method of correcting the curvature of the scanning line. If an optical beam b is incident on the second reflecting surface 5 of the rotating polygonal mirror 3 at an angle in the sub-scanning direction as shown in FIG.

26, the reflected beam c is deflected to become curved and the center of the scan range is scanned by an optical beam $c_0$ indicated by a solid line whereas the ends of the scan range are scanned by optical beams $c_1$ and $c_2$ which are collectively indicated by a dashed line. However, if the second reflecting surface 5 of the rotating polygonal mirror 3 is conjugated in the sub-scanning direction to the surface to be scanned 14 in terms of geometrical optics, the center scanning optical beam $c_0$ and the end scanning optical beams $c_1$ and $c_2$ will reach the surface 14 in positions that are the same in the sub-scanning direction, thereby creating a straight scanning line on the surface 14.

Figure 23:
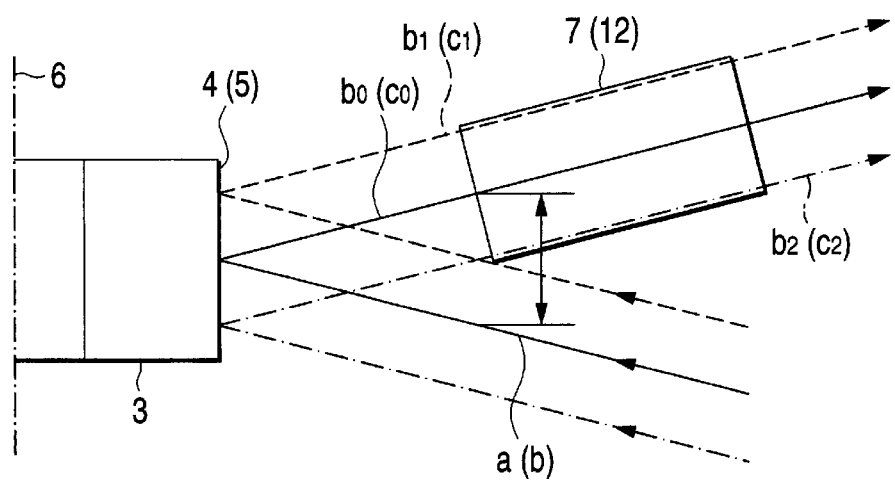
FIG. 23 is a sectional view, taken in the sub-scanning direction, of a scanning lens and the optical path in its neighborhood.

In the embodiment of the invention under discussion, each of the first transfer lens 7 and the first scanning lens 12 is of such a shape that it is shorter in the sub-scanning direction than in the main scanning direction. These lenses are extremely short in the sub-scanning direction, with the minimum length necessary for the passage of an optical beam. Therefore, the optical beam a incident on the rotating polygonal mirror 3 will not interfere with the first transfer lens 7, nor will the optical beam b interfere with the first scanning lens 12. Since neither of the optical beams interfere with the lenses, the angle of incidence of the optical beams a and b on the rotating polygonal mirror 3 can be reduced and, as a result, the curvatures of the optical beams b and c deflected from the respective reflecting surfaces of the polygonal mirror 3 are sufficiently reduced that the apertures of the second transfer lens 9, third transfer lens 10 and second scanning lens 13 in the sub-scanning direction can be reduced. It should also be mentioned that in the embodiment of the invention under discussion, the aperture of the entrance surface of the first transfer lens 7 (or the first scanning lens 12) in the sub-scanning direction is equal to the distance between the optical beam a (or b) incident on the rotating polygonal mirror 3 and the deflected optical beam b (or c) as measured at the corresponding position of the reflecting surface. In FIG. 23, the solid line indicates the center scanning optical beams $b_0$ and $c_0$ which have no offsets, and the dashed lines indicate the end scanning optical beams $b_1$ (or $c_1$) and $b_2$ (or $c_2$) which have a maximal offset in the sub-scanning direction. If the lens aperture is greater than the distance between $b_1$ (or $c_1$) and $b_2$ (or $c_2$), the incident optical beam b and the reflected optical beam c will interfere with the lens. Conversely, if the lens aperture is smaller than the distance between $b_1$ (or $c_1$) and $b_2$ (or $c_2$), the reflected optical beams b and c will simply pass the outside of the lens. Therefore, by adopting the design according to the embodiment of the invention under consideration, maximal tolerances are allowed for the offset which the optical beams b and c may have in the sub-scanning direction.

Figure 24:
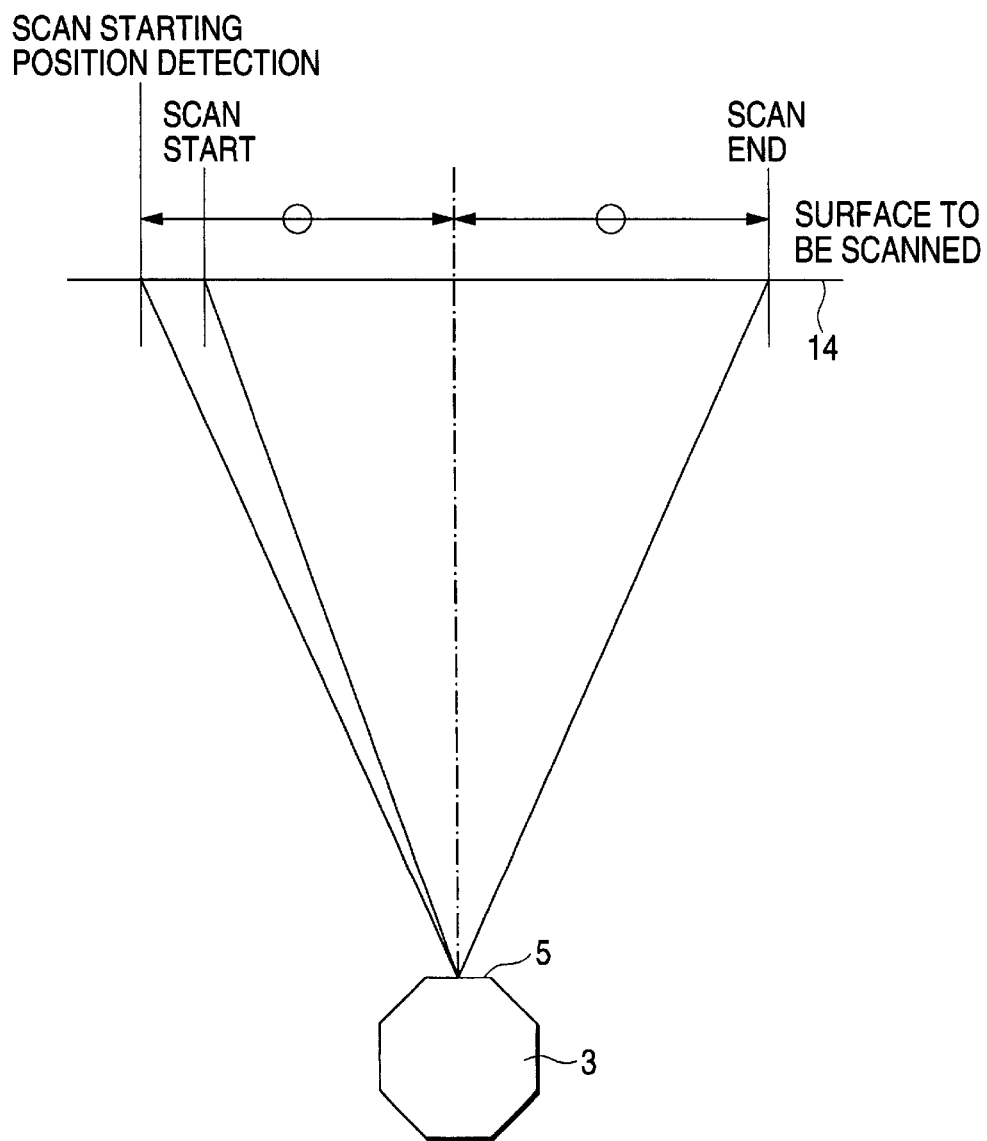
FIG. 24 illustrates a shift of the scan range.

We next describe the shift of the scan region with reference to FIG. 24. In the conventional optical scanning apparatus, the scan start and end positions are symmetrical with respect to the optical axis of the scanning optics and the position of detecting a horizontal sync signal is located outside of these positions. With this layout, a large available region of the scanning lens system has to be provided only on the side of detecting a horizontal sync signal; however, from a manufacturing viewpoint, a lens is desirably symmetrical with respect to the optical axis, so in a case like the one just described above, it has been necessary to increase the lens aperture. In particular, with a positive lens like the scanning lens, an increase in aperture requires a sufficient thickness to be secured around the periphery and, to this end, the lens thickness must accordingly be increased in the axial direction. In the present invention, the horizontal sync signal detecting position and the scan end position are symmetrical with respect to the optical axis of the scanning optics. Hence, the aperture of the first scanning lens 12 can be reduced in the main scanning direction.

We next discuss the providing of the horizontal synchronous lens in an inclined position. As already described in connection with the method of correcting the rotation of an optical beam due to deflection, what occurs in an optical scanning apparatus of a type that allows an optical beam to be incident at an angle in the sub-scanning direction is that an optical beam b having a coordinate system, with the main scanning direction as the y coordinate axis, the sub-scanning direction as the x coordinate axis and the optical axis as the z coordinate axis, is incident on the second reflecting surface 5 of the rotating polygonal mirror 3 at an angle in the sub-scanning direction and the reflected optical beam c is deflected in a curved way to have its coordinate system rotated (see FIG. 17). If the optical beam c is rotated due to deflection from the second reflecting surface 5 of the polygonal mirror 3, the beam spot formed of an optical beam d carrying a horizontal sync signal will not be correctly focused at a single point and the resulting beam spot is disfigured to achieve only low precision in detection. To deal with this problem, the horizontal synchronous lens 82 shown in FIG. 1 according to the first embodiment of the invention is inclined 2.4° clockwise (arrow C) about the optical axis as viewed in the direction of beam travel. As a result, the rotated coordinate system of the optical beam d comes into agreement with the coordinate system of the horizontal synchronous lens 82 including both the generatrix and peripheral directions and a beam spot of a satisfactory shape is fed into the horizontal synchronous sensor 83 to provide an improved precision in detection.

We next describe the providing of the horizontal synchronous sensor 83 in an inclined position. In the embodiment of the invention under discussion, the horizontal synchronous lens 82 is inclined by 2.4° and, in addition, the horizontal synchronous sensor 83 is also inclined by the same angle in the direction indicated by arrow D in FIG. 1. Therefore, the direction in which the beam spot scans on the horizontal synchronous sensor 83 is inclined by the same angle as that of inclination of the horizontal synchronous lens 82. As a result, the optical beam d carrying a horizontal sync signal scans vertically on the horizontal synchronous sensor 83 to thereby achieve a further improvement in detection sensitivity.

Figure 27:
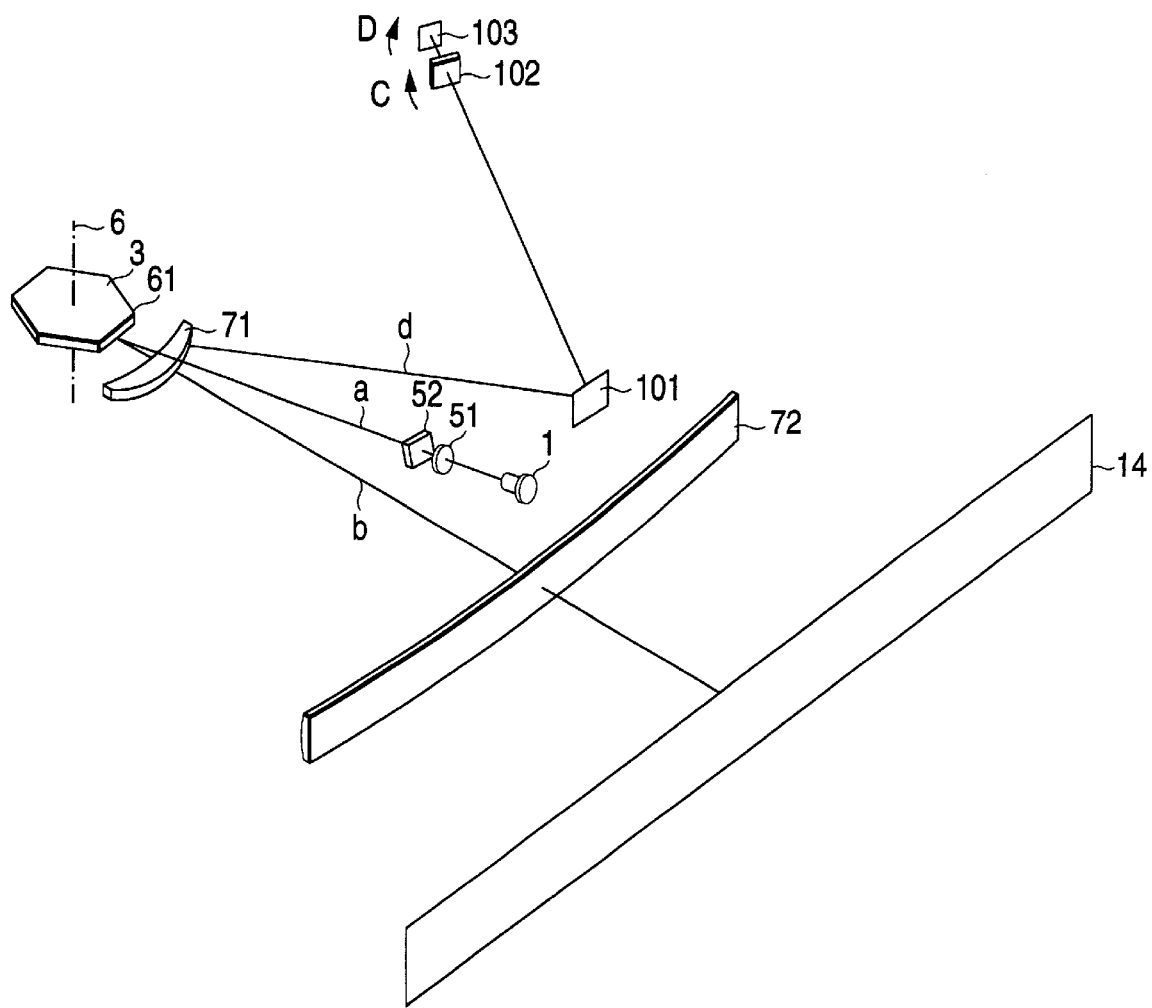
FIG. 27 is a perspective view showing the layout of an optical scanning apparatus according to a second embodiment of the invention.

Let us now describe a second embodiment of the invention with reference to FIG. 27. The first embodiment of the invention relates to an optical scanning apparatus that is adapted to permit an optical beam to be incident twice at an angle with a scanning plane which is normal to the rotating axis of the polygonal mirror serving as a scanner. The second embodiment of the invention to be described below relates to an optical scanning apparatus that performs single deflection of an optical beam which is incident at an angle with a scanning plane normal to the rotating axis of the polygonal mirror. Stated more specifically, a semiconductor laser 1 as a light source issues an optical beam a, which is passed through shaping optics composed of a first shaping lens 51 and a second shaping lens 52 and the resulting convergent beam a is allowed to be incident on a reflecting surface 61 of the rotating polygonal mirror 3 from below. A deflected optical beam b reflected upward from the reflecting surface 61 passes through scanning optics composed of a first scanning lens 71 and a second scanning lens 72 to form a beam spot and, hence, a scanning line on the surface to be scanned 14. At an end of the range of scanning with the optical beam b from the reflecting surface 61, an optical beam d is separated by means of a horizontal synchronous mirror 101; carrying a horizontal sync signal, the optical beam d is focused by means of a horizontal synchronous lens 102 to form a beam spot on a horizontal synchronous sensor 103.

The first shaping lens 51 is an aspheric lens symmetric with respect to the optical axis and the second shaping lens 52 is a cylindrical lens having power only in the sub-scanning direction; the first lens 71 is a spherical lens; the second scanning lens 72 is a plastic lens of which the entrance surface is concave with a large radius of curvature in the main scanning direction but convex with a small radius of curvature in the sub-scanning direction. The entrance surface of the second scanning lens 72 is a saddle-shaped toric surface formed by rotating the sectional profile curve in the main scanning direction about an axis parallel to the main scanning direction which is closer to the surface to be scanned 14 than said entrance surface. The exit surface of the second scanning lens 72 is a nonarcuate cylindrical surface which is nonarcuate with a large radius of curvature in the main scanning direction and which has a linear section in the sub-scanning direction.

Specific numerical data for the thus designed optical scanning apparatus are given Table 3, in which the radii of curvature of an anamorphic surface in the sub- and main scanning directions are designated by rix and riy, respectively. For an aspheric surface, the radius of curvature is indicated by an on-axis value.

TABLE 3

| Si | ri | di | ni | Element |
|---|---|---|---|---|
| S1 |  | 28.337459 |  | Emission point of semiconductor laser |
| S2 | ∞ | 2.8 | 1.674099 | Entrance surface of first shaping lens |
| S3 | −20.22298 | 10 |  | Exit surface of first shaping lens |
| S4 | r4x 77.63070<br>r4y ∞ | 3 | 1.510776 | Entrance surface of second shaping lens |
| S5 | ∞ | 150 |  | Exit surface of second shaping lens |
| S6 | ∞ | 20.072970 |  | Reflecting surface |
| S7 | −53.44928 | 6.857122 | 1.510776 | Entrance surface of first scanning lens |
| S8 | −39.69095 | 178.069908 |  | Exit surface of first scanning lens |
| S9 | r9x 31.28<br>r9y −833.43344 | 4 | 1.485834 | Entrance surface of second scanning lens |
| S10 | r10x ∞<br>r10y 3157.29851 | 91 |  | Exit surface of second scanning lens |

The aspheric surface of the first shaping lens 51 is expressed by equation (1) already set forth in the first embodiment of the invention. The aspheric coefficients take the values listed in Table 4 below.

TABLE 4

|  | S3 | S9y | S10y |
|---|---|---|---|
| R | −20.22298 | −833.43344 | −3157.29851 |
| K | −1.220674 | 5.543100 | −181.526256 |
| A | −8.60423e−6 | −5.29028e−9 | −3.44144e−8 |
| B | 3.65084e−10 | 0 | 0 |
| C | 1.14095e−12 | 0 | 0 |
| D | 1.21341e−15 | 0 | 0 |

In the example shown in Table 3, the angle through which the polygonal mirror 3 rotates from the start of one scan cycle to the end of it is $2\omega=31.7°$. The angle of incidence of the optical beam a on the rotating polygonal mirror 3 is 6° as measured in the sub-scanning direction. The polygonal mirror 3 has six reflecting surfaces; the inscribed circle of the polygonal mirror 3 has a radius of 17 mm; the optical beam a issuing from the semiconductor laser 1 has a wavelength of 800 nm. Thus, as in the already described first embodiment of the invention, the optical beam a is incident on the reflecting surface 61 of the rotating polygonal mirror 3 from above at an angle in the sub-scanning direction and the optical beam a to be deflected is separated from the deflected optical beam b such that they are spaced apart, one being upward and the other downward, along the rotating axis of the polygonal mirror 3 without interfering with each other.

Since the optical beam a is allowed to be incident on the reflecting surface 61 of the rotating polygonal mirror 3 at an angle in the sub-scanning direction, the deflected optical beam b becomes curved and rotates in the first embodiment of the invention. Stated more specifically, the coordinate system of the optical beam b rotates as shown in FIG. 9. Hence, as in the first embodiment of the invention, the rotation of the optical beams which scan the ends of the scan range is corrected to ensure the formation of a satisfactorily shaped beam spot. This will be described below with reference to FIG. 28.

The optical beams $c_1$ and $c_2$ emerging from the reflecting surface 61 of the rotating polygonal mirror 3 are located downward of the incident optical beams. The downward emerging optical beams $c_1$ and $c_2$ pass through the first scanning lens 71 and then through the second scanning lens 72 at a point distant downward from its optical axis O. It should be noted that the optical axis O of the second scanning lens 72 is substantially parallel to the incident optical beams.

Figure 28:
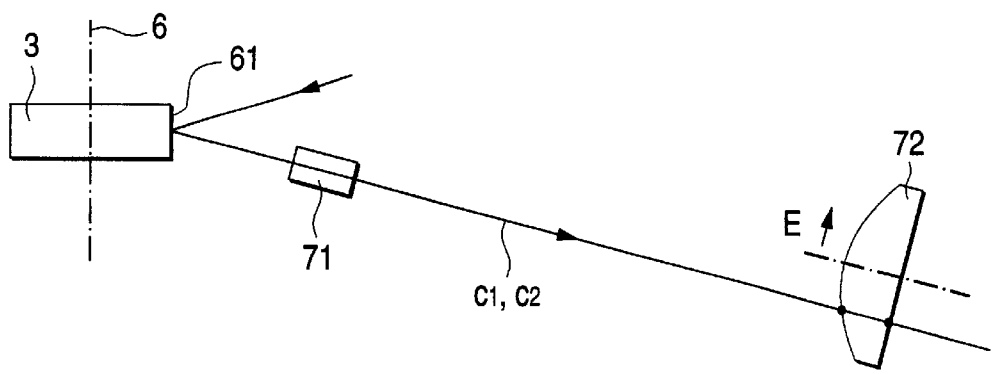
FIG. 28 is a section of the scanning optics in the sub-scanning direction.

In the second embodiment of the invention under discussion, the second scanning lens 72 is disposed eccentric such that its optical axis is offset from the center scanning optical beam $c_0$ by a distance of 2.25 mm in the sub-scanning direction and in the direction indicated by arrow E in FIG. 28. In other words, the optical beam $c_0$ which scans the center of the scan range is incident on the second scanning lens 72 at a point 2.25 mm distant from its optical axis. Each of the optical beams $c_1$ and $c_2$ which scan the ends of the scan range is incident on the second scanning lens 72 at a point 5.54 mm distant from its optical axis. As in the first embodiment of the invention, this arrangement is effective in correcting the rotation of the end scanning optical beams to thereby ensure the formation of satisfactorily shaped beam spots.

We next discuss the providing of the horizontal synchronous lens in an inclined position. As already described in the first embodiment of the invention in connection with the method of correcting the rotation of an optical beam due to deflection, what occurs in an optical scanning apparatus of a type that allows an optical beam to be incident at an angle in the sub-scanning direction is that an optical beam b having a coordinate system, with the main scanning direction as the y coordinate axis, the sub-scanning direction as the x coordinate axis and the optical axis as the z coordinate axis, is incident on the reflecting surface 61 of the rotating polygonal mirror 3 at an angle in the sub-scanning direction and the reflected optical beam c is deflected in a curved way to have its coordinate system rotated (see FIG. 17). If the optical beam c is rotated due to deflection from the reflecting surface 61 of the polygonal mirror 3, the beam spot formed of an optical beam d carrying a horizontal sync signal will not be correctly focused at a single point and the resulting beam spot is disfigured to achieve only low precision in detection. To deal with this problem, the horizontal synchronous lens 102 shown in FIG. 27 is inclined clockwise (arrow C) about the optical axis as viewed in the direction of beam travel. As a result, the rotated coordinate system of the optical beam d comes into agreement with the coordinate system of the horizontal synchronous lens 102 including both the generatrix and peripheral directions and a beam spot of a satisfactory shape is fed into the horizontal synchronous sensor 103 to provide an improved precision in detection.

We next describe the providing of the horizontal synchronous sensor 103 in an inclined position. In the second embodiment of the invention under discussion, the horizontal synchronous lens 102 is inclined and, in addition, the horizontal synchronous sensor 103 is also inclined by the same angle in the direction indicated by arrow D in FIG. 27. Therefore, the direction in which the beam spot scans on the horizontal synchronous sensor 103 is inclined by the same angle as that of inclination of the horizontal synchronous lens 102. As a result, the optical beam d carrying a horizontal sync signal scans vertically on the horizontal synchronous sensor 103 to thereby achieve a further improvement in detection sensitivity.

In the foregoing embodiments of the invention, a rotating polygonal mirror has been used as the scanner but this is not the sole case of the invention and the scanner suffices to have at least two reflecting surfaces, as exemplified by a rotating two-faced mirror and a galvano-mirror that oscillates sinusoidally about the rotating axis and of which the two surfaces are utilized. The optical scanning apparatus of the invention proves particularly effective when used with laser printers but, needless to say, it can also be applied to other systems including image forming apparatus such as a digital copier, facsimile and a laser scanning display, image input devices such as a scanner, as well as optical mark reading laser equipment and a surface inspecting laser scanner.

Figure 29:
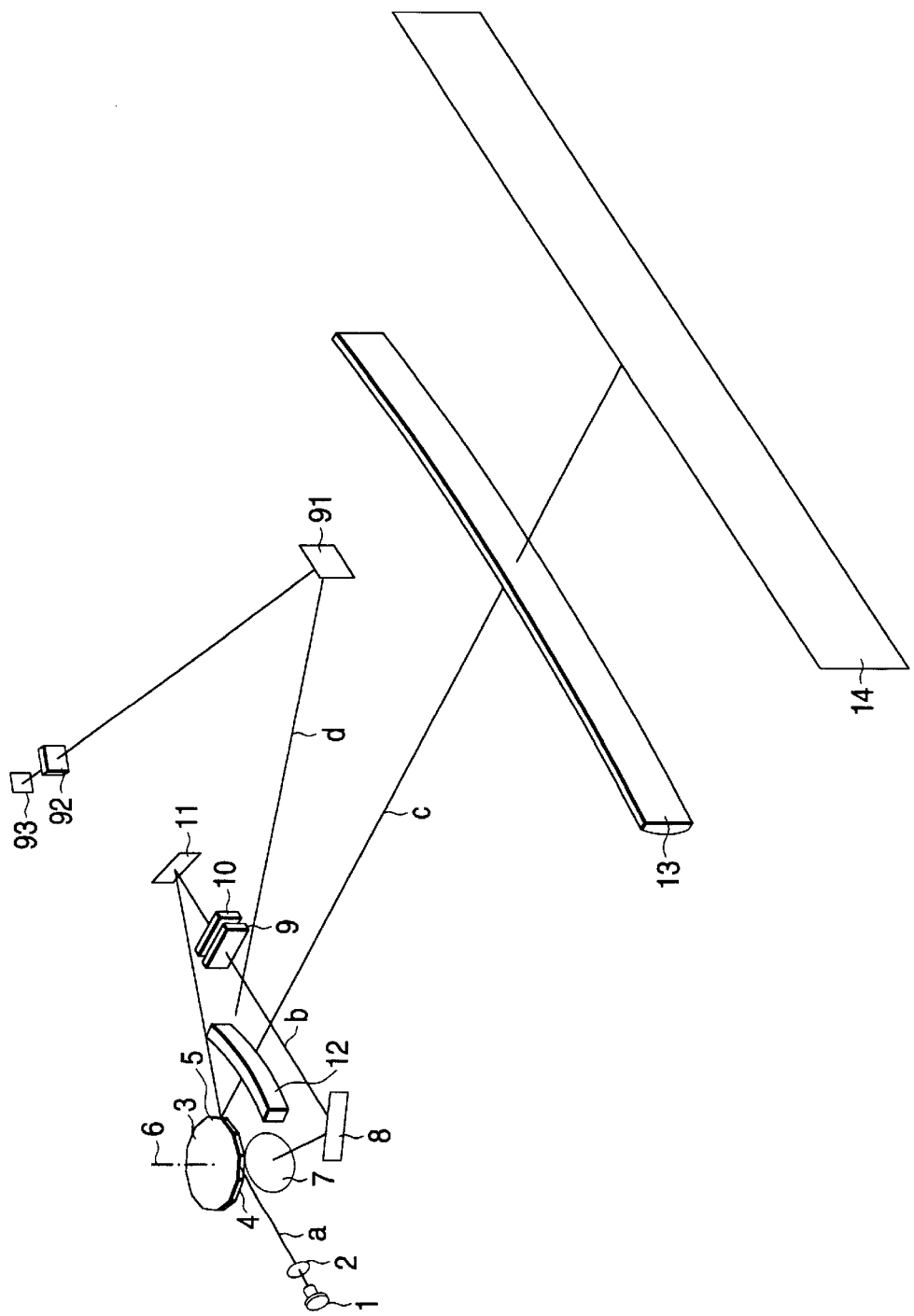
FIG. 29 is a perspective view showing the layout of an optical scanning apparatus according a third embodiment of the invention.

In the next place, we describe a third embodiment of the invention with reference to FIG. 29, which is a perspective view showing the layout of an optical scanning apparatus according to the third embodiment of the invention. As in the two embodiments described above, a semiconductor laser 1 issues an optical beam a, which is passed through a first shaping lens 2 and the shaped beam is incident on a first reflecting surface 4 of a rotating polygonal mirror 3 (scanner) from below at an angle in the sub-scanning direction such that it undergoes the first deflection. A deflected beam b reflected upward at an angle from the first reflecting surface 4 is passed through a first transfer lens 7, reflected by a first transfer mirror 8, passed through a second transfer lens 9 and a third transfer lens 10, reflected by a second transfer mirror 11 and incident on a second reflecting surface 5 of the rotating polygonal mirror 3 from above at an angle such that it undergoes the second deflection. A deflected optical beam c reflected from the second reflecting surface 5 is passed through a first scanning lens 13 and a plastic second scanning lens 13 to be focused to form a scanning beam spot on the surface to be scanned 14.

The shaping lens 2 and the first transfer lens 7 are each an aspheric cylindrical lens symmetric with respect to the optical axis; the second transfer lens 9 is a cylindrical lens having power only in the sub-scanning direction; the third transfer lens 10 is a cylindrical lens having power only in the main scanning direction; the first scanning lens 12 is a spherical lens; the second scanning lens 13 is a plastic lens of which the entrance surface is concave with a large radius of curvature in the main scanning direction but convex with a small radius of curvature in the sub-scanning direction. The entrance surface of the second scanning lens 13 is a saddle-shaped toric surface formed by rotating the sectional profile curve in the main scanning direction about an axis parallel to the main scanning direction which is closer to the surface 14 than said entrance surface. The exit surface of the second scanning lens 13 is a nonarcuate cylindrical surface which is nonarcuate and convex with a large radius of curvature in the main scanning direction and which has a linear section in the sub-scanning direction.

In the third embodiment of the invention, each of the optical beams a, b, c and d is contained in a scanning plane which is normal to the rotating axis 6 of the polygonal mirror 3. The optical beam a incident on the first reflecting surface 4 of the rotating polygonal mirror 3 and the optical beam b incident on the second reflecting surface 5 are each incident at an angle in the main scanning direction. The shaping optics, transfer optics and scanning optics are disposed in the scanning plane and they are spaced apart so that they will not interfere with each other.

Specific numerical data for the thus designed optical scanning apparatus are given in Table 5, and the aspheric coefficients of the first shaping lens 2 and the first transfer lens 7 take the values listed in Table 6.

TABLE 5

| Si | ri | di | ni | Element |
|---|---|---|---|---|
| S1 | | 7.282450 | | Emission point of semiconductor laser |
| S2 | ∞ | 2.5 | 1.681456 | Entrance surface of shaping lens |
| S3 | −5.21530 | 49.132686 | | Exit surface of shaping lens |
| S4 | ∞ | 18 | | First reflecting surface |
| S5 | ∞ | 5 | 1.794651 | Entrance surface of first transfer lens |
| S6 | −15.33242 | 37.787012 | | Exit surface of first transfer lens |
| S7 | ∞ | 99.878034 | | First transfer mirror |
| S8 | r8x 39.92566 r8y ∞ | 3 | 1.513901 | Entrance surface of second transfer lens |
| S9 | ∞ | 3 | | Exit surface of second transfer lens |
| S10 | ∞ | 3 | 1.513901 | Entrance surface of third transfer lens |
| S11 | r11x ∞ r11y −84.62620 | 31.443024 | | Exit surface of third transfer lens |
| S12 | r1ly −84.62620 | 98.891930 | | Second transfer mirror |
| S13 | r1ly −84.62620 | 24.100470 | | Second reflecting surface |

TABLE 5-continued

| Si | ri | di | ni | Element |
|---|---|---|---|---|
| S14 | −73.39048 | 9 | 1.513901 | Entrance surface of first scanning lens |
| S15 | −53.60472 | 247.899530 | | Exit surface of first scanning lens |
| 516 | r16x 36.902980  r16y −1394.90308 | 4 | 1.488993 | Entrance surface of second scanning lens |
| 517 | r17x ∞  r17y −5919.02020 | 100 | | Exit surface of second scanning lens |

TABLE 6

Aspheric coefficients

| | S3 | S6 | S17y |
|---|---|---|---|
| R | −5.21530 | −15.21883 | −4146.00073 |
| K | −0.964391 | −1.000017 | −146.925818 |
| A | −2.53025e−4 | −1.52209e−5 | −1.78144e−8 |
| B | −7.68010e−7 | 0 | 0 |
| C | 7.02682e−9 | 0 | 0 |
| D | 1.45140e−10 | 0 | 0 |

In the example shown in Table 5, the angle through which the polygonal mirror 3 rotates from the start of one scan cycle to the end of it is 2ω=24°. The polygonal mirror 3 has eight reflecting surfaces; the inscribed circle of the polygonal mirror 3 has a radius of 17.32 mm; the laser light has a wavelength of 670 nm.

As in the first embodiment of the invention, the transfer optics in the third embodiment is composed of the first transfer lens 7, the second transfer lens 9 and the third transfer lens 10, which are arranged in such a way that the first reflecting surface 4 of the rotating polygonal mirror 3 is substantially conjugated to the second reflecting surface 5 in the sub-scanning direction in terms of geometrical optics. An optical beam a which is focused at a point 11 mm distant from the first reflecting surface 4 of the rotating polygonal mirror 3 in the sub-scanning direction is passed through the transfer optics to be focused as an optical beam b on or near the second reflecting surface 5 of the rotating polygonal mirror 3. Therefore, as in the first embodiment of the invention, the tilting of the first and second reflecting surfaces 4 and 5 of the rotating polygonal mirror 3 can be effectively corrected in the third embodiment to ensure that the scanning position is kept constant in the sub-scanning direction.

As in the foregoing two embodiments of the invention, a rotating polygonal mirror is used as the scanner in the third embodiment but this is not the sole case of the invention and the scanner suffices to have at least two reflecting surfaces, as exemplified by a rotating two-faced mirror and a galvanomirror that oscillates sinusoidally about the rotating axis and of which the two surfaces are utilized. The optical scanning apparatus of the invention proves particularly effective when used with laser printers but, needless to say, it can also be applied to other systems including image forming apparatus such as a digital copier, facsimile and a laser scanning display, image input devices such as a scanner, as well as optical mark reading laser equipment and a surface inspecting laser scanner.

To summarize the foregoing description, the optical scanning apparatus of the invention has the following advantages.

First, the optical scanning apparatus of the invention is adapted to be such that a line normal to the entrance surface of an anamorphic lens in the scanning optics at the point where an optical beam for scanning either end of the scan range passes through said entrance surface has an angle in the sub-scanning direction with respect to a line normal to the exit surface of said anamorphic lens at the point where the same optical beam scanning either end of the scan range passes through said exit surface and this arrangement is effective in preventing the disfiguring of a beam spot due to the rotation of optical beams that have been deflected by the scanner and, hence, producing a satisfactory image. If the anamorphic lens has such a sectional profile in the sub-scanning direction that the lens thickness at one edge differs from the thickness at the other edge, the surface precision of the anamorphic lens can be sufficiently improved to produce a satisfactory image. In addition, the optical scanning apparatus is available in a smaller size and at a lower cost.

If the horizontal synchronous lens is provided in an inclined position such that it is rotated about its optical axis, the scan start point can be held at a constant position with high precision.

If the horizontal synchronous sensor is provided in an inclined position such that it is rotated about its optical axis, the scan start point can be held at a constant position with an even higher precision.

If desired, the anamorphic lens may be provided eccentric or off-centered in the sub-scanning direction, or it may be inclined by being rotated about an axis parallel to the main scanning direction, or it may be in the form of a lens curved in the sub-scanning direction. Either method is effective in preventing the disfiguring of a beam spot due to the rotation of end scanning optical beams that have been deflected by the scanner and, hence, producing a satisfactory image.

In another embodiment of the invention, the angle at which an optical beam is incident in the sub-scanning direction on the first reflecting surface of the scanner is adjusted to be equal to the angle at which the thus deflected beam is incident on the second reflecting surface of the scanner or, alternatively, the first reflecting surface of the scanner is adapted to be parallel to the second reflecting surface. Either method is effective in preventing the disfiguring of a beam spot due to the rotation of optical beams. In addition, a relatively great latitude is provided in the layout of the shaping, transfer and scanning optics for causing two beam deflections, thus contributing to size reduction, with the added advantage of faster scan speed and the production of a satisfactory image.

Further in addition, the transfer optics may be arranged in such a way that the first reflecting surface of the scanner is substantially conjugated to the second reflecting surface in the sub-scanning direction in terms of geometrical optics. With this layout, the tilting of the first and second reflecting surfaces of the scanner can be effectively corrected to ensure that the scanning position in the sub-scanning direction is held constant to thereby form a satisfactory image.

Besides the advantages of effectively correcting the tilting of the reflecting surfaces of the scanner and providing a comparatively great latitude in the layout of the shaping, transfer and scanning optics for causing two beam deflections, the optical scanning apparatus of the invention ensures that optical beams can move in pace with the reflecting surfaces on which they are incident and, in addition, the curvature of optical beams is effectively corrected to provide a straight scanning line, thereby producing a satisfactory image.

An embodiment of the optical scanning apparatus according to yet another embodiment of the invention will be described with reference to FIGS. 30–47.

Figure 30:
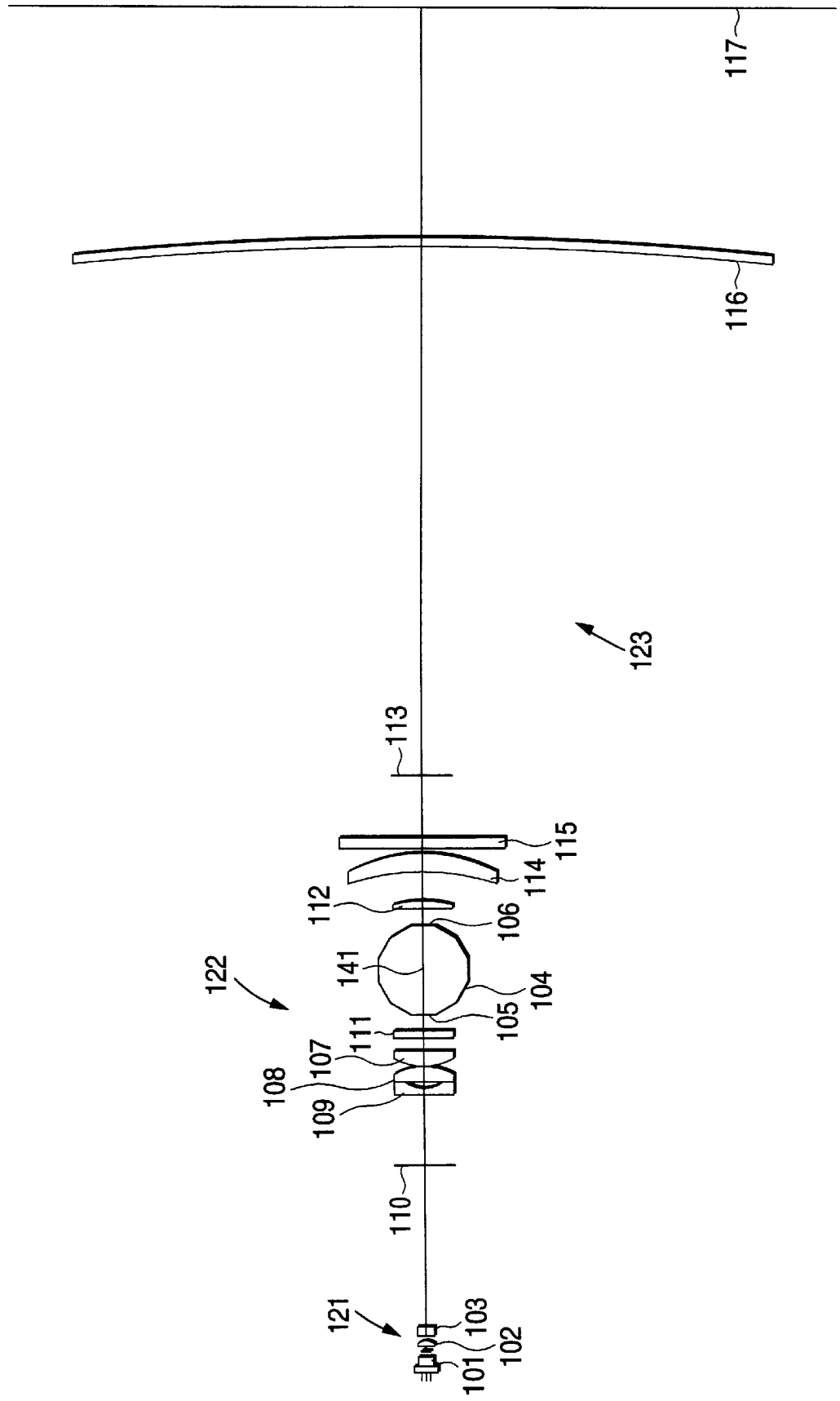
FIG. 30 is a plan view showing an arrangement of an optical scanning apparatus according to fourth embodiment of the present invention.
Figure 31:
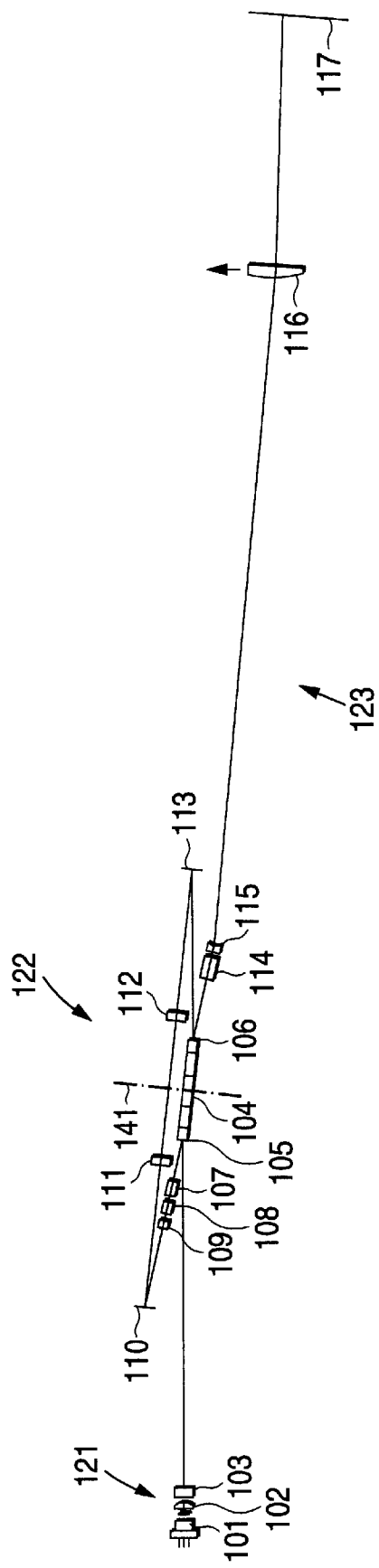
FIG. 31 is a side view showing the optical scanning apparatus of FIG. 30.
Figure 32:
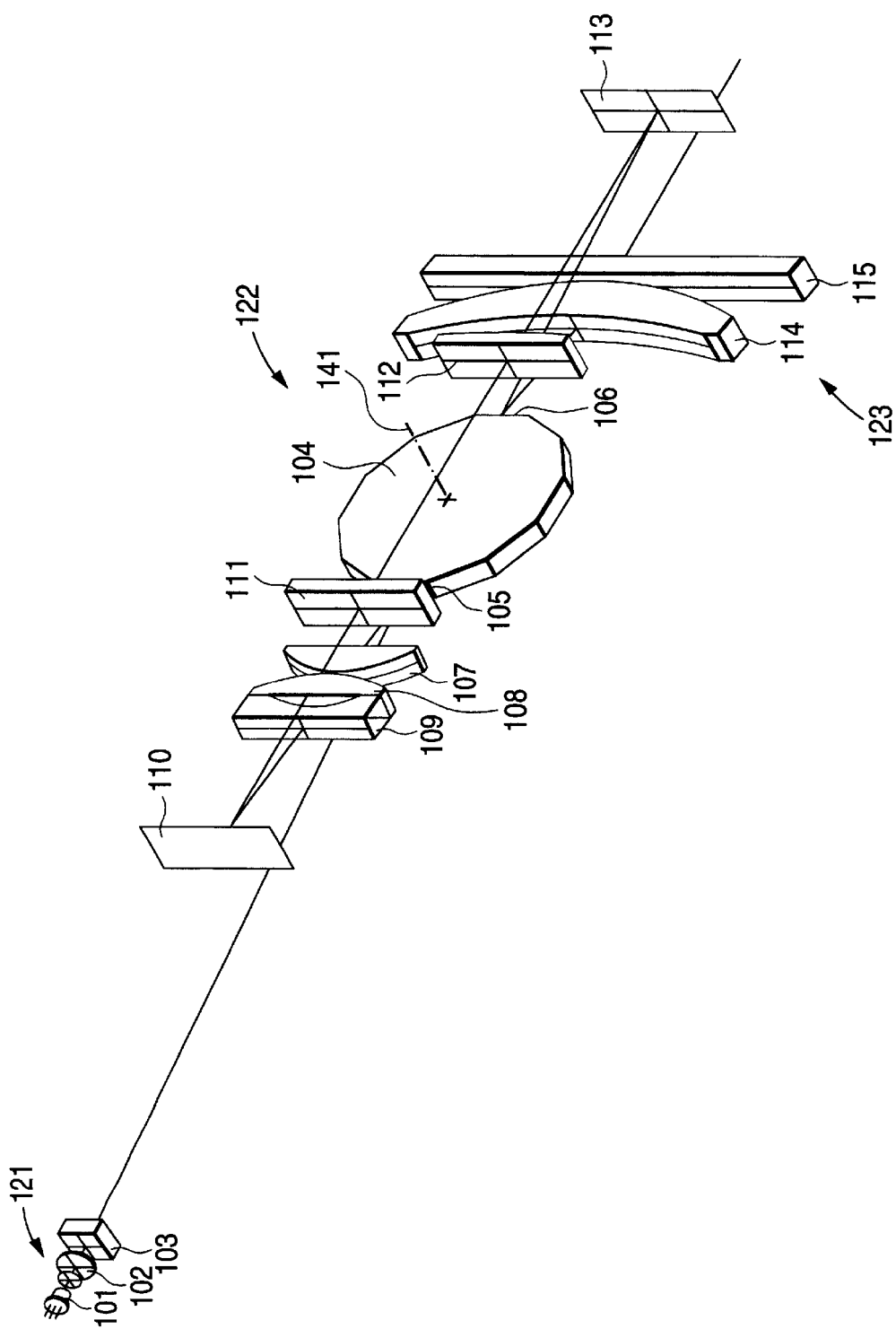
FIG. 32 is a perspective view showing a major portion of the optical scanning apparatus of FIG. 30.
Figure 33:
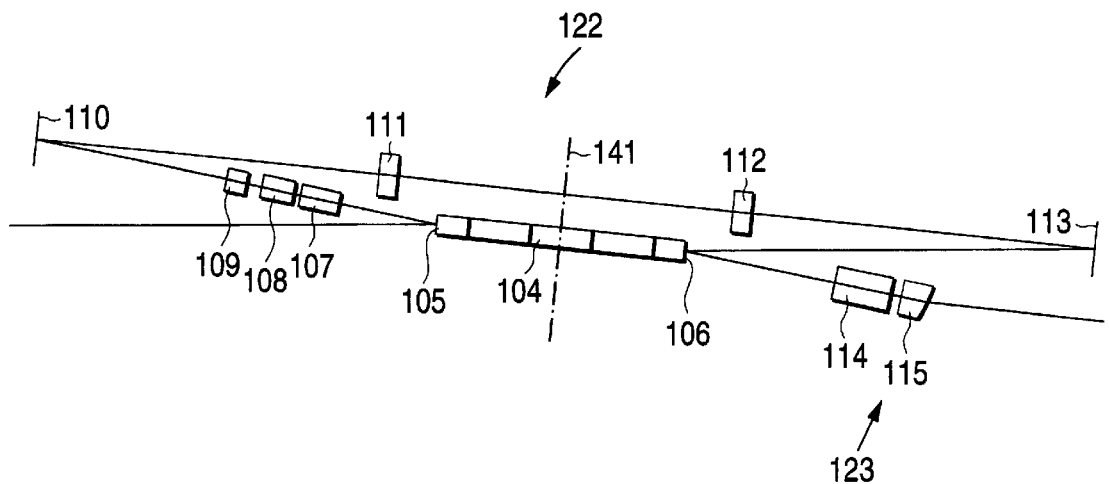
FIG. 33 is a side view showing a major portion of the optical scanning apparatus of FIG. 30.
Figure 34:
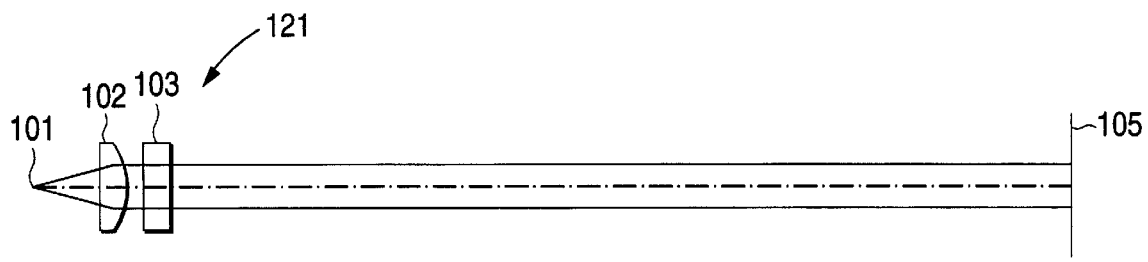
FIGS. 34(a) and (b) are diagrams showing optical paths of the shaping optics in the optical scanning apparatus of FIG. 30 in the main scanning direction and the sub-scanning direction, respectively.
Figure 34:
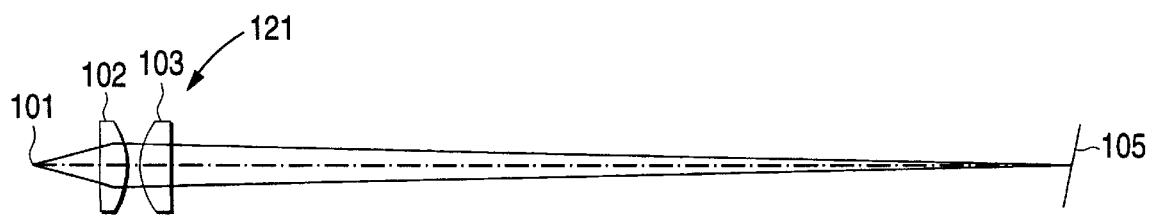
Figure 35:
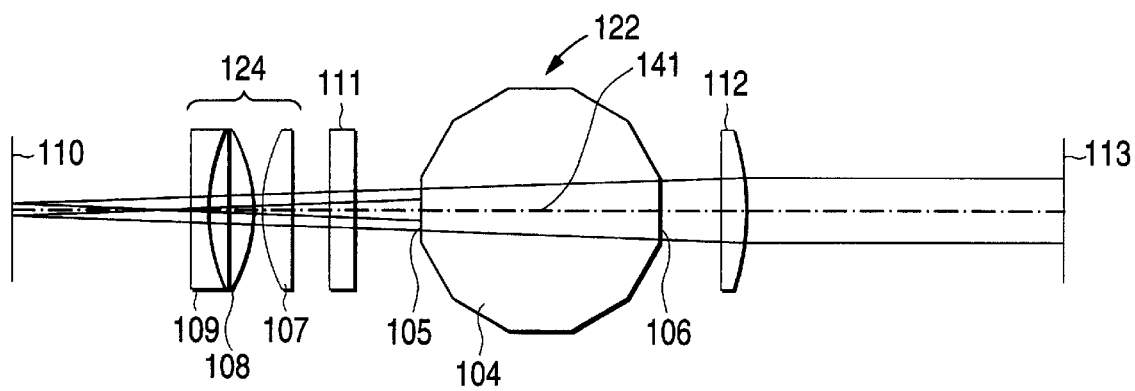
FIGS. 35(a) and (b) are diagrams showing optical paths of the transfer optics in the scanning apparatus of FIG. 30 in the main scanning direction and the sub-scanning direction, respectively.
Figure 35:
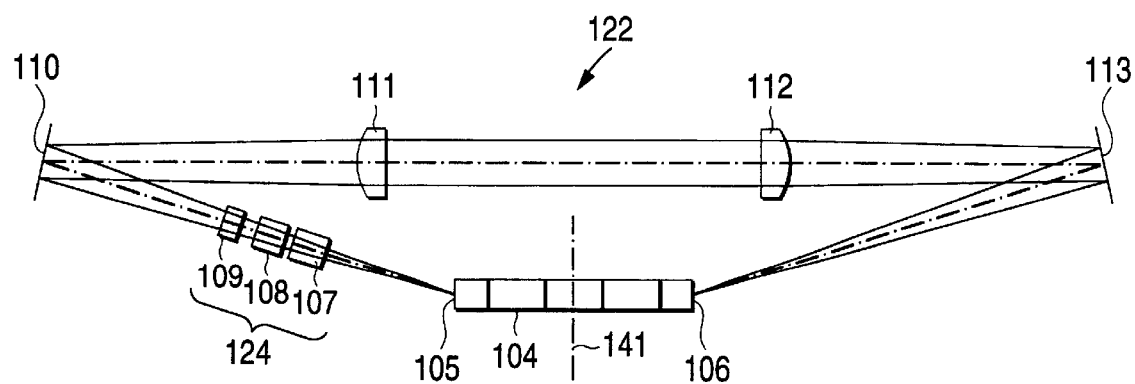
Figure 36:
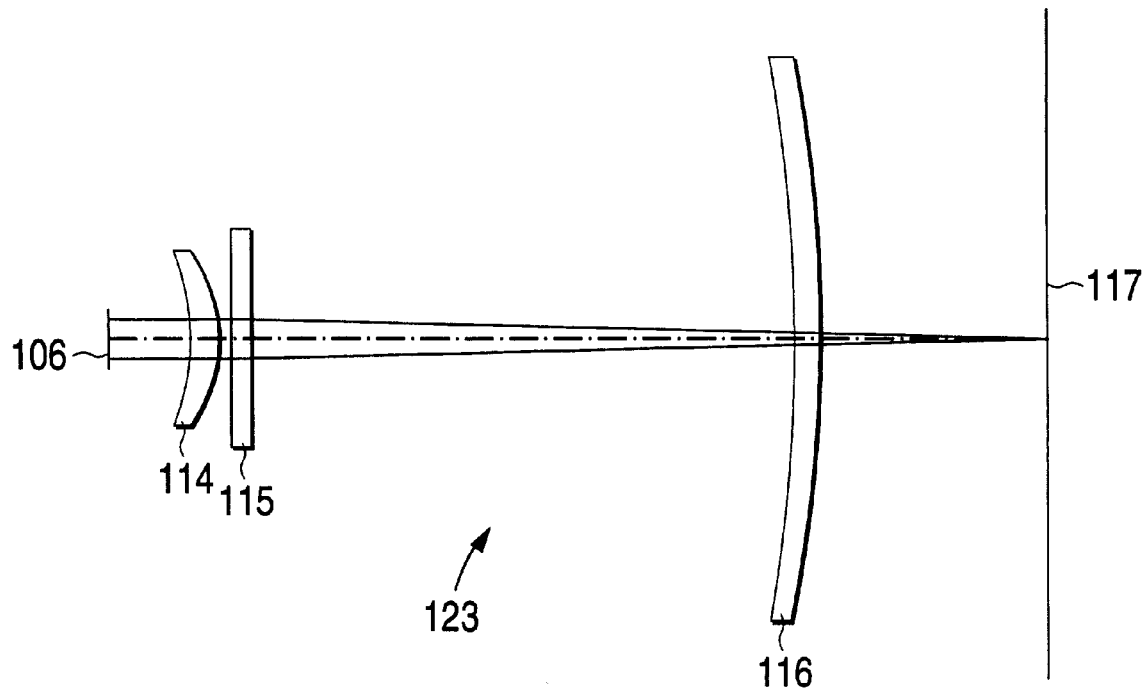
FIGS. 36(a) and (b) are diagrams showing optical paths of the scanning optics in the optical scanning apparatus of FIG. 30 in the main scanning direction and the sub-scanning direction, respectively.
Figure 36:
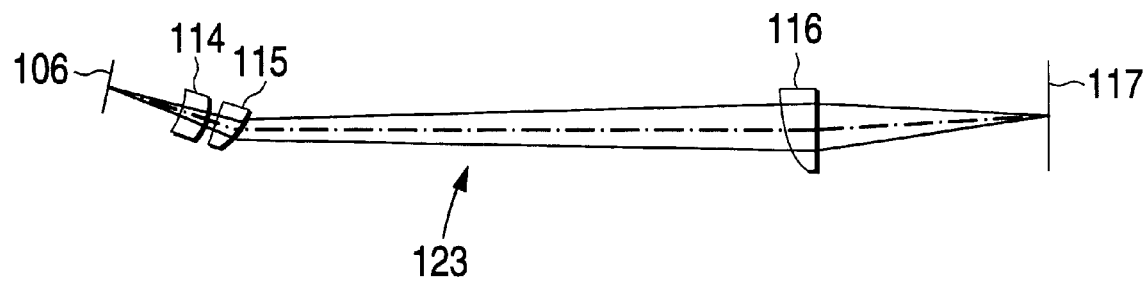
Figure 37:
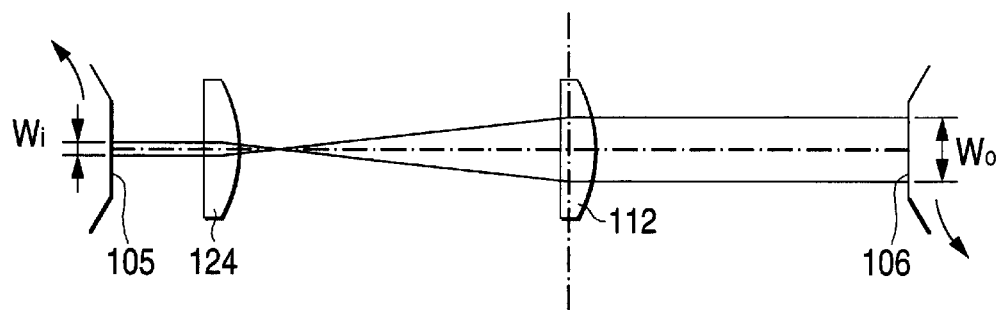
FIGS. 37(a) and (b) are exploded views of a section of the transfer optics in the main scanning plane, useful in explaining the operation of the transfer optics.
Figure 37:
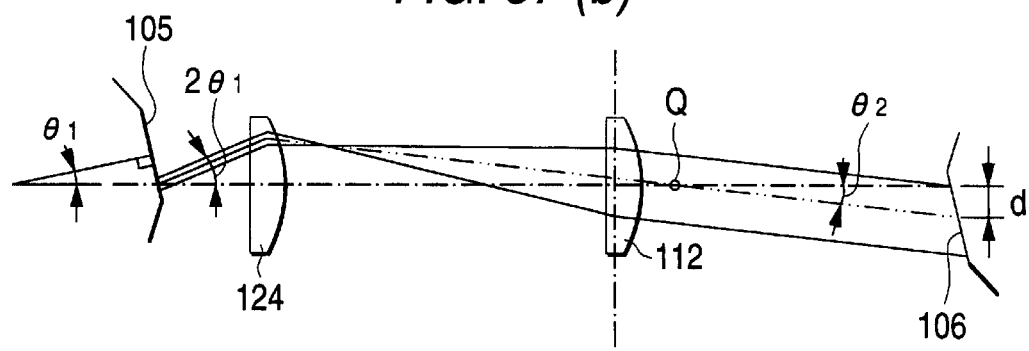

FIG. 30 is a plan view showing an arrangement of an optical scanning apparatus according to a first embodiment of the present invention, and FIG. 31 is a side view showing the optical scanning apparatus. FIG. 32 is a perspective view showing a major portion of the optical scanning apparatus of FIG. 30, and FIG. 33 is a side view showing a major portion of the optical scanning apparatus.

To assist in describing this embodiment of the invention, it is noted that a plane which includes an optical axis of an optical system and is parallel to a rotating axis 141 of a rotating polygonal mirror 104 as a deflector at a position in the optical system is defined as a sub-scanning plane; a plane including the optical axis of the optical system and perpendicular to the sub-scanning plane is defined as a main scanning plane; a direction normal to the optical axis in the main scanning plane is defined as a main scanning direction; and a direction normal to the optical axis in the sub-scanning plane is defined as a sub-scanning direction.

An optical beam is emitted from a semiconductor laser 101 as a light source, is passed through a first shaping lens 102 and a second shaping lens 103 where it is shaped, and is incident on a first reflecting surface 105 of the rotating polygonal mirror 104 where it is first deflected. At this time, the beam is incident on the first reflecting surface 105 while being slanted at an angle to the plane perpendicular to the rotating axis 141 of the rotating polygonal mirror 104, as best shown in FIG. 31. Therefore, the incident optical beam does not interfere with the reflected optical beam.

The beam is reflected on the first reflecting surface 105, passed through a first transfer lens 107, a second transfer lens 108, and a third transfer lens 109, and reflected by a first transfer mirror 110. The beam is then passed through a fourth transfer lens 111 and a fifth transfer lens 112, reflected by a second transfer mirror 113, and incident on a second reflecting surface 106 of the rotating polygonal mirror 104 where it is deflected again. At this time, the beam is also incident on the second reflecting surface 106 while being slanted at an angle to the plane perpendicular to the rotating axis 141 of the rotating polygonal mirror 104. Therefore, the incident beam does not interfere with the reflected beam.

An optical beam reflected by the second reflecting surface 106 is passed through a first scanning lens 114, a second scanning lens 115 and a third scanning lens 116, and focussed to form a beam spot on a scanned surface 117 to scan it. The rotating polygonal mirror 104 has 12 (an even number) facets, or reflecting surfaces. The third scanning lens 116 is deviated, or offset, in the sub-scanning direction as indicated by an arrow in FIG. 31. The reason why the third scanning lens 116 is offset follows. The optical beam that is reflected and deflected by the second reflecting surface 106 of the rotating polygonal mirror 104 depicts a conical locus. A coordinate system on the cross section of the optical beam rotates depending on an angle of the deviation. As a result, a beam spot imaged on the scanned surface 107 is disfigured. The disfiguring of the beam spot can be avoided by the deviation of the third scanning lens 116.

The optics ranging from the semiconductor laser 101 to the first reflecting surface 105 is referred to as a shaping optics 121; the optics ranging from the first reflecting surface 105 to the second reflecting surface 106 is referred to as a transfer optics 122; and the optics ranging from the second reflecting surface 106 to the scanned surface 117 is referred to as a scanning optics 123. The first reflecting surface 105 and second reflecting surface 106 of the rotating polygonal mirror 104 are oppositely disposed with respect to the rotating axis 141, while being parallel to each other.

Further, the optical axes of the shaping optics 121, the transfer optics 122 and the scanning optics 123 lie in a common plane or the sub-scanning plane including the optical axis of the scanning optics 123. Therefore, the optical scanning apparatus of the invention is arranged to be symmetrical with respect to the sub-scanning plane, although it is based on the dual incidence and the oblique incidence. Where such an arrangement is used, the optical axes of the shaping optics 121, the transfer optics 122 and the scanning optics 123 are linearly arrayed in the main scanning plane. Therefore, the structural reference planes in the main scanning plane are gathered into a single plane, so that the elements forming the optical system may be disposed with high precision.

Additionally, the optical axis of the transfer optics 122 overlaps with the optical axes of the shaping optics 121 and the scanning optics 123 when viewed in the main scanning plane. This structural feature reduces a space within which the elements of the optical scanning apparatus are assembled, an area required for installing the apparatus, and the apparatus size. Further, such an arrangement prevents a scanning line from varying in its position in the sub-scanning direction; otherwise, it is varied when the rotating axis 141 of the rotating polygonal mirror 104. This will subsequently be described in detail. FIGS. 34(a) and (b) are diagrams showing optical paths of the shaping optics 121 in the main scanning direction and the sub-scanning direction. An optical beam emitted from the semiconductor laser 101 with a cover glass is collimated by the first shaping lens 102 as an aspheric collimator lens. The second shaping lens 103 is a positive cylindrical lens having a positive refractive power only in the sub-scanning direction. Therefore, in the main scanning plane, the optical beam emanating from the second shaping lens 103 is incident as the parallel optical beam on the first reflecting surface 105, while in the sub-scanning plane, the beam is imaged (focused) on and near the first reflecting surface 105.

FIGS. 35(a) and 35(b) are diagrams showing optical paths of the transfer optics 122 in the main scanning direction and the sub-scanning direction. The first transfer lens 107, the second transfer lens 108 and the third transfer lens 109 are each a cylindrical lens having a refractive power only in the main scanning direction. More specifically, the first transfer lens 107 and the second transfer lens 108 are positive cylindrical lenses and the third transfer lens 109 is a negative cylindrical lens. These three lenses are combined into a positive refracting power transfer lens group 124. The fourth transfer lens 110 is a positive cylindrical lens, and the fifth transfer lens 112 is a spherical lens having a positive refractive power. The optical beam reflected by the first reflecting surface 105 is imaged in the main scanning plane by means of the positive refracting power transfer lens group 124. A focal point of the positive refracting power transfer lens group 124 in the image space is coincident with a focal point of the fifth transfer lens 112 in the object space. Those form an a focal optical system in the main scanning plane. For this reason, the optical beam is collimated again by the fifth transfer lens 112, and incident on the second reflecting surface 106. In the sub-scanning plane, by the resultant positive refractive power of the fourth transfer lens 111 and the fifth transfer lens 112, the first reflecting surface 105 is conjugated to the second reflecting surface 106. Hence, a convergent point close to the first reflecting surface 105 is imaged again at a point close to the second reflecting surface 106.

FIGS. 36(a) and 36(b) are diagrams showing optical paths of the scanning optics 123 in the main scanning direction and the sub-scanning direction. The first scanning lens 114 is a spherical lens having a positive refractive power. The second scanning lens 115 is a prism having a refractive power only in the sub-scanning direction, and the third scanning lens 116 is a long lens made of resin, which is long in the main scanning direction. The entrance surface of the third scanning lens 116 is concave with a large radius of curvature in the main scanning direction but convex with a small radius of curvature in the sub-scanning direction. The entrance surface of the third scanning lens 116 is formed by rotating its sectional profile curve in the main scanning direction about an axis that is parallel to the main scanning direction and located closer to the scanned surface 117 than to the entrance surface. A surface of this type is frequently called a "saddle-shaped toric" surface.

The exit surface of the third scanning lens 116 is nonarcuate and convex with a large radius of curvature in the main scanning direction, while having a linear sectional profile and no refractive power in the sub-scanning direction. In the scanning optics 123 thus arranged, in the sub-scanning plane, the second reflecting surface 106 is conjugated with the scanned surface 117, and hence a convergent point close to the second reflecting surface 106 is imaged on the scanned surface 117. In the main scanning plane, the parallel beam reflected by the second reflecting surface 106 is imaged on the scanned surface 117.

The operation of the transfer optics 122 will now be described. FIGS. 37(a) and (b) show exploded views of a section of the transfer optics in the main scanning plane, useful in explaining the operation of the transfer optics. In the figure, the positive refracting power transfer lens group 124, consisting of the first transfer lens 107, the second transfer lens 108 and the third transfer lens 109, is simplified and depicted in the form of a single lens. As noted above, the fourth transfer lens 111 has no refractive power in the main scanning direction, and hence is not illustrated. Typical light paths of the optical beam when the rotating polygonal mirror 104 rotates are shown in FIGS. 37(a) and 37(b). As shown in FIGS. 30 to 33, for example, the optical beam is reflected twice by the first and second transfer mirrors 110 and 113. That is, the beam is reflected an even number of times. The illustrations of FIGS. 37(a) and 37(b) are made based on the even number of reflections of the optical beam. Therefore, as shown in FIG. 37(b), the rotation direction of the first reflecting surface 105 is the same as that of the second reflecting surface 106.

The diameter of the parallel beam incident on the first reflecting surface 105 is $w_i$. The transfer optics 122 is an afocal optical system in the main scanning plane. Therefore, the optical beam incident on the second reflecting surface 106 is also parallel, and the diameter of it is $w_o$. A ratio of the beam diameters $w_o$ and $w_i$ is equal to a ratio of the focal distances f2 and f1 of the fifth transfer lens 112 and the positive refracting power transfer lens group 124 ($w_o/w_i$=f2/f1).

As shown in FIG. 37(b), when the rotating polygonal mirror 104 is turned by an angle θ1, the optical beam is deflected by an angle 2θ1. The deflected beam is further deflected by an angle θ2 through the passage of the positive refracting power transfer lens group 124 and the fifth transfer lens 112. The optical beam intersects the optical axis at a point Q. On the second reflecting surface 106, a distance between the deflected optical beam and the optical axis is d. The facets of the rotating polygonal mirror 104 are positionally arranged such that when the rotating polygonal mirror is turned by the angle θ1, the second reflecting surface 106 also moves the distance d. If so arranged, a quantity of a movement of the optical beam is equal to that of the second reflecting surface 106, so that the optical beam never hits an area out of the second reflecting surface 106.

At this time, the deflected beam is deflected in such a direction as to increase its incident angle to the second reflecting surface 106 by an angle θ2. Hence, a scanning angle θs of the optical beam reflected by the second reflecting surface 106 is expressed: θs=2θ1+θ2.

As referred to above, the transfer optics 122 is an afocal optical system in the main scanning plane. Therefore, its optical magnification β=f2/f1 (f2, f1: focal distance), and is also equal to the beam diameter ratio $w_o/w_i$. After passing through the transfer optics 122, the optical beam changes its deflection angle from 2θ1 to θ2. Therefore, the magnification β may also be expressed: β=2θ1/θ2. Thence, the magnification β may be expressed by $$\beta = w_o/w_i = f2/f1 = 2\theta1/\theta2.$$

In the present embodiment, the magnification β is set within the range of 1<β<20.

When an optical scanning apparatus of the type in which the optical beam is deflected two times by the rotating polygonal mirror 104, as of the present embodiment, is compared with a conventional optical scanning apparatus in which the optical beam is deflected only one time, the scanning speed of the former is higher than of the latter. This will be described hereunder.

In the optical scanning apparatus of the one-deflection type, when the rotating polygonal mirror rotates, its facets also move. Therefore, in order to insure that the whole optical beam falls within the same facet of the polygonal mirror through one scanning operation, it is necessary to set the facet or reflecting surface of the polygonal mirror to be larger than the size of the optical beam incident on the polygonal mirror in the main scanning direction. In this respect, there is a limit in increasing the number of the facets of the polygonal mirror.

In the present embodiment, the parallel optical beam is incident on the first reflecting surface 105. Since β>1, the diameter $w_i$ of the beam on the first reflecting surface 105 in the main scanning direction is smaller than the diameter $w_o$ of the beam on the second reflecting surface 106 in the main scanning direction. For this reason, even if the size of the first reflecting surface 105 is smaller than that of the corresponding one in the conventional apparatus, it is ensured that the entire beam always falls within the same reflecting surface through one scanning operation. As the diameter $w_i$ becomes smaller, the size of the first reflecting surface 105 may be reduced more. In the second deflection, when the rotating polygonal mirror 104 is turned, a quantity of a movement of the optical beam is equal to that of the second reflecting surface 106. Therefore, the size of the second reflecting surface 106 in the main scanning direction that is equal to the size of the incident optical beam will suffice.

The optical scanning apparatus of the dual deflection type is advantageous over the conventional one of the single deflection type in that the number of the facets of the polygonal mirror is increased and the scanning speed is correspondingly increased. This is due to the fact that in the optical scanning apparatus under discussion, the diameter $w_i$ of the optical beam on the first reflecting surface 105 in the main scanning direction may be smaller than the diameter $w_o$ on the second reflecting surface 106 in the same direction, and therefore the reflecting surface of the rotating polygonal mirror 104 may be reduced.

Specific numerical data for the thus designed optical scanning apparatus are given in Table 7. In the table, the radii of curvature of the cylindrical and toric surfaces in the sub-scanning and main scanning directions are denoted as rix and riy (where i: the surface number in the range of the light source 101 to the scanned surface 117). For an aspheric surface, the radius of curvature is expressed in terms of a value on the optical axis.

TABLE 7

| Si | ri | di | ni | Element |
|---|---|---|---|---|
| S0 | ∞ | 1.000000 | | Light emitting point of light source |
| S1 | ∞ | 0.250000 | 1.510723 | Entrance surface of cover glass |
| S2 | ∞ | 2.090490 | | Exit surface of cover glass |
| S3 | ∞ | 2.000000 | 1.675004 | Entrance surface of 1st shaping lens |
| S4 | −3.00377 | 2.000000 | | Exit surface of 1st shaping lens |
| S5 r5y | ∞ | 3.000000 | 1.510723 | Entrance surface of 2nd shaping lens |
| r6x | 78.04541 | | | |
| S6 | ∞ | 135.000000 | | Exit surface of 2nd shaping lens |
| S7 | ∞ | 16.175753 | | 1st reflecting surface of polygonal mirror |
| S8 | ∞ | 6.500000 | 1.785649 | Entrance surface of 1st transfer lens |
| S9 r9y | −18.43670 | 1.000000 | | Exit surface of 1st transfer lens |
| r9x | ∞ | | | |
| S10 r10y | 24.49575 | 5.500000 | 1.785649 | Entrance surface of 2nd transfer lens |
| r10x | ∞ | | | |
| S11 | ∞ | 2.500000 | | Exit surface of 2nd transfer lens |
| S12 r12y | −21.73972 | 3.000000 | 1.510723 | Entrance surface of 3rd transfer lens |
| r12x | ∞ | | | |
| S13 | ∞ | 30.843747 | | Exit surface of 3rd transfer lens |
| S14 | ∞ | 54.480500 | | 1st transfer mirror |
| S15 r15y | ∞ | 3.000000 | 1.510723 | Entrance surface of 4th transfer lens |
| r15x | 52.80282 | | | |
| S16 | ∞ | 54.000000 | | Exit surface of 4th transfer lens |
| S17 | ∞ | 3.000000 | 1.510723 | Entrance surface of 5th transfer lens |
| S18 | −69.63164 | 54.480500 | | Exit surface of 5th transfer lens |
| S19 | ∞ | 65.519500 | | 2nd transfer mirror |
| S20 | ∞ | 24.425089 | | 2nd reflecting surface of polygonal mirror |
| S21 | −84.40839 | 9.000000 | 1.510723 | Entrance surface of 1st scanning lens |
| S22 | −59.40511 | 2.000000 | | Exit surface of 1st scanning lens |
| S23 | ∞ | 4.000000 | 1.510723 | Entrance surface of 2nd scanning lens |
| S24 | ∞ | 256.574911 | | Exit surface of 2nd scanning lens |
| S25 r25y | −1475.39378 | 4.005042 | 1.486244 | Entrance surface of 3rd scanning lens |
| r25x | 37.95675 | | | |

TABLE 7-continued

| Si | ri | di | ni | Element |
|---|---|---|---|---|
| S26 r26y | −18216.95051 | 100.279090 | | Exit surface of 3rd scanning lens |
| r26x | ∞ | | | |
| S27 | ∞ | | | Scanned surface | where:
Si: surface indicated by the surface number i;
ri: radius of curvature the surface indicated by i;
di: distance between the surfaces i and (i+1);
ni: refractive index of a medium between the surfaces i and (i+1) at 780 nm in wavelength.

The aspheric surfaces of the first shaping lens 102 and the third scanning lens 116 are each mathematically expressed by $$zi=(y^2/ri)/[1+\{1-(k_1+1)(y/ri)^2\}^{1/2}]+Aiy^4+Biy^6+Ciy^8$$

The aspheric coefficients take the values list in Table 2 below.

TABLE 8

| | $S_4$ | $S_{26y}$ |
|---|---|---|
| r | −3.00377 | −18216.95051 |
| K | −0.736381 | 0 |
| A | −0.806641 × 10$^{-3}$ | 0.174295 × 10$^{-7}$ |
| B | −0.602027 × 10$^{-5}$ | 0 |
| C | 0.102118 × 10$^{-5}$ | 0 | where:
S4: aspheric coefficients of the surface i; and
S26y: aspheric coefficients of the surface 126 in the main scanning direction.

In this example, the entrance surface S25 of the third scanning lens 116 is a toric surface formed by rotating a circular arc of r25γ (=−1475.39378) at r23x (=37.95675). It is assumed that when the optical path of the optical beam is refracted as in the case where it passes through the second scanning lens 115 and the third scanning lens 116, the optical axis, like the principal ray, is refracted. On this assumption, the optical axis as the reference for parameters in the tables 7 and 8 is always coincident with the principal ray of the beam which scans the scan center.

Also in the example, the number of the facets of the rotating polygonal mirror 104 is 12; the diameter of the inscribed circle is 38.64 mm; an angle at which the optical beam is incident on each of the first and second reflecting surfaces 105 and 106 of the rotating polygonal mirror 104 in the sub-scanning direction is 6°; and an angle at which the optical beam is incident on each of the first and second transfer mirrors 110 and 113 in the sub-scanning direction is 3°. The exit surface S24 of the second scanning lens 115 is tilted at 13° in the cross section when viewed in the sub-scanning direction; the entrance surface S25 of the third scanning lens 116 is tilted at 8.750387° in the cross section when viewed in the sub-scanning direction; and the exit surface S26 of the third scanning lens 16 is tilted at 2.875374° in the sub-scanning cross section. For the orientations of the tilt angles, reference is made to FIGS. 31 and 33.

A rectangular aperture of 0.7154 mm long in the main scanning direction and 1.0526 mm long in the sub-scanning direction is disposed while being positionally coincident with the entrance surface S3 of the first shaping lens. In the sub-scanning direction, the light emitting point 101 is not conjugated to the first reflecting surface 105 in terms of geometrical optics. The first reflecting surface 105, the second reflecting surface 106, and the scanned surface 117 are conjugated to one another. Therefore, the tilt of the rotating polygonal mirror 104 has been corrected. Accordingly, the light emitting point 101 and the scanned surface 117 are not conjugated to each other. By the influence of refraction, a position where the optical beam is minimized is out of the point of imaging in geometrical optics, and the scanned surface 117 is located at a position where the optical beam is substantially minimized.

In the above-mentioned example, the optical magnification β of the transfer optics 122 in the transfer optics 122 is 8.24 in the main scanning direction, and 1.12 in the sub-scanning direction. The optical magnification β of the scanning optics 123 is 0.406 in the sub-scanning direction.

Figure 38:
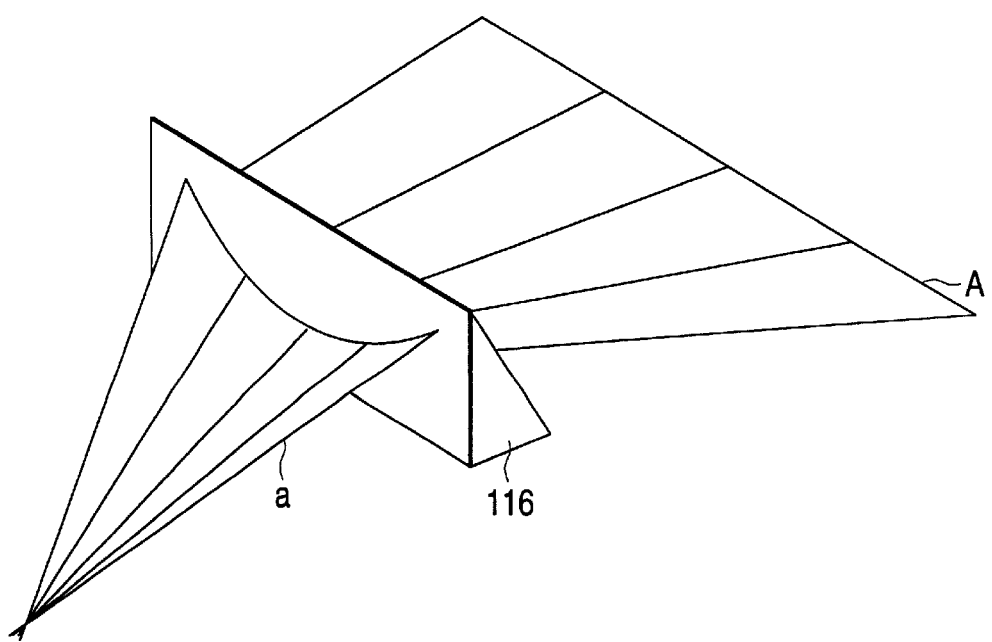
FIG. 38 is a diagram useful in explaining the correcting operation of a refractive prism.

As noted above, the second scanning lens 115 is a prism which is refractive only in the sub-scanning direction. The function of the prism will be described. The optical beam reflected and deflected by the second reflecting surface 106 of the rotating polygonal mirror 104 depicts a conical locus. When the prism of the second scanning lens 115 is not used, a curved beam locus is depicted on the long lens of the third scanning lens 116. The third scanning lens 116 functions to convert a conical locus of an optical beam into a linear locus A of the optical beam on the entrance surface of the scanned surface 117 as shown in FIG. 38 in the form of a model.

Figure 39:
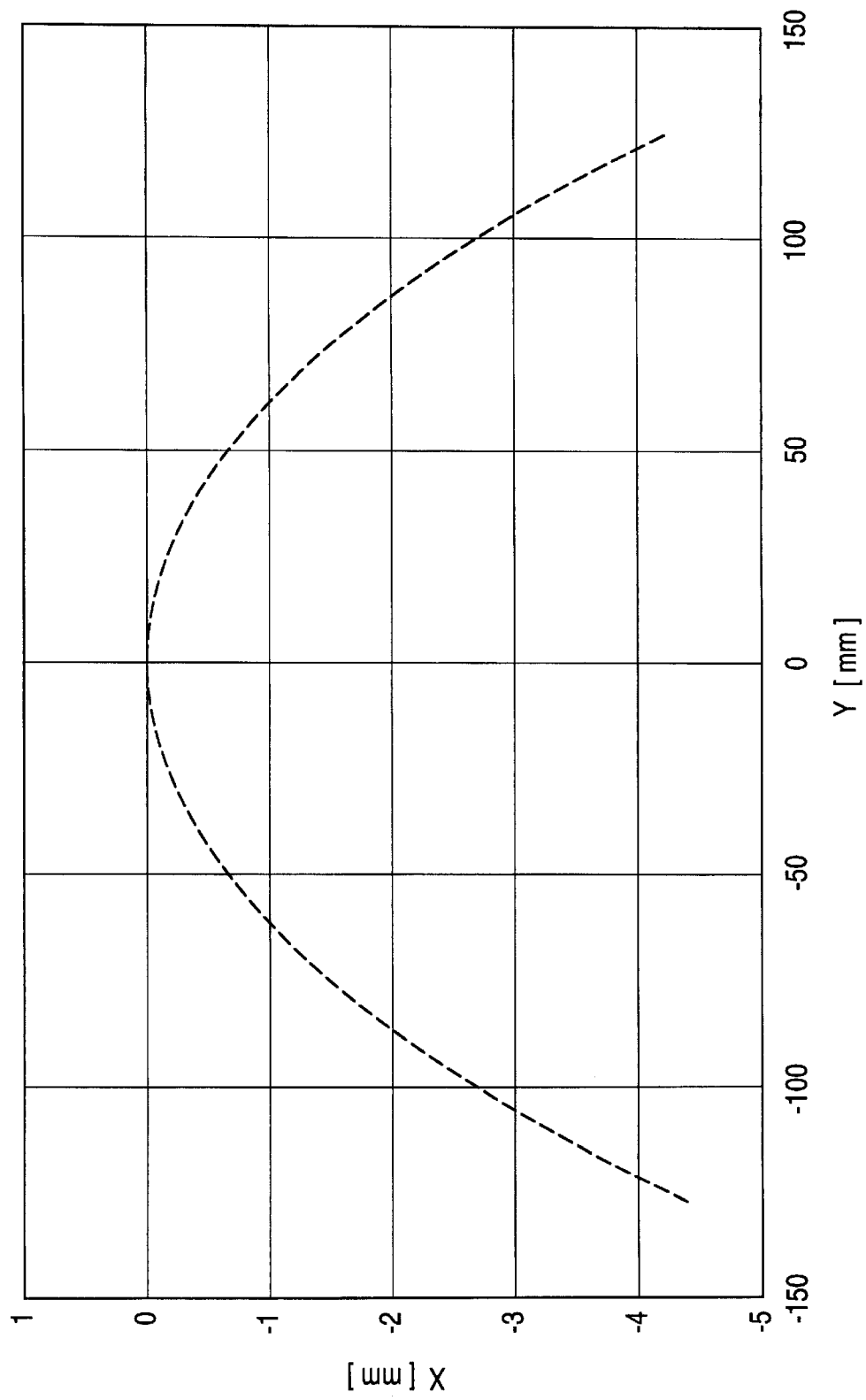
FIG. 39 is a graph showing a beam locus on the entrance surface of a third scanning lens in a specific example of the invention.

FIG. 39 shows a profile of the beam locus on the entrance surface of the third scanning lens 116 in the above-mentioned example. In the figure, the profile is indicated by a solid line. Also in the figure, the Y- and X-directions correspond to the main and sub-scanning directions, respectively. For the vehicle of comparison, a beam locus on the entrance surface of the third scanning lens 116 was profiled under the condition that a distance from the second reflecting surface 106 of the rotating polygonal mirror 104 to the third scanning lens 116 is left unchanged and only the second scanning lens 115 is removed. A profile of the beam locus is indicated by a broken line. The graph of FIG. 39 shows that the second scanning lens 115 functions to correct the curved beam locus into a linear beam locus.

Figure 40:
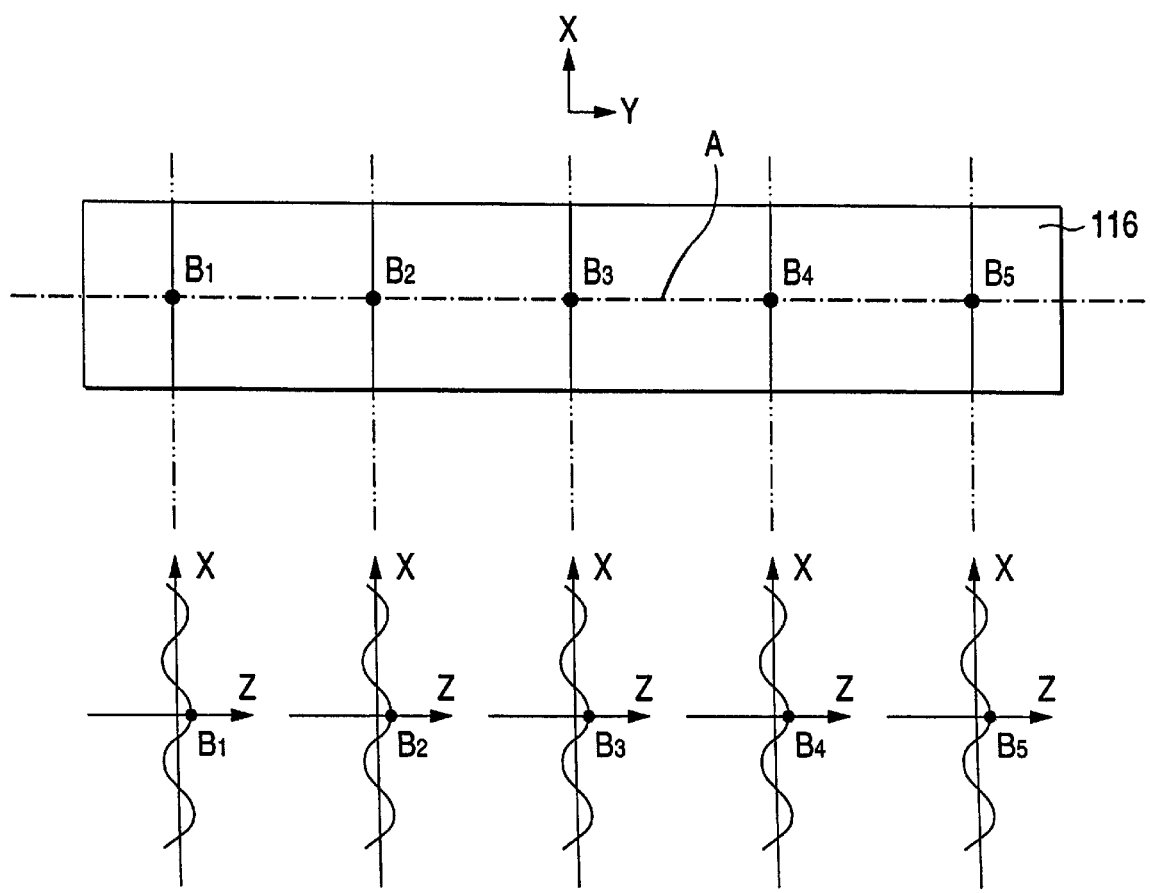
FIG. 40 is a diagram for explaining why no curvature of field is produced in the specific example.

FIG. 40 shows a sectional profile of the third scanning lens 116 in the sub-scanning direction at several (five) positions arrayed in the main scanning direction. In the figure, errors of measuring values of the sectional profile for the design values are shown. In the figure, X, Y and Z are representative of the sub-scanning direction, the main scanning direction and the optical axis direction, respectively. As shown in FIG. 40, configuration errors of such a lens having a "saddle-shaped toric" surface as the third scanning lens 116 are substantially equal at the positions of the lens in the main scanning direction, but periodically vary in the sub-scanning direction. As referred to above, the beam locus on the third scanning lens 116 is linear as the result of the beam locus correction made through the prism action of the second scanning lens 115. Therefore, the incident beam always lands at the positions of the third scanning lens, which corresponds to the tops of the undulatory curves representative of the configuration errors at points B1 to B5 on the lens in the main scanning direction. When the incident beam thus lands at the positions corresponding to the tops of the configuration-error undulatory curve, the imaging positions in the sub-scanning direction are shifted to points short of designed positions. In this case, the shifts of the imaging positions are uniform over the entire scanning region.

Therefore, the shift of the imaging position can be removed by an adjustment made for the optical system, for example, adjusting the position of the third scanning lens 116. A curvature of field, if produced, can be removed by such an adjustment.

The shifts of the reflecting surfaces of the rotating polygonal mirror 104 from its rotating axis 141 will be described. There are two sources of the offsets of the reflecting surfaces 105 and 106 of the rotating polygonal mirror 104 from its rotating axis 141. A first source is an offset between the center axis 141 of the rotating polygonal mirror 104 and the rotating axis of the motor, and a second source is a manufacturing error produced when the reflecting surfaces or facets of the rotating polygonal mirror 104 are cut.

Figure 41:
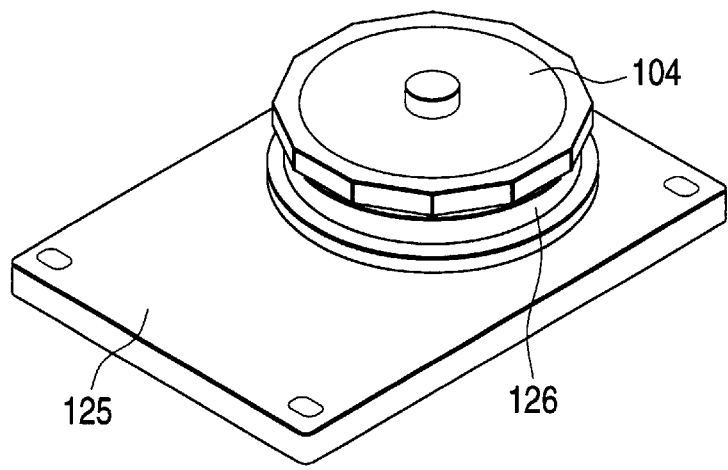
FIG. 41 is a perspective view showing an example of a mirror deflecting device used in the optical scanning apparatus of the invention.
Figure 42:
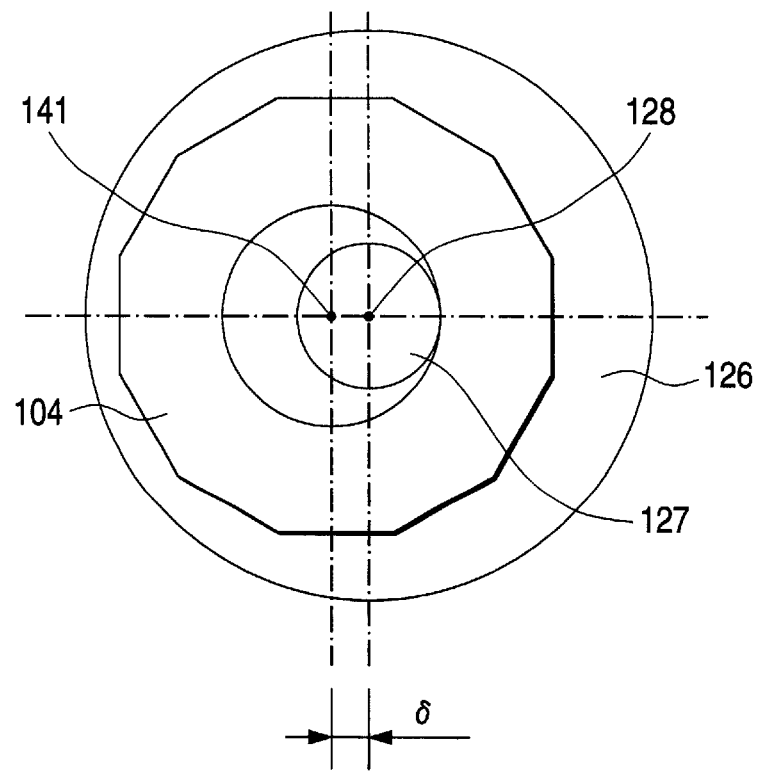
FIG. 42 is a diagram showing a model for explaining an offset of the center axis of the rotating polygonal mirror from the rotating axis of the motor, caused by a manufacturing error.
Figure 43:
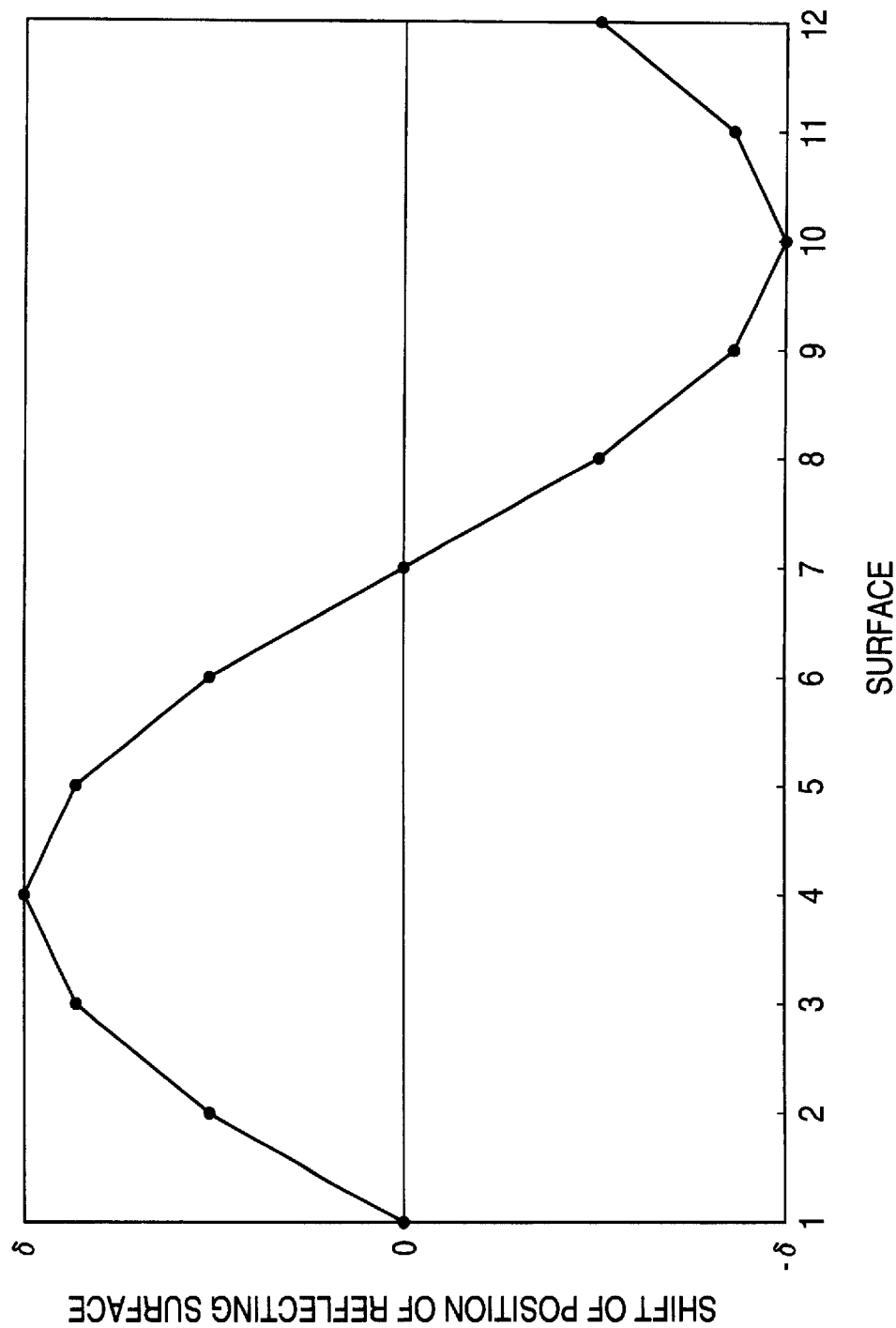
FIG. 43 is a graph showing a sinusoidal variation of a position of each facet of the rotating polygonal mirror with respect to the rotating axis of the motor at a period of one turn.

The first source will first be described. As shown in FIG. 41, a mirror deflecting device 125 is composed of a rotating polygonal mirror 104 attached to the rotating axis of a motor. An offset δ is present between the center axis 141 of the rotating polygonal mirror 104 and the center 128 of the rotating axis 127 of the motor 126 because of the manufacturing error, as depicted as a model in FIG. 42. As shown in FIG. 43, a position of each reflecting surface or facets of the rotating polygonal mirror 104 sinusoidally varies with respect to the rotating axis 127 at periods each equal to one turn. In the embodiment, the number of the facets of the rotating polygonal mirror 104 is 12, and the offset between the center axis 141 of the rotating polygonal mirror 104 and the rotating axis 127 of the motor 126 is usually several tens μm.

The shift of each facet of the rotating polygonal mirror 104, which results from the second source, is irregular and randomly takes place. The shift produced by the second source is smaller than by the first source, and accordingly the first source dominantly produces the shifts.

Figure 44:
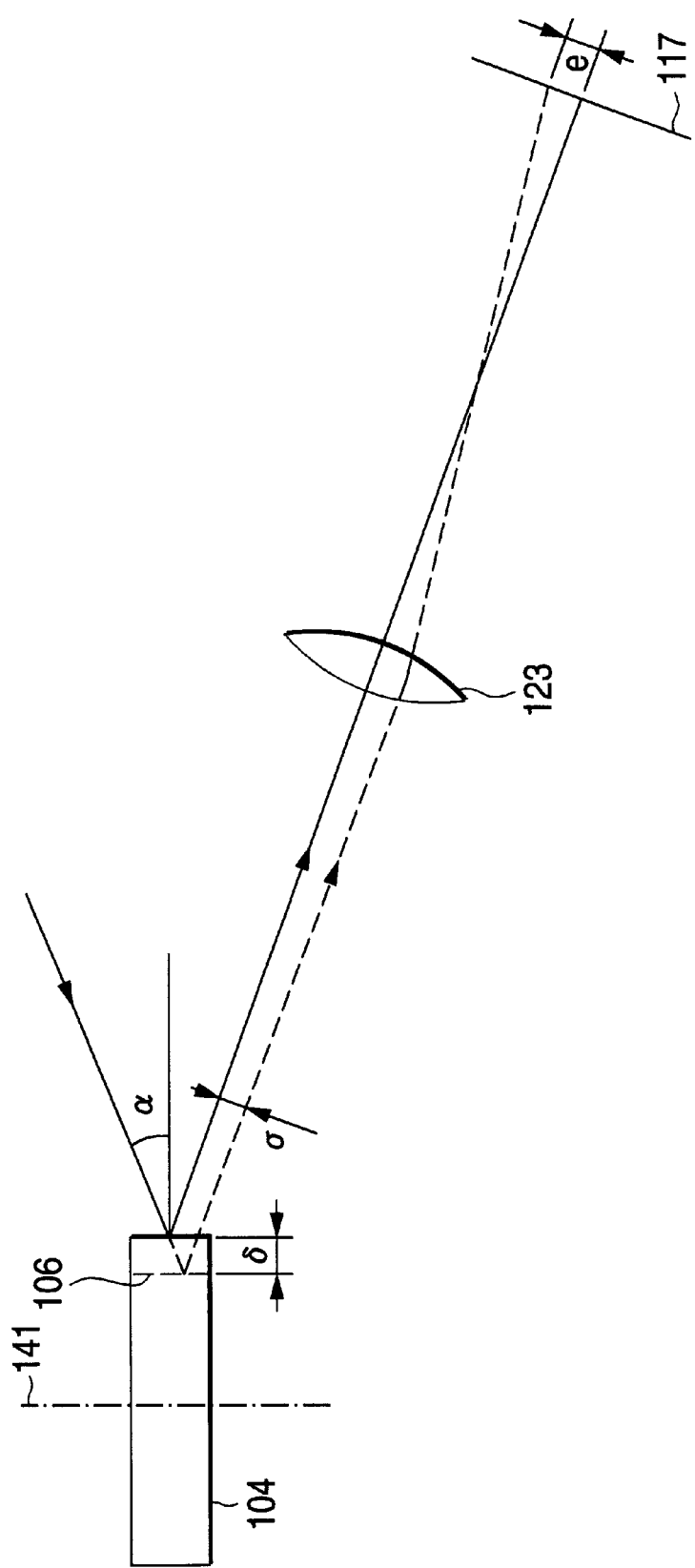
FIG. 44 is a diagram showing optical paths in the sub-scanning direction for explaining a shift of an optical beam, which is caused when the beam is incident once on the rotating polygonal mirror.

The influence of the shifts of the reflecting surfaces of the rotating polygonal mirror 104 upon the scanning line will now be described. Let us consider a shift of the second reflecting surface 106 of the polygonal mirror 104, which is produced when the optical beam is incident only once on the second reflecting surface 106. As shown in FIG. 44 showing optical paths in the sub-scanning direction, an optical beam is incident on the second reflecting surface 106 of the polygonal mirror 104 while being slanted at an angle α (obliquely incident) to the sub-scanning direction. The shift of the second reflecting surface 106 from the rotating axis 141 of the polygonal mirror 104 is δ. A shift d of the reflected beam is $$d = 2\alpha\delta.$$

In the above equation, tan α is approximated to be α: tan α ≒ α since α is extremely small. If a magnification of the scanning optics 123 in the sub-scanning direction is βs, a shift e of the beam in the sub-scanning direction on the scanned surface 117 is $$e = 2\alpha\delta\beta s.$$

To remove the shift of the scanning line in the sub-scanning direction, which is due to the offset of the rotating axis 141 of the rotating polygonal mirror 104, the present invention employs the technical idea as implemented in the above-mentioned embodiment: The optical beam is incident twice on the two reflecting surfaces 105 and 106 of the rotating polygonal mirror 104. These reflecting surfaces 105 and 106 are disposed in opposition to each other while being parallel to each other.

Figure 45:
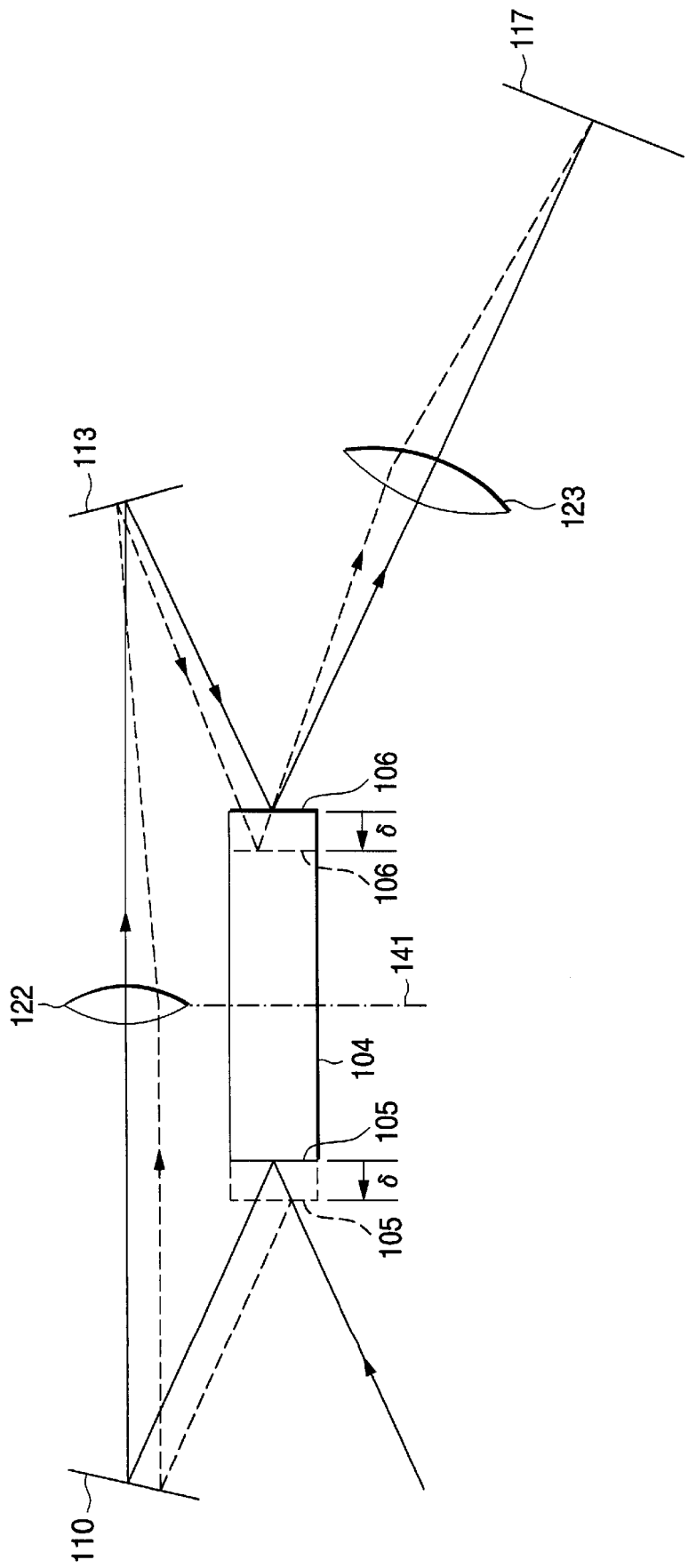
FIG. 45 is a diagram showing optical paths in the sub-scanning direction for explaining why a shift of the beam is not produced in the optical scanning apparatus of the invention.

The principle of the invention will be described referring to FIG. 45. Optical paths of the principal ray in the sub-scanning direction on or near the rotating polygonal mirror 104 of the optical scanning apparatus constructed according to the present invention are shown in FIG. 45. As seen from FIG. 45, an optical beam that is emitted form the light source is incident on the first reflecting surface 105 of the rotating polygonal mirror 104, and reflected and deflected by the first reflecting surface. The optical beam, which has undergone the first deflection, is transmitted by the transfer optics 122, and incident again on the second reflecting surface 106 of the polygonal mirror 104 opposed to the first reflecting surface 105, and reflected and deflected again by the first reflecting surface. The optical beam thus deflected twice is guided by the scanning optics 123 and imaged on the scanned surface 117 to scan the surface. The optical beams that are incident on the first and second reflecting surfaces 105 and 106 are both slanted at angles to the sub-scanning direction. With such an arrangement, as seen from FIG. 45, if the rotating axis 141 of the rotating polygonal mirror 104 is offset from the rotating axis of the motor, the directions of the shifts δ of the first and second reflecting surfaces 105 and 106 are the same, and the optical path indicated by a solid line is changed to an optical path indicated by a broken line. When the first and second reflecting surfaces 105 and 106 are shifted to the left as shown, the optical path immediately after the beam is reflected by the first reflecting surface 105 is shifted downward. However, it is shifted upward just before it reaches the second reflecting surface 106, by an imaging action of the transfer optics 122. Since the beam is obliquely incident on the second reflecting surface 106 from above, the principal ray, after being reflected, passes through a point that is substantially coincident with a reflecting point when no shift of the beam is present (indicated by a solid line). The beams, shifted and not shifted, are reflected at different angles on the second reflecting surface 106; however, those beams land at substantially the same positions on the scanned surface 117 since the second reflecting surface 106 is conjugated to the scanned surface 117 through the scanning optics 123. This principle of the invention will readily be understood when comparing the FIGS. 45 and 44. The principle may also be described such that even if the rotating axis 141 of the rotating polygonal mirror 104 is offset from the motor shaft, the beam shift produced on the first reflecting surface 105 is canceled by the beam shift on the second reflecting surface 106 since the shift directions of the first and second reflecting surfaces 105 and 106 are the same.

Figure 46:
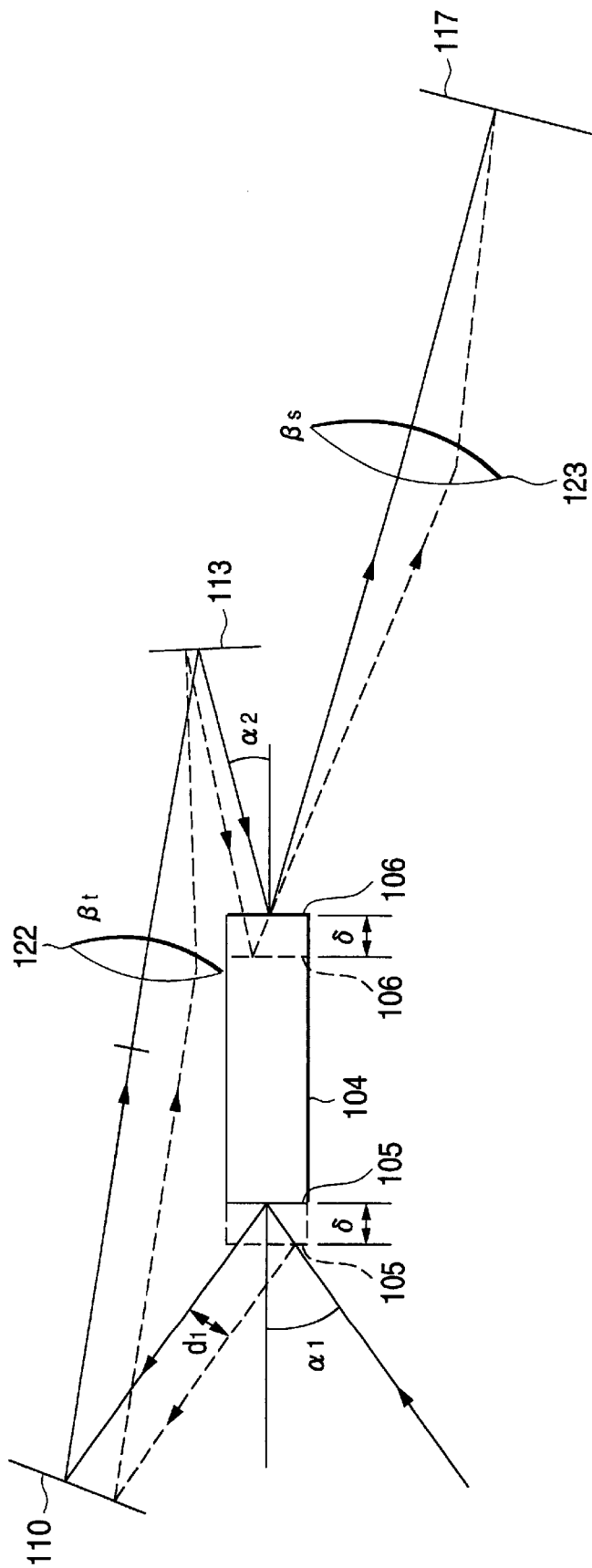
FIG. 46 is a diagram showing parameters in the optical scanning apparatus of the invention.

The description of the principle of the invention made above is qualitative. Now, the principle will be quantitatively described hereunder. Reference is made to FIG. 46. In the figure: α1 is an angle of the optical beam to the first reflecting surface 105; α2 is an angle of the optical beam to the second reflecting surface 106; βt is a magnification of the transfer optics 122 in the sub-scanning direction; and δ is a shift of each of the first and second reflecting surfaces 105 and 106, which is due to an offset of the rotating axis 141 of the rotating polygonal mirror 104. A shift d1 of an optical beam reflected by the first reflecting surface 105 is given by $$d1 = 2\alpha 1\delta.$$

In the above equation, tan α1 is approximated to be α1: tan α1 ≒ α1 since α1 is extremely small. The unit for expressing α1 is radian. The shift d1 becomes 2α1δβt on the second reflecting surface 106, through an optical action by the transfer optics 122. A shift d2 of the optical beam reflected by the second reflecting surface 106 is caused by a shift of the second reflecting surface 106, and given by $$d2 = 2\alpha 2\delta.$$

In the above equation, tan α is approximated to be α2: tan α2 ≒ α2 since α2 is extremely small. The unit for expressing α2 is radian. When the shifts of both the first and second reflecting surfaces 105 and 106 are taken into consideration, a shift d of the optical beam reflected by the second reflecting surface 106 is expressed by $$d = |2\alpha 1\delta\beta t - 2\alpha 2\delta|$$

$$= 2\delta|\alpha 1\beta t - \alpha 2|.$$

When a magnification of the scanning optics 123 in the sub-scanning direction is βs, a shift e of the optical beam on the scanned surface 117 is expressed $$e = 2\delta\beta s|\alpha 1\beta t - \alpha 2|.$$

Therefore, $$\beta t = \alpha 2/\alpha 1. \tag{3}$$

This equation describes that correction is made of a shift of the scanning line in the sub-scanning direction, which arises from the shifts of the first and second reflecting surfaces 105 and 106 caused by an offset of the rotating axis 141 of the rotating polygonal mirror 104, and the scanning line is at a fixed position.

A tolerable quantity of the shift e is ¼ of a distance p between the scanning lines on the scanned surface 117 in the sub-scanning direction. If it exceeds the tolerable quantity, an exposure quantity becomes irregular over the scanned surface 117.
Therefore, $$2\delta\beta s|\alpha 1\beta t - \alpha 2| \leq p/4.$$

That is, the following condition must be satisfied $$\delta\beta s|\alpha 1\beta t - \alpha 2|/p \leq \tfrac{1}{8}. \tag{4}$$

In the specific example mentioned above, βt=1.12, βs=0.406, α1=α2=0.105 radian (=6°), p=0.0423 mm (corresponding to 600 dpi), and a maximum value of δ=0.93 mm.
Therefore, $$\delta\beta s|\alpha 1\beta t - \alpha 2|/p = 0.0036$$

Figure 47:
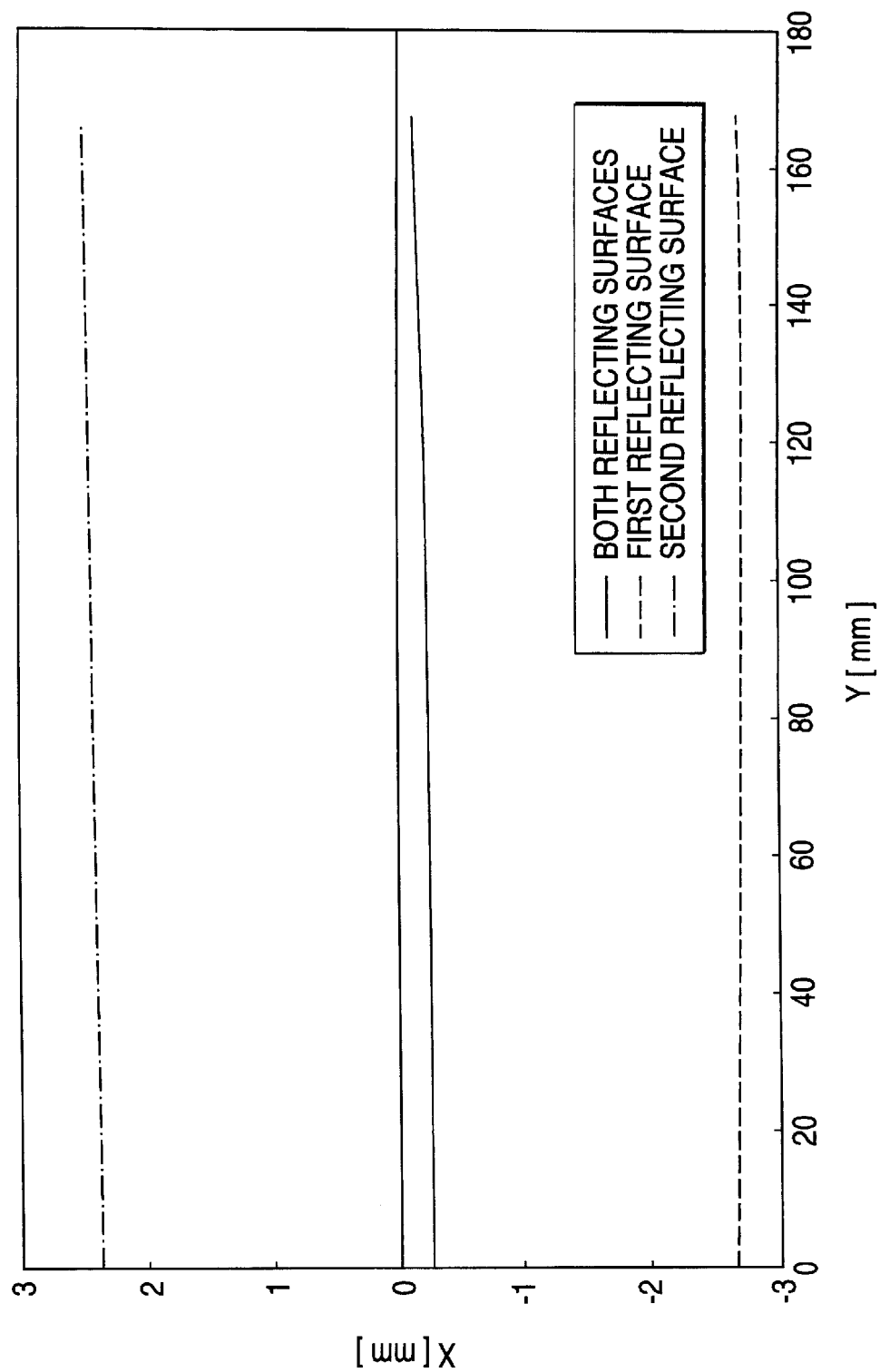
FIG. 47 is a diagram showing a shift of a scanning line in the example of the invention.

This satisfies the expression (4). A shift of the scanning line in this instance is shown in FIG. 47. In the figure, the Y- and X-directions correspond to the main and sub-scanning directions, respectively. Also in the figure, a broken line indicates a shift of the scanning line caused by a shift of the first reflecting surface 105 alone; a one-dot-chain line indicates a shift of the scanning line caused by a shift of the second reflecting surface 106 alone; and a solid line indicates a shift of the scanning line caused by the shifts of both the reflecting surfaces 105 and 106. As seen from the graph, the adverse influence by the shift of the first reflecting surface 105 is canceled by that by the shift of the second reflecting surface 106, and the shift of the scanning line is satisfactorily corrected.

While a specific embodiment of the present invention has been described, it should be understood that the invention may variously be modified, changed and altered within its scope and spirits.

As seen from the foregoing description, an optical scanning apparatus of the invention is of the type in which an optical beam is incident twice on a rotating polygonal mirror. The optical scanning apparatus is constructed such that first and second reflecting surfaces of the rotating polygonal mirror are oppositely disposed with respect to the rotating axis of the polygonal mirror while being parallel to each other, an optical beam is obliquely incident on the first and second reflecting surfaces of the polygonal mirror, and the first reflecting surface, the second reflecting surface and a surface to be scanned are substantially conjugated to one another. With such a construction, correction is made of a shift of a scanning line in the sub-scanning direction, which arises from the shifts of the first and second reflecting surfaces that are caused by an offset of the rotating axis of the polygonal mirror from the rotating axis of a motor, and a picture is faithfully reproduced without any irregularity.

What is claimed is:

1. An optical scanning apparatus comprising:

a light source for issuing an optical beam;

a rotatable scanner having at least first and second reflecting surfaces; and transfer optics, wherein said optical beam issued from said optical source is incident on said first reflecting surface of said rotatable scanner, wherein the optical beam deflected by said first reflecting surface is incident by said transfer optics on said second reflecting surface, which is different from said first reflecting surface, with the thus deflected optical beam being focused to form a beam spot on a surface to be scanned, and wherein the incident optical beam falls on the first and second reflecting surfaces of said scanner at the same absolute angle in the sub-scanning direction.

2. An optical scanning apparatus according to claim 1, wherein the first and second reflecting surfaces of said scanner are parallel to each other and the optical path from the first to the second reflecting surface crosses the rotating axis of said scanner.

3. The optical scanning apparatus as claimed in claim 2, wherein said transfer optics is an afocal optical system in a main scanning direction and an optical magnification ratio w0/w1 is not less than one, wherein said w1 is a width of the optical beam on said first reflecting surface in the main scanning direction, and wherein said w0 is a width of the optical beam formed on said second reflecting surface in the main scanning direction.

4. An optical scanning apparatus comprising:

a light source for issuing an optical beam;

a scanner, including at least first and second reflecting surfaces, for deflecting the optical beam issued from said light source;

transfer optics by which the optical beam deflected by said first reflecting surface of said scanner is allowed to be incident on said second reflecting surface of said scanner; and scanning optics by which the optical beam deflected by said second reflecting surface of said scanner is allowed to be focused to form a beam spot on a surface to be scanned;

wherein said transfer optics are arranged in such a way that images respectively corresponding to said first and second reflecting surfaces of the scanner are substantially conjugated to each other in the sub-scanning direction in terms of geometrical optics, and said optical beam incident on said first reflecting surface is converged near said first reflecting surface as an imaging point (P), said optical beam further forming an imaging point (Q) by means of said transfer optics to be located near said second reflecting surface between said second reflecting surface and said scanning optics.

5. An optical scanning apparatus comprising:

a light source for issuing an optical beam;

a scanner, including at least first and second reflecting surfaces, for deflecting the optical beam issued from said light source;

transfer optics by which the optical beam deflected by said first reflecting surface of said scanner is allowed to be incident on said second reflecting surface of said scanner; and scanning optics by which the optical beam deflected by said second reflecting surface of said scanner is allowed to be focused to form a beam spot on a surface to be scanned;

wherein said optical beam incident on said first reflecting surface is converged near said first reflecting surface as a first imaging point (P), said optical beam further forming an imaging point by means of said transfer optics to be located near said second reflecting surface between said second reflecting surface and a point (Q), wherein said point (Q) is an imaginary imaging point of said first imaging point (P) throughout an imaginary transfer optic having conjugate points at said first and second reflecting surfaces of the scanner in the sub-scanning direction.

6. An optical scanning apparatus comprising:

a light source for issuing an optical beam;

a scanner having at least first and second reflecting surfaces for deflecting the optical beam from said light source;

transfer optics by which the optical beam deflected by said first reflecting surface of said scanner is allowed to be incident on said second reflecting surface of the scanner which is different from said first reflecting surface, with the thus deflected optical beam being focused to form a beam spot on a surface to be scanned, wherein the optical beam which has been deflected by reflection from said first reflecting surface of said scanner is passed through said transfer optics to be incident on said second reflecting surface at an angle in the sub-scanning direction; and scanning optics through which the optical beam deflected by reflection from said second reflecting surface is passed to form a beam spot on the surface to be scanned, said scanning optics being arranged such that images respectively corresponding to said second reflecting surface of the scanner and the surface to be scanned have a substantially conjugated relationship in the sub-scanning direction in terms of geometrical optics.

7. The optical scanning apparatus as claimed in claim 6, wherein said transfer optics is an afocal optical system in a main scanning direction and an optical magnification ratio w0/w1 is not less than one, wherein said w1 is a width of the optical beam on said first reflecting surface in the main scanning direction, and wherein said w0 is a width of the optical beam formed on said second reflecting surface in the main scanning direction.

8. An optical scanning apparatus, comprising:

a light source for emitting an optical beam;

a rotating polygonal mirror with a plural number of reflecting surfaces for reflecting and deflecting said optical beam emitted from said light source;

transfer optics for receiving the optical beam that is reflected and deflected by a first reflecting surface of said rotating polygonal mirror and transferring the optical beam to a second reflecting surface of said rotating polygonal mirror; and scanning optics for scanning a scanned surface with a beam spot formed on the scanned surface by the optical beam that is reflected and deflected by said second reflecting surface of said rotating polygonal mirror, wherein said first and second reflecting surfaces of said rotating polygonal mirror are oppositely disposed with respect to the rotating axis of said rotating polygonal mirror, and the optical beam emitted from said light source is incident on said first reflecting surface and is angled with respect to the optical axis, and wherein the optical beam transmitted by said transfer optics is incident on said second reflecting surface and is angled with respect to the optical axis, said transfer optics substantially conjugates images respectively corresponding to said first reflecting surface and said second reflecting surface in the sub-scanning direction, and said scanning optics substantially conjugates images respectively corresponding to said second reflecting surface and said scanned surface in the sub-scanning direction.

9. The optical scanning apparatus according to claim 8, wherein the following expression is satisfied:

$$\delta\beta s|\alpha 1\beta t-\alpha 2|/p \leq 1/8$$

where:
$\alpha 1$ and $\alpha 2$: angles of the optical beam to said first and second reflecting surfaces when viewed in the sub-scanning direction;
$\beta t$: magnification of said transfer optics in the sub-scanning direction;
$\beta s$: magnification of said scanning optics in the sub-scanning direction;
$\delta$: maximum shift of each said first and second reflecting surfaces with respect to the rotating axis of said rotating polygonal mirror; and
p: distance between the adjacent scanning lines on said scanned surface in the sub-scanning direction.

10. The optical scanning apparatus according to claim 9, wherein the following expression is satisfied:

$$\beta t = \alpha 2/\alpha 1$$

where:
$\alpha 1$ and $\alpha 2$: angles of the optical beam to said first and second reflecting surfaces when viewed in the sub-scanning direction; and
$\beta t$: magnification of said transfer optics in the sub-scanning direction.

11. The optical scanning apparatus according to claim 8, in which optical axes of optics for guiding an optical beam emitted from said light source to said first reflecting surface, said transfer optics, and said scanning optics lie in the sub-scanning plane including the rotating axis of said rotating polygonal mirror.

12. The optical scanning apparatus of claim 8, wherein said transfer optics comprises a plurality of lenses.

13. The optical scanning apparatus of claim 8, wherein said scanning optics comprises a plurality of scan lenses.

14. The optical scanning apparatus of claim 13, wherein one of said plurality of scan lenses is offset from the optical axis in said sub-scanning direction.

15. The optical scanning apparatus as claimed in claim 8, wherein said transfer optics is an afocal optical system in a main scanning direction and an optical magnification ratio w0/w1 is not less than one, wherein said w1 is a width of the optical beam on said first reflecting surface in the main scanning direction, and wherein said w0 is a width of the optical beam formed on said second reflecting surface in the main scanning direction.

16. An optical scanning apparatus comprising:
a light source for issuing an optical beam;
a scanner, including at least first and second reflecting surfaces, for deflecting the optical beam issued from said light source;
transfer optics by which the optical beam deflected by said first reflecting surface of said scanner is allowed to be incident on said second reflecting surface of said scanner; and
scanning optics by which the optical beam deflected by said second reflecting surface of said scanner is allowed to be focused to form a beam spot on a surface to be scanned; wherein
said scanning optics are arranged in such a way that images respectively corresponding to said second reflecting surface and said surface to be scanned are substantially conjugated to each other in the sub-scanning direction in terms of geometrical optics, and said optical beam incident on said first reflecting surface is converged near said first reflecting surface as an imaging point (P), said optical beam further forming an imaging point by means of said transfer optics to be located on said second reflecting surface.

17. An optical scanning apparatus comprising:
a light source for issuing an optical beam;
a scanner for deflecting said optical beam issued from said light source that is incident on a reflecting surface of said scanner at an angle in the sub-scanning direction;
scanning optics, including an anamorphic lens, by which the optical beam deflected from said reflecting surface of said scanner is focused to form a beam spot on a surface to be scanned, wherein said anamorphic lens has a positive refractive power in the sub-scanning direction and, at either end of the scan range, the optical beam deflected by said reflecting surface of said scanner is incident on said anamorphic lens at a position spaced from the optical axis of said anamorphic lens in the sub-scanning direction, wherein the optical axis of said anamorphic lens is located between said position and a line normal to said reflecting surface in said sub-scanning direction; and
a horizontal synchronous lens which is inclined by an angle about the optical axis of said horizontal synchronous lens.

18. An optical scanning apparatus comprising:
a light source for issuing an optical beam;
a scanner for deflecting said optical beam issued from said light source that is incident on a reflecting surface of said scanner at an angle in the sub-scanning direction;
scanning optics, including an anamorphic lens, by which the optical beam deflected from said reflecting surface of said scanner is focused to form a beam spot on a surface to be scanned, wherein said anamorphic lens has a positive refractive power in the sub-scanning direction and, at either end of the scan range, the optical beam deflected by said reflecting surface of said scanner is incident on said anamorphic lens at a position spaced from the optical axis of said anamorphic lens in the sub-scanning direction, wherein the optical axis of said anamorphic lens is located between said position and a line normal to said reflecting surface in said sub-scanning direction; and a horizontal synchronous sensor which is inclined by an angle about the optical axis of said-horizontal synchronous sensor.

19. An optical scanning apparatus comprising:

a light source for issuing an optical beam;

a scanner for deflecting said optical beam issued from said light source that is incident on a reflecting surface of said scanner at an angle in the sub-scanning direction;

scanning optics, including an anamorphic lens, by which the optical beam deflected from said reflecting surface of said scanner is focused to form a beam spot on a surface to be scanned, wherein said anamorphic lens has a negative refractive power in the sub-scanning direction and, at either end of the scan range, the optical beam deflected by said reflecting surface of said scanner passes through said anamorphic lens at a position spaced from the optical axis of said anamorphic lens in the sub-scanning direction and on a side of the optical axis of said anamorphic lens toward a line normal to said reflecting surface; and a horizontal synchronous lens which is inclined by an angle about the optical axis of said horizontal synchronous lens.

20. An optical scanning apparatus comprising:

a light source for issuing an optical beam;

a scanner for deflecting said optical beam issued from said light source that is incident on a reflecting surface of said scanner at an angle in the sub-scanning direction;

scanning optics, including an anamorphic lens, by which the optical beam deflected from said reflecting surface of said scanner is focused to form a beam spot on a surface to be scanned, wherein said anamorphic lens has a negative refractive power in the sub-scanning direction and, at either end of the scan range, the optical beam deflected by said reflecting surface of said scanner passes through said anamorphic lens at a position spaced from the optical axis of said anamorphic lens in the sub-scanning direction and on a side of the optical axis of said anamorphic lens toward a line normal to said reflecting surface; and a horizontal synchronous sensor which is inclined by an angle about the optical axis of said horizontal synchronous sensor.

* * * * *